United States Patent [19]
Wuertele et al.

[11] Patent Number: 5,585,862
[45] Date of Patent: Dec. 17, 1996

[54] MOTION ESTIMATION APPARATUS

[75] Inventors: David Wuertele; Takayuki Kobayashi; Yutaka Okada, all of Tokyo, Japan

[73] Assignee: Graphics Communication Laboratories, Tokyo, Japan

[21] Appl. No.: 424,201

[22] Filed: Apr. 19, 1995

[30] Foreign Application Priority Data

Sep. 19, 1994 [JP] Japan ................................ 6-223014

[51] Int. Cl.⁶ ...................................................... H04N 7/36
[52] U.S. Cl. ........................................... 348/699; 348/416
[58] Field of Search ................................... 348/402, 413, 348/416, 420, 699; H04N 7/36, 7/50

[56] References Cited

U.S. PATENT DOCUMENTS

| | | | |
|---|---|---|---|
| 5,099,325 | 3/1992 | Artieri | 348/420 |
| 5,488,419 | 1/1996 | Hui | 348/402 |
| 5,532,747 | 7/1996 | Yoon | 348/416 |
| 5,539,467 | 7/1996 | Song | 348/402 |

Primary Examiner—Howard W. Britton
Attorney, Agent, or Firm—Lane, Aitken & McCann

[57] ABSTRACT

A motion vector is calculated on the basis of a current block having current block data and a search window having search window data. The search window includes integer pel blocks and half-pel blocks each deviated by half-pel pitch from each of the integer pel blocks. The search window data are repeatedly transferred between and held by the shift registers. The search window data held by the shift registers and the current block data outputted from current block data outputting means are supplied to an integer pel block distortion calculating unit of each of processor elements. The integer pel block distortion calculating unit calculates local distortion values, and each of integer pel block distortion values defined by the local distortion values and indicative of a difference between a current block and each of integer pel blocks on the basis of the received search window and current block data. Each of the processor elements further includes half-pel block distortion calculating units for calculating half-pel block distortion values each indicative of a difference between the current block and each of the half-pel blocks on the basis of the local distortion values from the integer pel block distortion calculating unit. The motion vector is detected by a motion vector detector on the basis of the integer pel block distortion values and half-pel block distortion values.

17 Claims, 35 Drawing Sheets

FIG.6

| | | | | |
|---|---|---|---|---|
| X | YUo | YDi | HUo | HXo |
| YLo | | | | YLi |
| HLo | | | | HLi |
| DIo | | | | DIi |
| DHo | | | | DHi |
| DVo | | | | DVi |
| DDo | | | | DDi |
| | YUi | YDo | HUi | HXi |

|  |  |  |  |
|---|---|---|---|
|  |  |  | b(0,1) ← b(0,0):S0 |
|  |  |  |  |
|  |  |  | b(0,3) ← b(0,2):S1 |
|  |  |  |  |

FIG.14(b)

|  |  |  |  |
|---|---|---|---|
|  |  |  | b(0,0) ← b(1,0):S0 |
|  |  |  | b(0,1) |
|  |  |  | b(0,2) ← b(1,2):S1 |
|  |  |  | b(0,3) |

FIG.14(c)

|  |  |  |  |
|---|---|---|---|
|  |  | b(0,0) | b(1,0) ← b(1,1):S0 |
|  |  |  | b(0,1) |
|  |  | b(0,2) | b(1,2) ← b(1,3):S1 |
|  |  |  | b(0,3) |

FIG.14(d)

|  |  | b(0,0) | b(1,0) |
|---|---|---|---|
|  |  | b(0,1) | b(1,1) ← b(2,1):S0 |
|  |  | b(0,2) | b(1,2) |
|  |  | b(0,3) | b(1,3) ← b(2,3):S1 |
|  |  |  |  |

FIG.14(e)

|  | b(0,0) | b(1,0) |  |
|---|---|---|---|
|  | b(0,1) | b(1,1) | b(2,1) ← b(2,0):S0 |
|  | b(0,2) | b(1,2) |  |
|  | b(0,3) | b(1,3) | b(2,3) ← b(2,2):S1 |
|  |  |  |  |

FIG.14(f)

|  | b(0,0) | b(1,0) | b(2,0) ← b(3,0):S0 |
|---|---|---|---|
|  | b(0,1) | b(1,1) | b(2,1) |
|  | b(0,2) | b(1,2) | b(2,2) ← b(3,2):S1 |
|  | b(0,3) | b(1,3) | b(2,3) |

|        |        |        |        |
|--------|--------|--------|--------|
| b(1,0) | b(2,0) | b(3,0) |        |
| b(1,1) | b(2,1) | b(3,1) | b(4,1) | ← b(4,1):S0
| b(1,2) | b(2,2) | b(3,2) |        |
| b(1,3) | b(2,3) | b(3,3) | b(4,3) | ← b(4,3):S1
|        |        |        |        |

|        |        |        |        |
|--------|--------|--------|--------|
|        |        |        |        |
| b(1,0) | b(2,0) | b(3,0) | b(4,0) | ← b(4,0):S0
| b(1,1) | b(2,1) | b(3,1) | b(4,1) |
| b(1,2) | b(2,2) | b(3,2) | b(4,2) | ← b(4,2):S1
| b(1,3) | b(2,3) | b(3,3) |        |

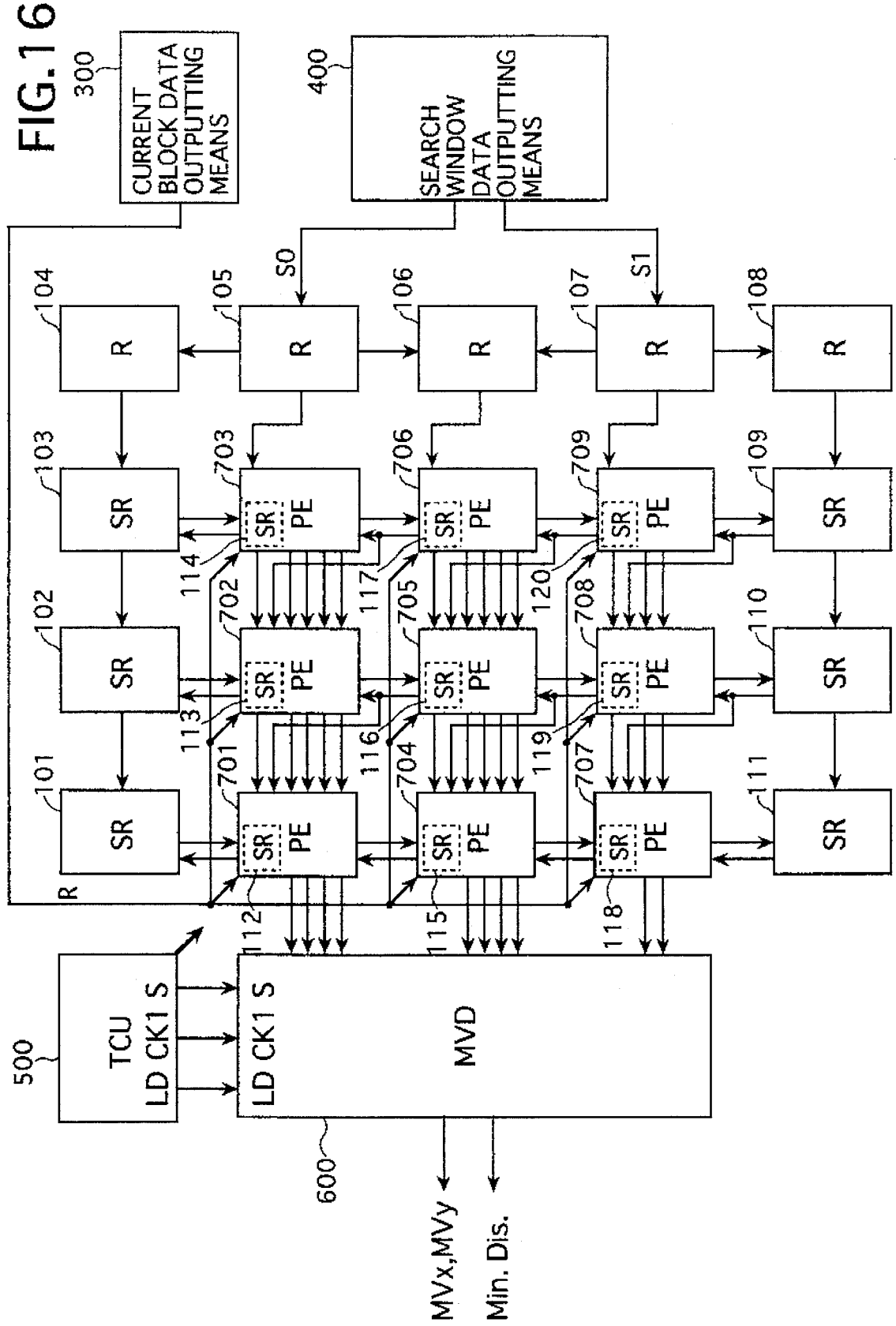

FIG.17

|  |  |  |
|---|---|---|
| X | YUo  YDi | 701-709 |
| YLo |  | YLi |
|  |  | YXi |
| DIo |  | DIi |
| DHo |  | DHi |
| DVo |  | DVi |
| DDo |  | DDi |
|  | YUi  YDo |  |

FIG.29(a) through FIG.29(j)

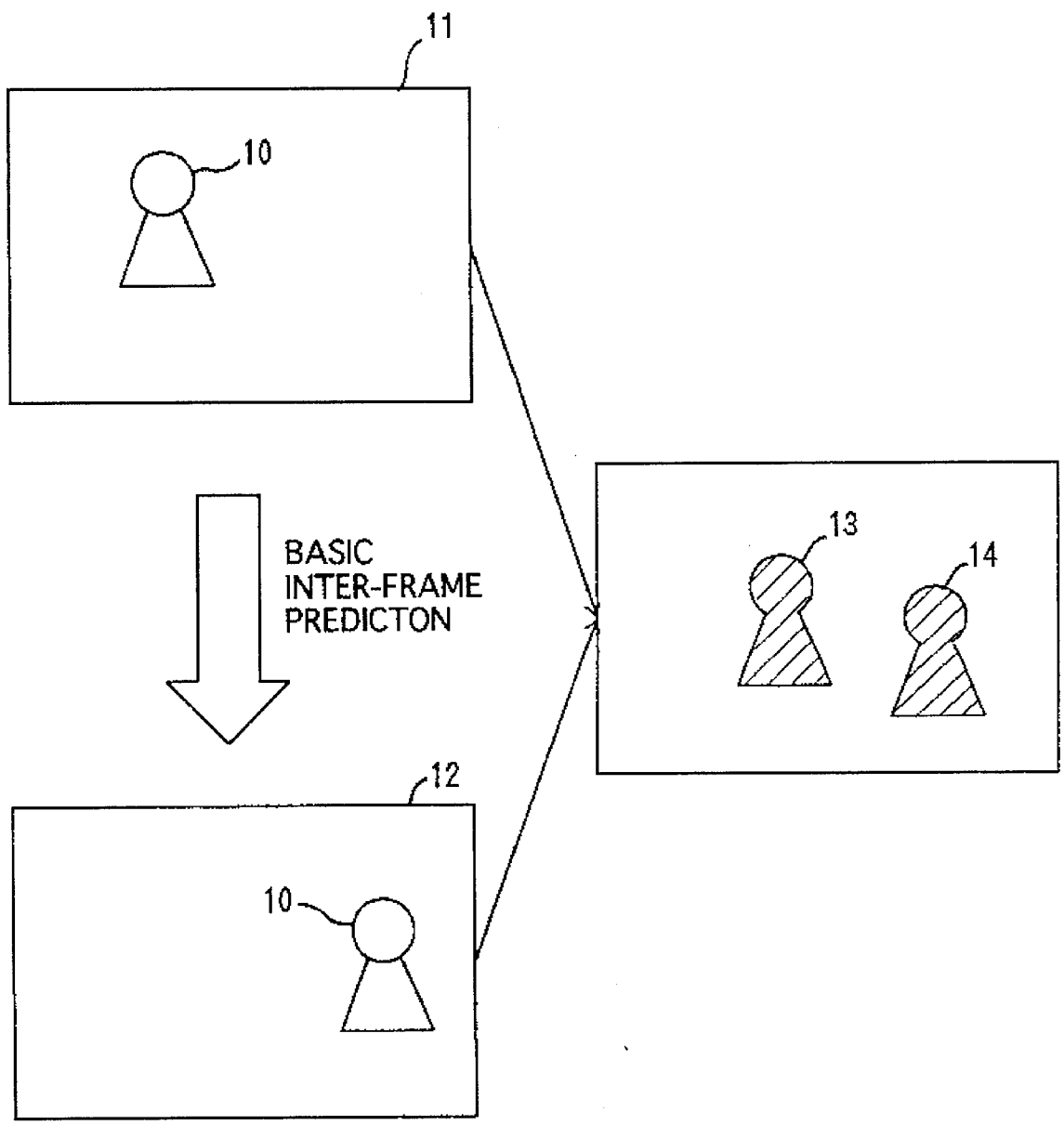

FIG.35
PRIOR ART (b(0,0))   | H h |   (b(1,0))

| H v |   | H d |

(b(0,1))            (b(1,1))

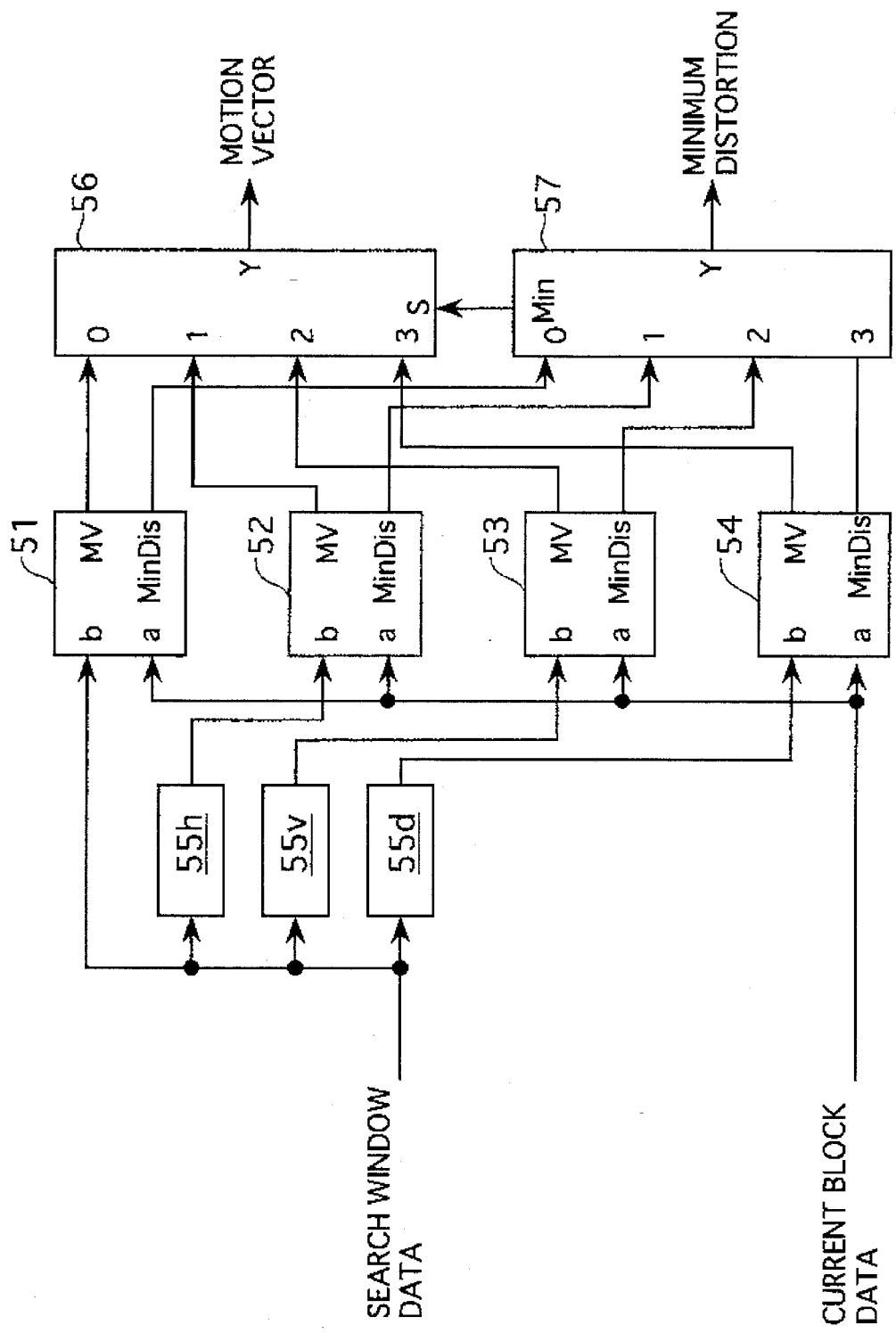

MOTION ESTIMATION APPARATUS

FIELD OF THE INVENTION

The present invention relates to a motion estimation apparatus applied to an encoder for encoding data representative of a motion picture, and more particularly to an apparatus for calculating a motion vector to estimate a current picture partially forming the moving picture on the basis of a reference picture partially forming the moving picture.

DESCRIPTION OF THE PRIOR ART

In the recent years, information transmitting media such as news paper, TV and radio have been flooded with information relative to "multimedia" to which ardent attention is paid by all the world. Although variously interpreted, the term "multimedia" as used herein is considered to be information presented in the combination of text, graphics, video, sound and the like. Since such information is generally handled by a computer, data representative of the video and sound as well as the text and graphics are required to be digitized. When data representative of a video such as a motion picture are digitized, the amount of digitized data is extremely large in comparison with data indicative of sound, text or graphics. For this reason, the data of a motion picture to be handled by the computer are required to be compressed when the data is stored in a storage device or transmitted over a communication line.

Up until now, there have been proposed a wide variety of data compression processes for compressing the data of a motion picture in accordance with a correlation between two pictures (occasionally referred to as frames) partly forming the motion picture. Such a data compression process is applied to a so-called basic inter-frame predicting cording method and a so-called motion compensation inter-frame predicting cording method which will become apparent as this description proceeds.

First, the former basic inter-frame predicting cording method will be described hereinlater with reference to FIG. 30. This method comprises a step of calculating a difference between pel data of each pel (picture element) of a current picture 12 and pel data of each pel of a reference picture 11 corresponding in position to each other, the current picture 12 and the reference picture 11 partially forming a motion picture. The reference picture 11 may be either of feature and past pictures with respect to the current picture 12 upon condition that data indicative of the reference picture 11 have been already encoded. The method further comprises steps of comparing the difference with a predetermined threshold value, and dividing the pel data of the reference picture 11 into two data groups consisting of a significant pel data group having differences each larger than the threshold value and an insignificant pel data group having differences each equal to or less than the threshold value. The significant pel data are considered to be useful data that are not allowed to be omitted when the current picture 12 is estimated on the basis of the reference picture 11. On the contrary, the insignificant pel data are considered to be unnecessary data that are allowed to be omitted when the current picture 12 is estimated on the basis of the reference picture 11.

As shown in FIG. 30, if a person image 10 in the reference picture 11 has been moved right in the current picture 12, there are produced two significant pel data regions by reference numerals of 13 and 14, respectively and an insignificant pel data region indicated by a blank surrounding the significant pel data regions 13 and 14. By adding, to pel data of a pel of the reference picture 11 within the significant pel data regions 13 and 14, a difference between pel data of a pel of current picture 12 and the pel data of the pel of the reference picture 11 corresponding in position to each other, can be estimated the pel data of the pel of the current block picture 12. Pel data of each pel of the current picture 12 within the insignificant pel data region are represented by pel data of a pel of the reference picture 11 corresponding in position to the pel of the current picture 12.

In the case that the basic inter-frame predicting cording method is utilized, the difference data between two pels decrease fast as the significant pel data is fewer. This means that compression efficiency can be enhanced. The number of the significant pel is decreased by setting the threshold value large and as a consequence the compression efficiency can be further enhanced. If, however, the threshold value becomes extremely large, motion of the image looks to be jerky, or moving portion of the image looks to be at a standstill in part, thereby resulting in an drawback of the fact that image quality becomes poor.

In view of the property of the basic inter-frame predicting cording method, the compression efficiency is enhanced under the condition that variation between the current picture and the reference picture is small because of the fact that the difference data are decreased in proportion to the size of standstill image regions of the current picture with respect to the reference picture. The following motion compensation inter-frame predicting cording method, however, realizes higher compression efficiency in comparison with the basic inter-frame predicting cording method.

Likewise, on the assumption that the person image 10 in the reference picture is moved right in the current picture 12, the motion compensation inter-frame predicting cording method is explained hereinafter with reference to FIG. 31. The motion compensation inter-frame predicting cording method comprises a step of calculating a motion vector MV indicating the movement distance and movement direction of the person image 10 between the reference picture 11 and the current picture 12. The motion compensation inter-frame predicting cording method further comprises a step of estimating the person image 10 in the current picture 12 with the aid of the motion vector MV and pel data defining the person image 10 in the reference picture 11. In this case, there is produced only one significant pel data region 13 as shown in FIG. 31. Accordingly, the motion compensation inter-frame predicting cording method is superior to the basic inter-frame predicting cording method in the fact that the number of the significant pel can be sharply decreased and accordingly that the compression efficiency can be extremely enhanced.

The motion compensation inter-frame predicting cording method will be described hereinafter in detail with reference to FIG. 32 to 34. According to ITU-T (International telecommunication Union-Telecommunication Standardization Sector) H.261, the motion compensation inter-frame predicting cording method comprises steps of dividing a current picture 20 shown in FIG. 32 into a plurality of blocks including a block (referred to hereinlater as a current block) 21, specifying a search window 31 including blocks (referred to hereinlater as candidate blocks) in a reference picture 30, and calculating distortion values each indicative a difference between the current block 21 and each of the candidate blocks. The distortion value is calculated by converting, into positive numbers, local distortion values each indicative of a difference between pel data of each pel of the current block 21 and pel data of each pel of the candidate block corresponding in position to each other, and summing up the converted local distortion values. The motion compensation inter-frame predicting cording method further comprises steps of specifying a candidate block 32 which provides a minimum distortion value, i.e. the smallest in the distortion values calculated in the above mentioned manner, and calculating a motion vector representative of a distance between and a direction defined by the current block 21 and the candidate block 32. By an encoder not shown, are encoded the motion vector MV thus calculated and the distortion value between the candidate block 32 included in the reference picture 30 and the current block 21.

FIGS. 33(a) and 33(b) represent relations between the current block 21, search window 31 and candidate blocks 32. If the current block 21 and the search window 31 contain N columns of M pels and K columns H pels as shown in FIGS. 33(b) and 33(a), respectively. The search window 31 includes (K–M)×(H–N) candidate blocks 32 similar to the current blocks 21. In the case that pel data of a pel at the top left-hand corner of current block 21 in FIG. 33(b) is indicated by a(0, 0), pel data of each of the candidate blocks 32 corresponding in position to the pel data a(0, 0) of the current block 21 are included in an area defined by oblique lines in FIG. 33(a).

FIGS. 34(a) and 34(b) represent a relations between pel data of the current block 21 and pel data of each of the candidate block 32 corresponding in position to each other. By b(k+m, h+n) in FIG. 34(a), is indicated pel data of each of the candidate blocks corresponding in position to the pel data a(m, n) of the current block 21 shown in FIG. 34(b). Pel data b(k, h) in the search window 31 shown in FIG. 34(a) is pel data at the upper left-hand corner of the candidate block 32 and accordingly corresponds in position to the pel data a(0, 0) of the current block 21. In the current block 21, search window 31 and candidate block 32 shown in FIGS. 34(a) and 34(b), a distortion value between the current block 21 and the candidate block 32 is indicated by D(k, h) defined as follows:

$$D(k,h) = \sum_{m=0}^{M-1} \sum_{n=0}^{N-1} \|b(m+k, n+h) - a(m,n)\| =$$

$$\sum_{m=0}^{M-1} \sum_{n=0}^{N-1} \|d(k,h)\|$$

Note that "∥∥" is a notation called the norm and that d(k, h) is defined by an equation, d(k, h) =b(m+k, n+h)–a(m, n), and represents a local distortion value indicative of a difference between pel data of two pels corresponding in position to each other. The norm arithmetic is absolute-value arithmetic, square arithmetic or the like. The above-mentioned process of comparing a block of the current picture with each of blocks of the reference picture in motion compensation inter-frame predicting cording method is so-called as a block matching method, particularly as a full search block matching method if the current block is compared with all the candidate blocks included in the search window.

MPEG (Moving Pictures Experts Group) is known as including MPEG1 and MPEG2 which are supported by ISO/IEC (International Organization for Standardization/ International Electrotechnical Commission) 11172-2 and 13818-2, respectively. In MPEG, the pels handled in the foregoing ITU-T H. 261 are referred as integer pels. MPEG further generates and handles half-pels each interposed between the adjoining integer pels. Four integer pels b(0, 0), b(0, 1), b(1, 0) and b(1, 1) are shown in FIG. 35 as forming a matrix array indicated by two columns of two pels. Between and based on the integer pels b(0, 0) and b(1, 0), the integer pels b(0, 0) and b(0, 1), and the integer pels b(0, 0) and b(1, 1), are generated half-pels Hh, Hv and Hd defined as follows:

$$Hh=\{b(0, 0)\}/2$$

$$Hv=\{b(0, 0)+b(0, 1)\}/2$$

$$Hd=\{b(0, 0)+b(1, 0)+b(0, 1)+b(1, 1)\}/4$$

The generation of the half-pels makes it possible to search, from the search window, the candidate blocks horizontally, vertically and diagonally aligned at not one-pel pitches but half-pel pitches in the search window, so that the precision of the motion estimation can be enhanced more and more.

When the search of the candidate blocks horizontally, vertically diagonally aligned at half-pel pitches is carried out, a motion estimation apparatus shown in FIG. 36 is used. Referring to FIG. 36, the motion estimation apparatus comprises a motion estimation processor 41 for calculating a motion vector and a minimum distortion value, a half-pel generator 42h for generating half-pels each horizontally deviated from each of integer pels of a search window, a half-pel generator 42v for generating half-pels each vertically deviated from each of the integer pels of the search window, and a half-pel generator 42d for generating half pels each diagonally deviated from each of integer pels of the search window. The apparatus shown in FIG. 36 further comprises a selector 43 for selecting one from among integer pel data indicative of the integer pels, half-pel data indicative of the half-pels generated by the half-pel generator 42h, half pel data indicative of the half-pels generated by the half-pel generator 42v and half-pel data indicative of the half-pels generated by the half-pel generator 42d in accordance with a search phase signal to supply the selected pel data to the motion estimation processor 41. In the apparatus thus constructed, the motion estimation processor 41 is operated by time sharing to search integer pel candidate blocks each containing the integer pels, and half-pel candidate blocks each containing the half-pels.

There has also been proposed another motion estimation apparatus which is shown in FIG. 37 as comprising four motion estimation processors 51, 52, 53 and 54, a half-pel generator 55h for generating half-pels each horizontally deviated by half-pel pitch from each of integer pels of the search window, a half-pel generator 55v for generating half-pels each horizontally deviated half-pel pitch from each of the integer pels of the search window, a half-pel generator 55d for generating half pels each diagonally deviated by half-pel pitch from each of integer pels of the search window. The motion estimation processors 51 to 54 are operated to receive search window data indicative of integer pels of the search window, half-pel data from the half-pel generator 55h, half-pel data from the half-pel generator 55v and half-pel data from the half-pel generator 55d to calculate motion vectors and minimum distortion values, respectively. The apparatus shown in FIG. 37 further comprises a selector 56 for selecting and outputting one of motion vectors calculated by the motion estimation processors 51–54, and a minimum distortion detector 57 for detecting and outputting the smallest in the minimum distortion values calculated by the motion estimation processors 51–54. As will be appreciated from the aforesaid description and the device arrangement shown in FIG. 37, an integer pel block search and three half-pel block searches are carried out by means of parallel processing.

The motion estimation processor 41 shown in FIG. 36 and the motion estimation processors 51, 52, 53 and 54 shown in FIG. 37 are constituted, for instance, by a so-called broadcast type distortion calculation unit disclosed in U.S. Pat. No. 5,099,325, or a so-called flow type distortion calculation unit disclosed in IEEE Transactions o Circuit and Systems, Vol. 36, No. 10, October 1989.

A drawback is encountered in a prior-art motion estimation apparatus shown in FIG. 36 in that total calculation time of distortion values based on integer pel blocks and based on half-pel blocks is four times as long as calculation time only of the distortion values based on the integer pel blocks. On the other hand, another drawback is encountered in a prior-art motion estimation apparatus shown in FIG. 37 in that a circuit for calculating distortion values based on integer pel blocks and half-pel blocks is four times as large as a circuit for calculating distortion values based only on integer pel blocks.

The present invention contemplates provision of a motion estimation apparatus overcoming these drawbacks of prior-art motion estimation method and apparatus of the described general nature.

SUMMARY OF THE INVENTION

According to one aspect of the present invention there is provided a motion estimation apparatus for calculating a motion vector to estimate a current picture partially forming a moving picture on the basis of a reference picture partially forming the moving picture, the current picture being partially formed by a current block including a plurality of integer pels each represented by integer pel data, the reference picture being partially formed by a search window including a plurality of integer pels each represented by integer pel data, the search window having a plurality of candidate blocks each equal in size to the current block, the candidate blocks consisting of integer pel blocks each including part of the integer pels of the search window and half-pel blocks each having half-pels each interposed between two of the integer pels of the search window adjacent to each other, and the motion vector being indicative of a displacement between the current block and one of the candidate blocks most similar to the current block, comprising search window data outputting means for outputting the integer pel data of the search window, search window data receiving and holding means for receiving the integer pel data of the search window from the search window data outputting means, and holding the integer pel data of at least two of the integer pels of the search window at the same time, the integer pel data held by the search window data receiving and holding means being shifted with other integer pel data of the search window, current block data outputting means for outputting the integer pel data of the current block, integer pel block distortion calculating means for calculate integer pel block distortion values each indicative of a difference between the current block and each of the integer pel blocks of the candidate blocks on the basis of the integer pel data of the search window held by the search window data receiving and holding means and the integer pel data of the current block outputted from the current block data outputting means, the integer pel block distortion calculating means being operative to calculate and output local distortion values divided into a plurality of integer pel block local distortion groups equal in number to one another, each local integer pel block distortion value of each of the integer pel block local distortion groups being indicative of a difference between each integer pel of each of the integer pel blocks and each integer pel of the current block corresponding in position to each other, and the integer pel block distortion values being calculated on the basis of the local integer pel block local distortion groups, respectively, half-pel block distortion calculating means for calculating half-pel block distortion values each indicative of a difference between the current block and each of the half-pel blocks on the basis of the local distortion values calculated by the integer pel block distortion calculating means, and minimum distortion detecting means for detecting a minimum distortion value from among the integer pel block distortion values and half-pel block distortion values to specify one of the candidate blocks most similar to the current block.

According to another aspect of the present invention there is provided a motion estimation apparatus for calculating a motion vector to estimate a current picture partially forming a moving picture on the basis of a reference picture partially forming the moving picture, the current picture being partially formed by a current block including a plurality of integer pels each represented by integer pel data, the reference picture being partially formed by a search window including a plurality of integer pels each represented by integer pel data, the search window having a plurality of candidate blocks each equal in size to the current block, the candidate blocks consisting of integer pel blocks each including part of the integer pels of the search window and half-pel blocks each having half-pels each interposed between two of the integer pels of the search window adjacent to each other, and the motion vector being indicative of a displacement between the current block and one of the candidate blocks most similar to the current block, comprising search window data outputting means for outputting the integer pel data of the search window, search window data receiving and holding means for receiving the integer pel data of the search window from the search window data outputting means, and holding the integer pel data of at least two of the integer pels of the search window at the same time, the integer pel data held by the search window data receiving and holding means being shifted with other integer pel data of the search window, current block data outputting means for outputting the integer pel data of the current block, integer pel block distortion calculating means for calculate integer pel block distortion values each indicative of a difference between the current block and each of the integer pel blocks of the candidate blocks on the basis of the integer pel data of the search window held by the search window data receiving and holding means and the integer pel data of the current block outputted from the current block data outputting means, half-pel block distortion calculating means for calculating half-pel block distortion values each indicative of a difference between the current block and each of the half-pel blocks of the candidate blocks on the basis of the integer pel data of the search window held by the search window data receiving and holding means and the integer pel data of the current block outputted from the current block data outputting means, and minimum distortion detecting means for detecting a minimum distortion value from among the integer pel block distortion values and half-pel block distortion values to specify one of the candidate blocks most similar to the current block.

According to a further aspect of the present invention there is provided a motion estimation apparatus for calculating a motion vector to estimate a current picture partially forming a moving picture on the basis of a reference picture partially forming the moving picture, the current picture being partially formed by a current block including a plurality of integer pels each represented by integer pel data, the reference picture being partially formed by a search window including a plurality of integer pels each represented by integer pel data, the search window having a plurality of candidate blocks each equal in size to the current block, the candidate blocks consisting of integer pel blocks each including part of the integer pels of the search window and half-pel blocks each having half-pels each interposed between two of the integer pels of the search window adjacent to each other, and the motion vector being indicative of a displacement between the current block and one of the candidate blocks most similar to the current block, comprising search window data outputting means for outputting the integer pel data of the search window, search window data receiving and holding means for receiving the integer pel data of the search window from the search window data outputting means, and holding the integer pel data of at least two of the integer pels of the search window at the same time, the integer pel data held by the search window data receiving and holding means being shifted with other integer pel data of the search window, current block data outputting means for outputting the integer pel data of the current block, current block data receiving and holding means for receiving the integer pel data of the current block from the current block data outputting means, and holding the integer pel data of at least two of the integer pels of the current block at the same time, the integer pel data held by the current block data receiving and holding means being shifted with other integer pel data of the current block, integer pel block distortion calculating means for calculate integer pel block distortion values each indicative of a difference between the current block and each of the integer pel blocks of the candidate blocks on the basis of the integer pel data of the search window held by the search window data receiving and holding means and the integer pel data of the current block held by the current block data receiving and holding means, the integer pel block distortion calculating means being operative to calculate and output local distortion values divided into a plurality of integer pel block local distortion groups equal in number to one another, each local integer pel block distortion value of each of the integer pel block local distortion groups being indicative of a difference between each integer pel of each of the integer pel blocks and each integer pel of the current block corresponding in position to each other, and the integer pel block distortion values being calculated on the basis of the local integer pel block local distortion groups, respectively, half-pel block distortion calculating means for calculating half-pel block distortion values each indicative of a difference between the current block and each of the half-pel blocks on the basis of the local distortion values calculated by the integer pel block distortion calculating means, minimum distortion detecting means for detecting a minimum distortion value from among the integer pel block distortion values and half-pel block distortion values to specify one of the candidate blocks most similar to the current block.

BRIEF DESCRIPTION OF THE DRAWINGS

The features and advantages of a motion estimation apparatus in accordance with the present invention will be more clearly understood from the following description taken in conjunction with the accompanying drawings in which:

FIG. 6 is a plan view showing each of processor elements shown in FIG. 5;

FIG. 10 (a) is a block diagram partially showing a motion vector detector shown in FIG. 5;

FIGS. 14(a) to 14(f) are diagrams showing flow of search window data during initialization operation of the motion estimation apparatus shown in FIG. 5;

Figures 15C, 15D:
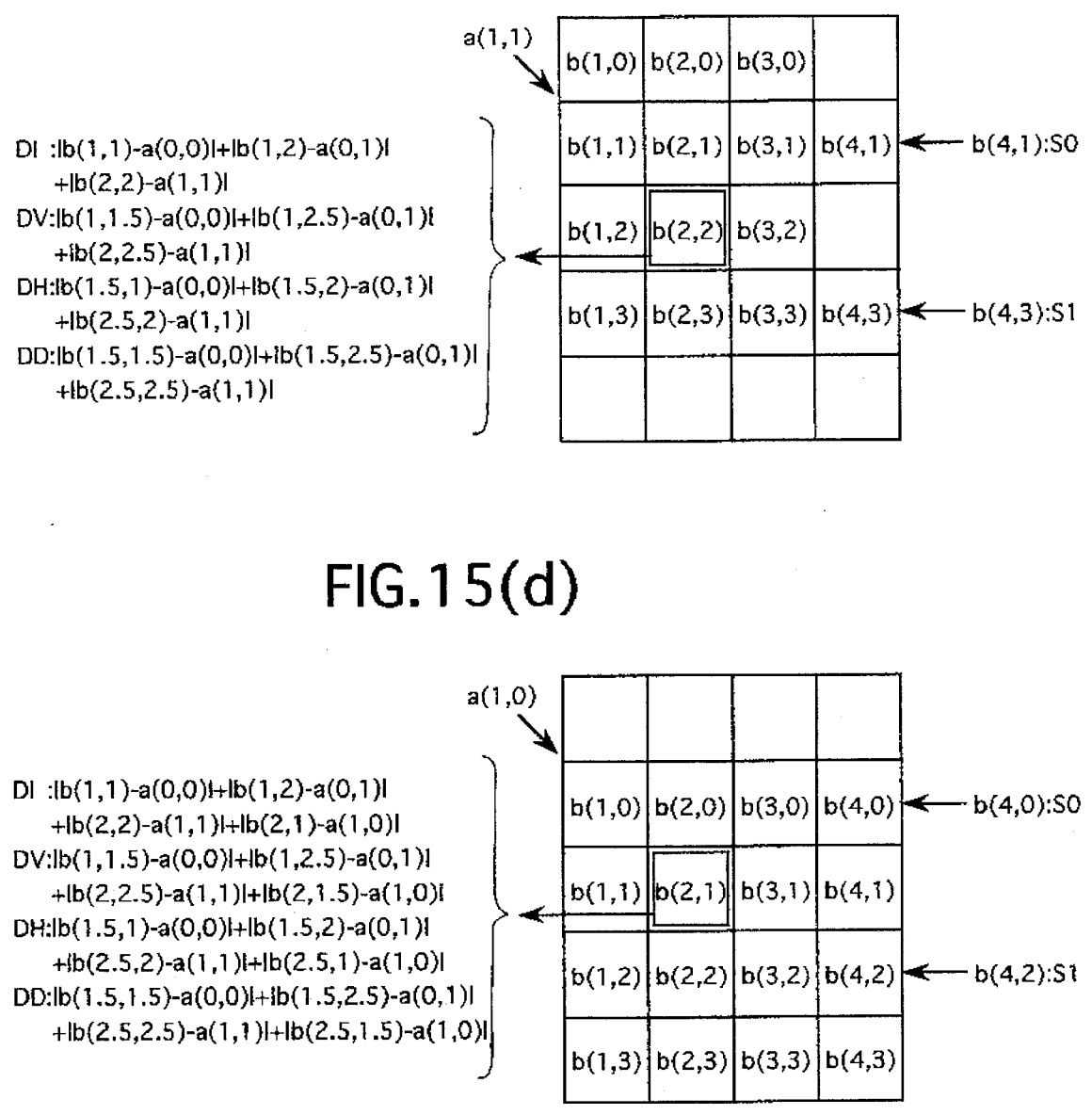

FIGS. 15(a) to 15(d) are diagrams showing flow of search window data in periods (a) to (d), respectively, and local distortion values calculated in each of periods (a) to (d) by the central processor element shown in FIG. 5

FIG. 16 is a block diagram showing a second embodiment of the motion estimation apparatus according to the present invention;

FIG. 17 is a plan view of each of processor elements shown in FIG. 16;

Figures 29A, 29B, 29C, 29D, 29E, 29F, 29G, 29H, 29I, 29J:
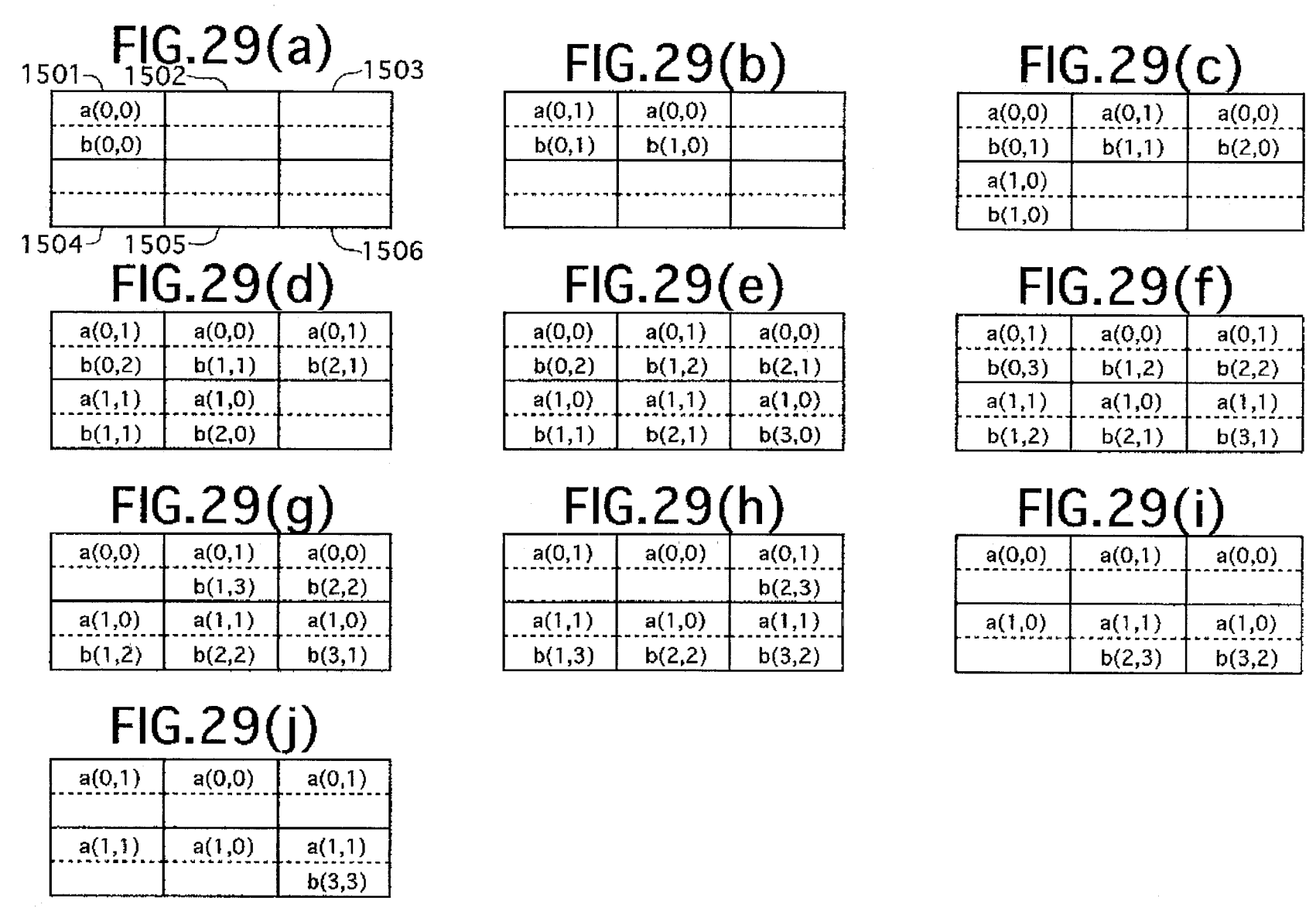

FIGS. 29(a) to 29(j) are diagrams showing current block data and search window data inputted into the processor elements shown in FIG. 19 in periods (a) to (j), respectively, shown in FIG. 27;

FIG. 30 is a diagram explaining a basic inter-frame predicting coding method;

Figure 35:
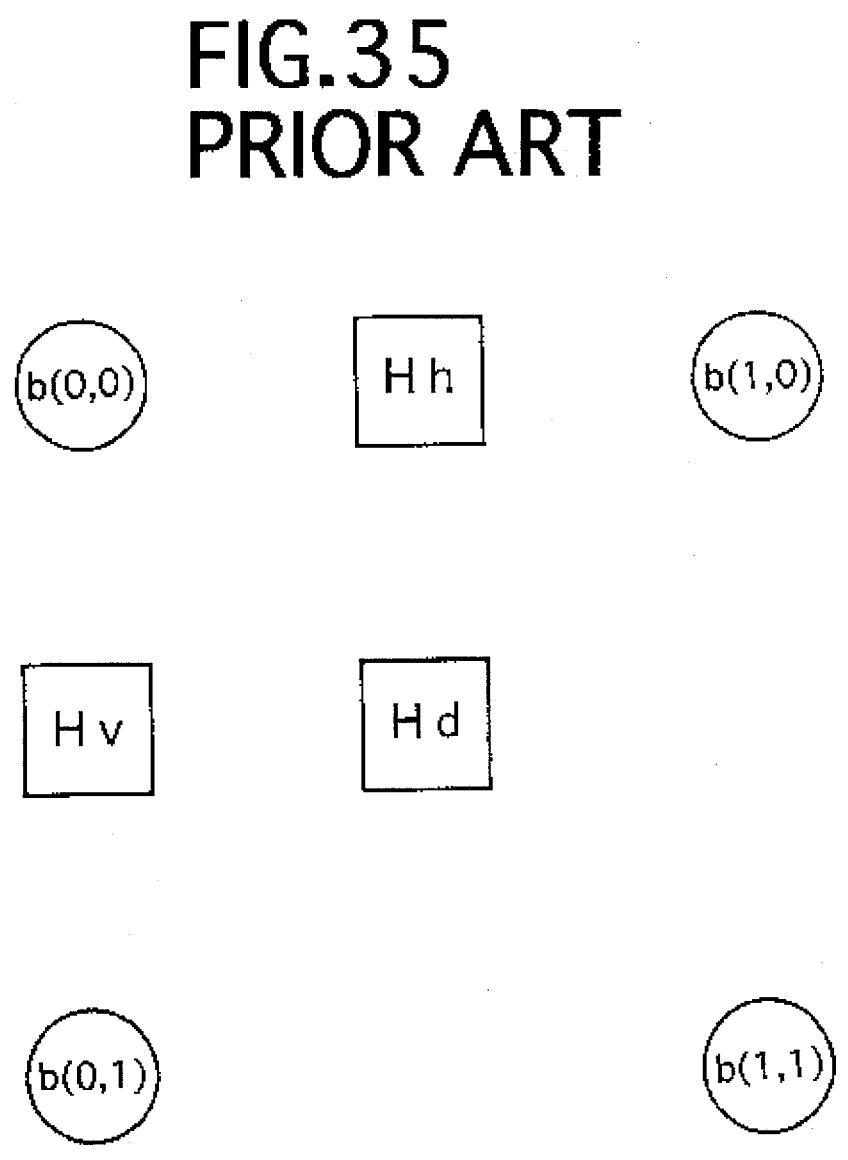

FIG. 35 is a diagram for explaining half-pels interposed between adjoining integer pels;

FIG. 37 is a block diagram of another prior art motion estimation apparatus.

DESCRIPTION OF THE PREFERRED EMBODIMENTS

Figure 1:
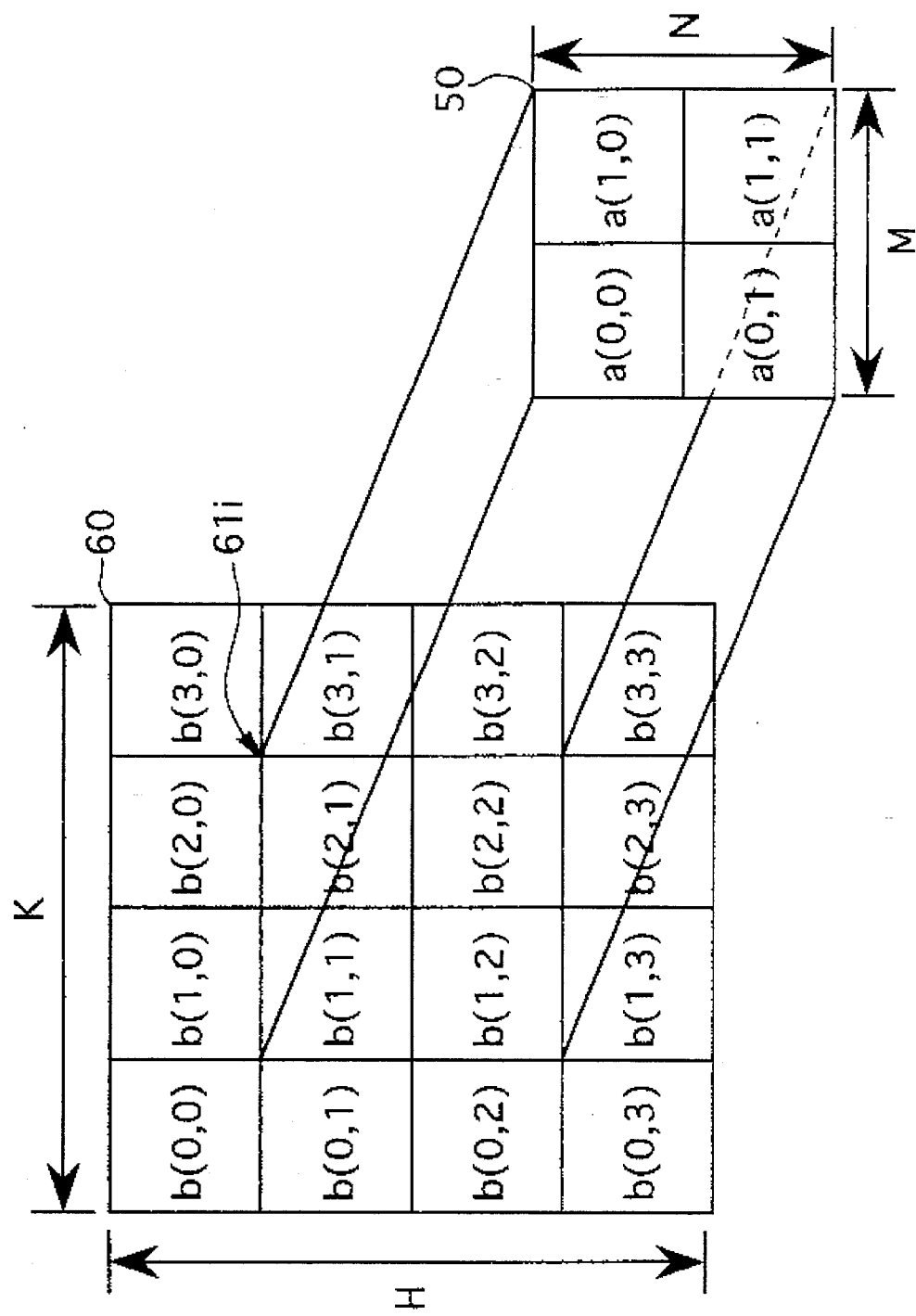
FIG. 1 is a diagram showing a current block, integer pel blocks each compared with the current block, and a search window containing the integer pel blocks.

Referring now to FIGS. 1 to 15 of the accompanying drawings, a preferred first embodiment of the present invention will be described hereinafter in detail.

A motion estimation apparatus embodying the present invention is designed to calculate a motion vector to estimate a current picture partially forming a motion picture on the basis of a reference picture partially forming the moving picture. The current picture is partially formed by a current block denoted by a reference numeral 50 in FIG. 1. The current block 50 has a plurality of integer pels arranged in the form of a matrix array formed by M columns of N pels. Although M and N may be any integers, both M and N are set to "2" in the present embodiment. The integer pels of the current block 50 are represented by integer pel data indicated by a(0, 0), a(0, 1), a(1, 0) and a(1, 1), respectively.

The reference picture is partially formed by a search window denoted by a reference numeral 60 in FIG. 1. The search window 60 has integer pels arranged in the form of a matrix array formed by K columns of H pels. Although K and H may be any integers greater than said M and N, respectively, both K and H are set to "4" in the present embodiment. The integer pels of the search window 60 are represented by integer pel data indicated by b(0, 0), b(0, 1), b(0, 2), b(0, 3), b(1, 0), b(1, 1), b(1, 2), b(1, 3), b(2, 0), b(2, 1), b(2, 2), b(2, 3), b(3, 0), b(3, 1), b(3, 2) and b(3, 3), respectively. The search window 60 includes a plurality of candidate blocks each equal in size to the current block 50. As shown in FIGS. 1 to 4, the candidate blocks consists of integer pel blocks 61i each including the integer pel data of the search window 60, and first, second and third half-pel blocks 61h, 61v and 61d each having half-pels each interposed between two of the integer pels adjacent to each other.

The number of the integer pel blocks 61i is (K–M+1)×(L–N+1) and accordingly is "9" in the present embodiment. For example, one of the integer pel blocks 61i of the candidate blocks is defined by the integer pel data b(1, 1), b(1, 2), b(2,1) and b(2, 2) as shown in FIG. 1.

Figure 2:
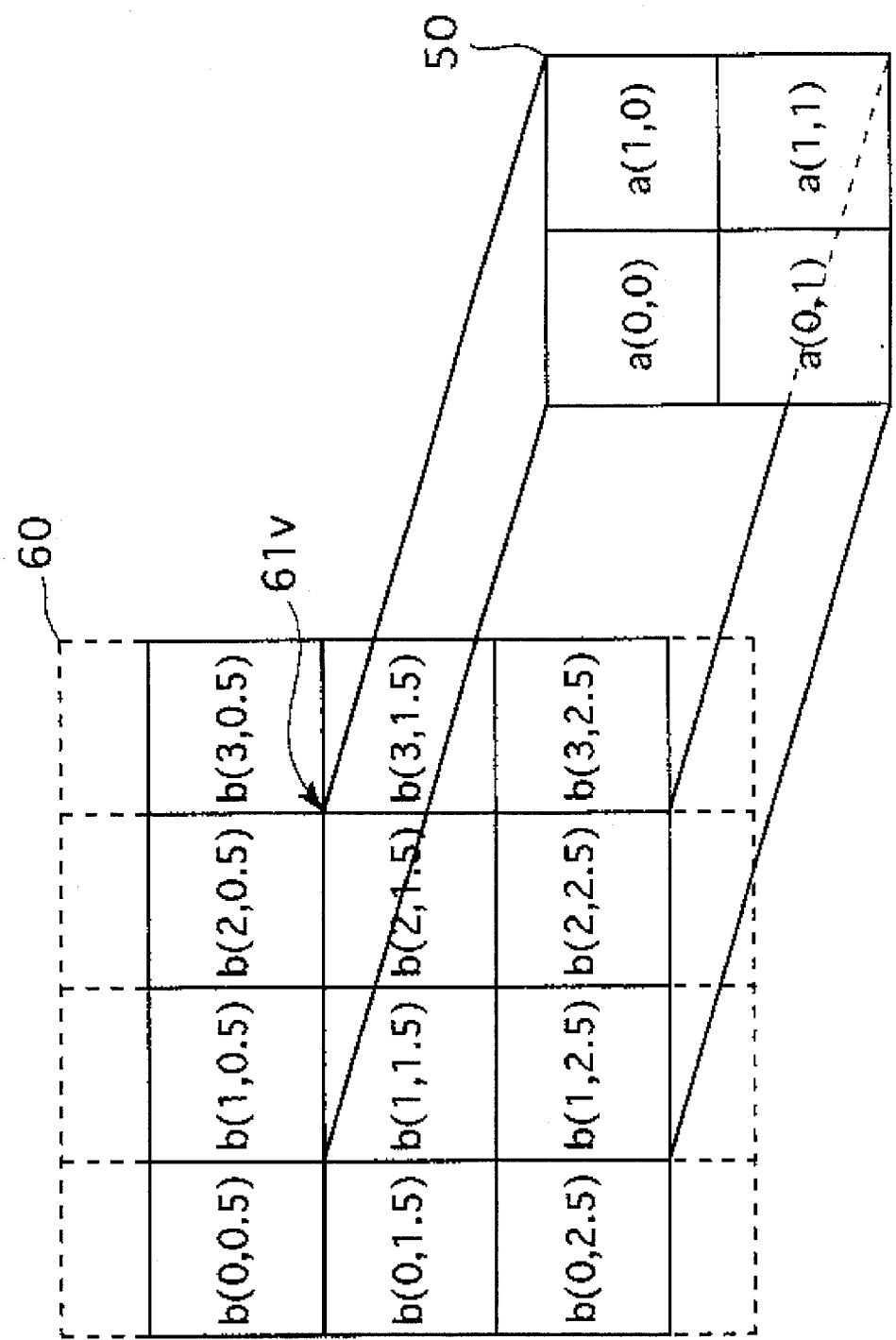
FIG. 2 is a diagram showing first half-pel blocks each compared with the current block and vertically deviated from each of the integer pel blocks show in FIG. 1.

Each of the first half-pel blocks 61v is deviated by half-pel pitch from each of the integer pel blocks 61i in a parallel relationship to a vertical line in the search window 60. The half-pels of the first half-pel blocks 61v have half-pel data b(0, 0.5), b(0, 1.5), b(0, 2.5), b(1, 0.5), b(1, 1.5), b(1, 2.5), b(2, 0.5), b(2, 1.5), b(2, 2.5), b(3, 0.5), b(3, 1.5) and b(3, 2.5), respectively. The number of the first half-pel blocks 61v is (K–M+1)×(L–N) and accordingly is "6" in the present embodiment. For example, one of the first half-pel blocks 61v of the candidate blocks is defined by the half-pel data b(1, 1.5), b(1, 2.5), b(2, 1.5) and b(2, 2.5) as shown in FIG. 2.

Figure 3:
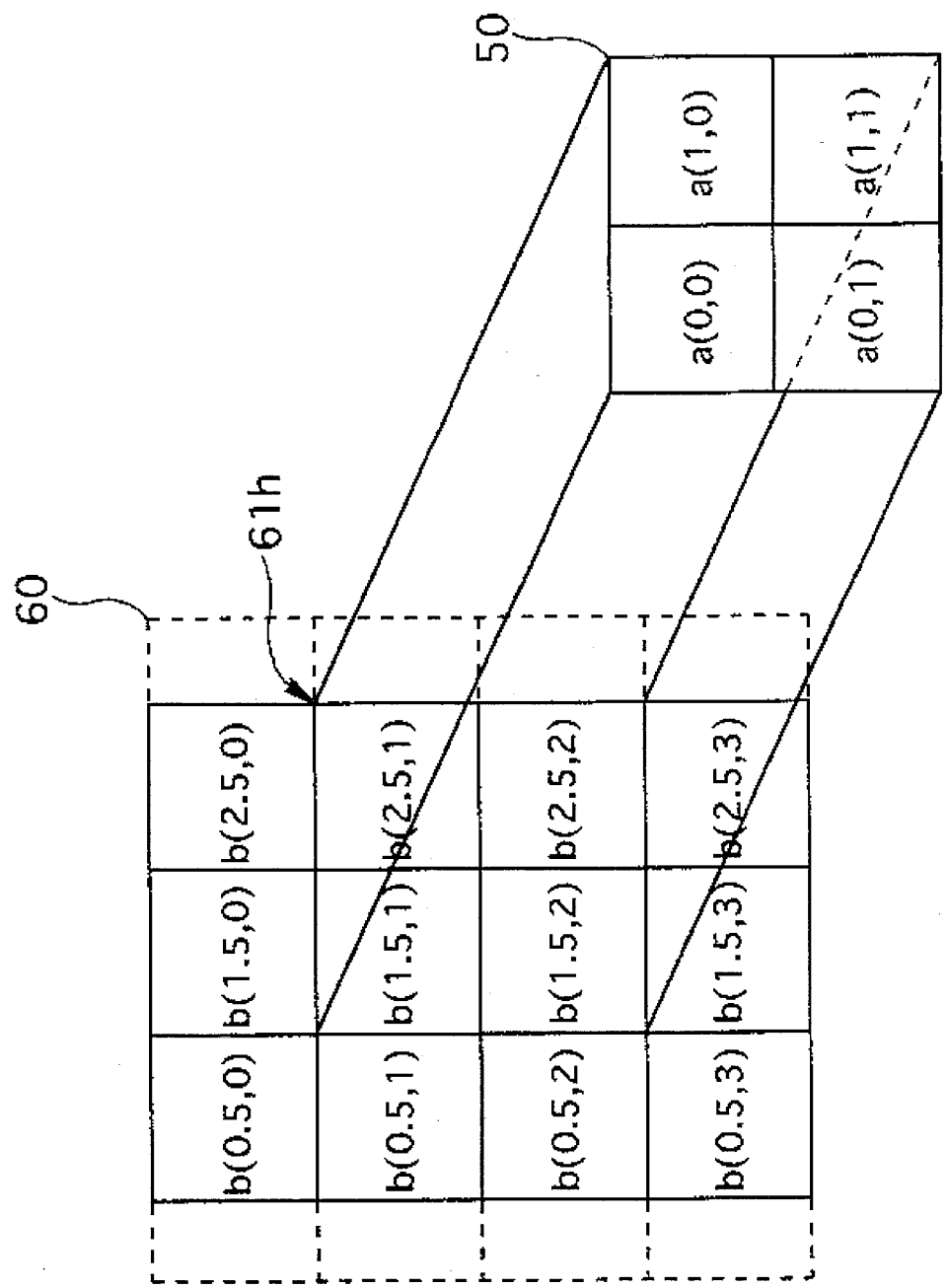
FIG. 3 is a diagram showing second half-pel blocks each compared with the current block and vertically deviated from each of the integer pel blocks show in FIG. 1.

Each of the second half-pel blocks 61h is deviated by half-pel pitch from each of the integer pel blocks 61i in a parallel relationship to a horizontal line in the search window 60. The half-pels of the second half-pel blocks 61h have half-pel data b(0.5, 0), b(0.5, 1), b(0.5, 2), b(0.5, 3), b(1.5, 0), b(1.5, 1), b(1.5, 2), b(1.5, 3), b(2.5, 0), b(2.5, 1), b(2.5, 2) and b(2.5, 3), respectively. The number of the second half-pel blocks 61h is (K–M)×(L–N+1) and accordingly is "6" in the present embodiment. For example, one of the second half-pel blocks 61h of the candidate blocks is defined by the half-pel data b(1.5, 1), b(1.5, 2), b(2.5, 1) and b(2.5, 2) as shown in FIG. 3.

Figure 4:
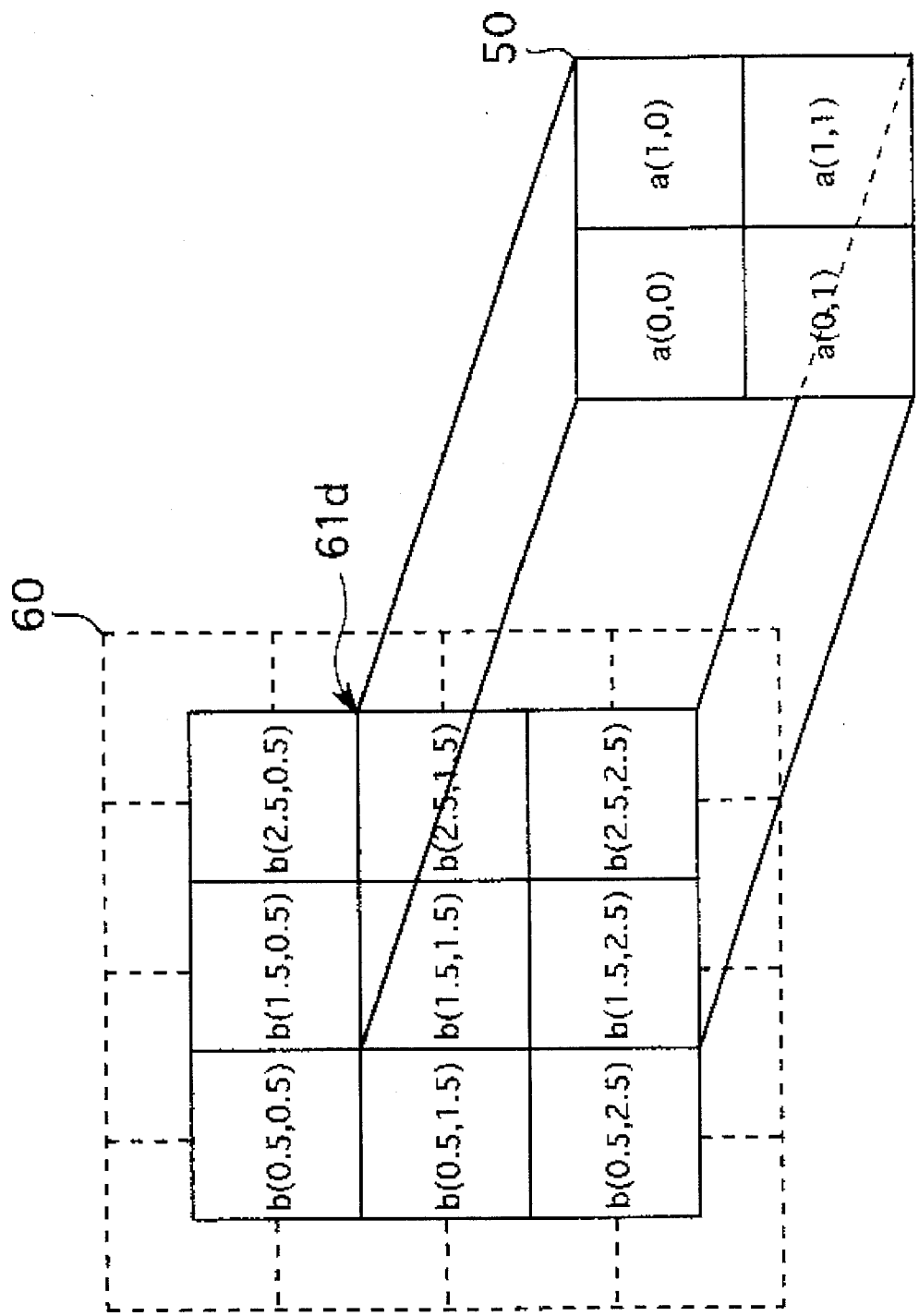
FIG. 4 is a diagram showing third half-pel blocks each compared with the current block and diagonally deviated from each of the integer pel blocks shown in FIG. 1.

Each of the third half-pel blocks is deviated by half-pel pitch from each of the integer pel blocks 61i in a parallel relationship to a diagonal line in the search window 60. The half-pels of the third half-pel blocks 61d have half-pel data b(0.5, 0.5), b(0.5, 1.5), b(0.5, 2.5), b(1.5, 0.5), b(1.5, 1.5), b(1.5, 2.5), b(2.5, 0.5), b(2.5, 1.5) and b(2.5, 2.5), respectively. The number of the third half-pel blocks 61d is (K–M)×(L–N) and accordingly is "4" in the present embodiment. For example, one of the third half-pel blocks 61d of the candidate blocks is defined by the half-pel data b(1.5, 1.5), b(1.5, 2.5), b(2.5, 1.5) and b(2.5, 2.5) as shown in FIG. 4.

Figure 5:
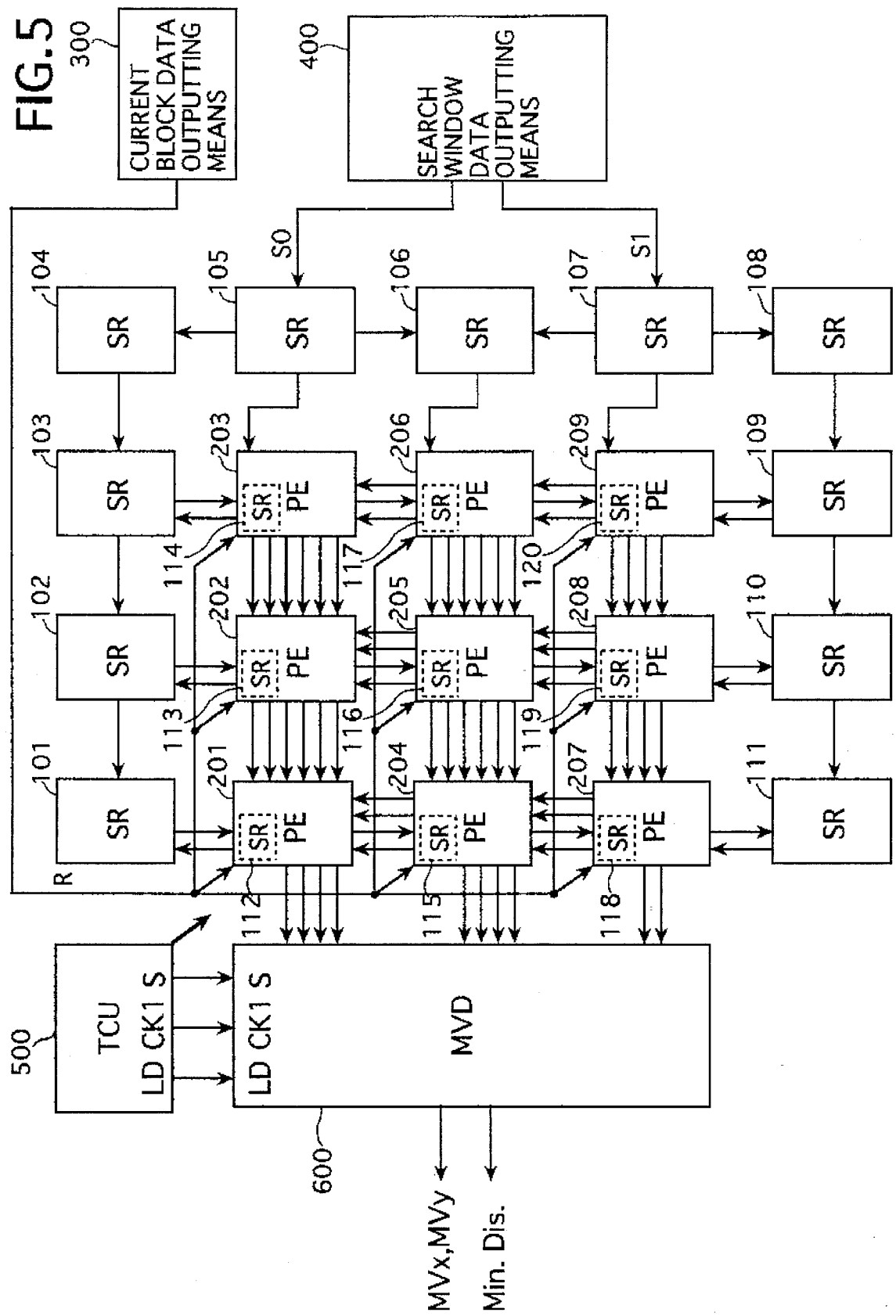
FIG. 5 is a block diagram showing a first embodiment of a motion estimation apparatus according to the present invention.
Figure 7:
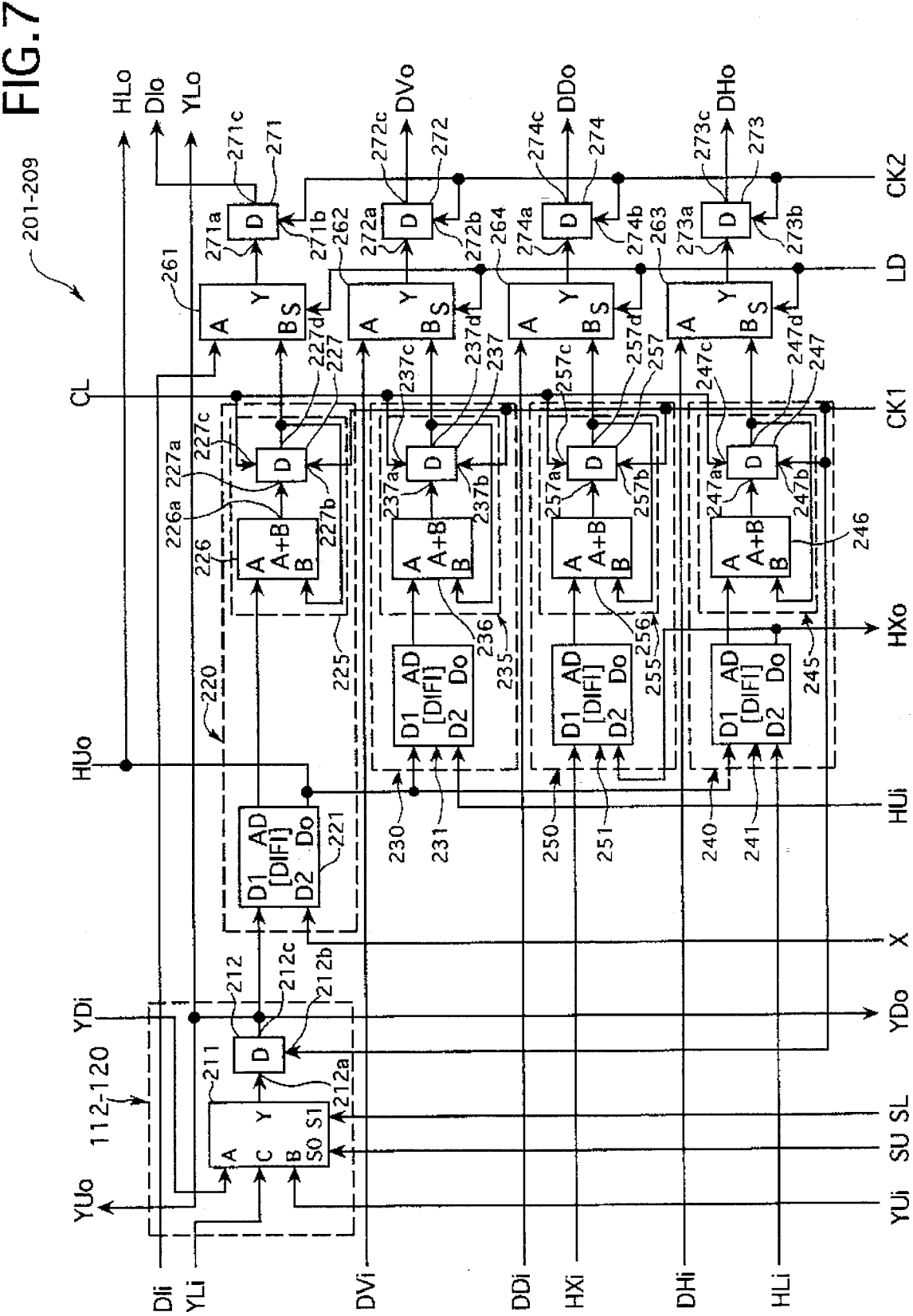
FIG. 7 is a block diagram showing the processor element shown in FIG. 6.

The motion estimation apparatus is shown in FIG. 5 as comprising shift registers 101–111, processor elements 201–209, a timing control unit 500 and a motion vector detector 600. Referring to FIG. 6, the processor elements 201–209 each has data input terminals X, YDi, YLi, HLi, DIi, DHi, DVi, DDi, HXi, HUi and YUi, data output terminals YUo, HUo, HXo, YDo, DDo, DVo, DHo, DIo, HLo and YLo, signal input terminals (not shown) and signal output terminals (not shown). Each of the processor elements 201–209 is shown in FIG. 7 as comprising each of shift registers 112–120, an integer pel block distortion calculating unit 220, a first half-pel block distortion calculating unit 230, a second half-pel block distortion calculating unit 240, a third half-pel block distortion calculating unit 250, selectors 261–264 and D flip-flops 271–274.

The motion estimation apparatus is shown in FIG. 5 as further comprising current block data outputting means 300 for outputting the integer pel data of the current block 50 and search window data outputting means 400 for outputting the integer pel data of the search window 60. The shift registers 101–111 shown in FIG. 5 and the shift registers 112 120 of the processor elements 201–209 shown in FIG. 7 collectively forms search window data receiving and holding means for receiving the integer pel data of the search window 60 from the search window data outputting means 400, and holding the integer pel data of at least two of the integer pels of the search window 60 at the same time, the integer pel data held by the search window data receiving and holding means being shifted with other integer pel data of the search window 60.

Figure 12:
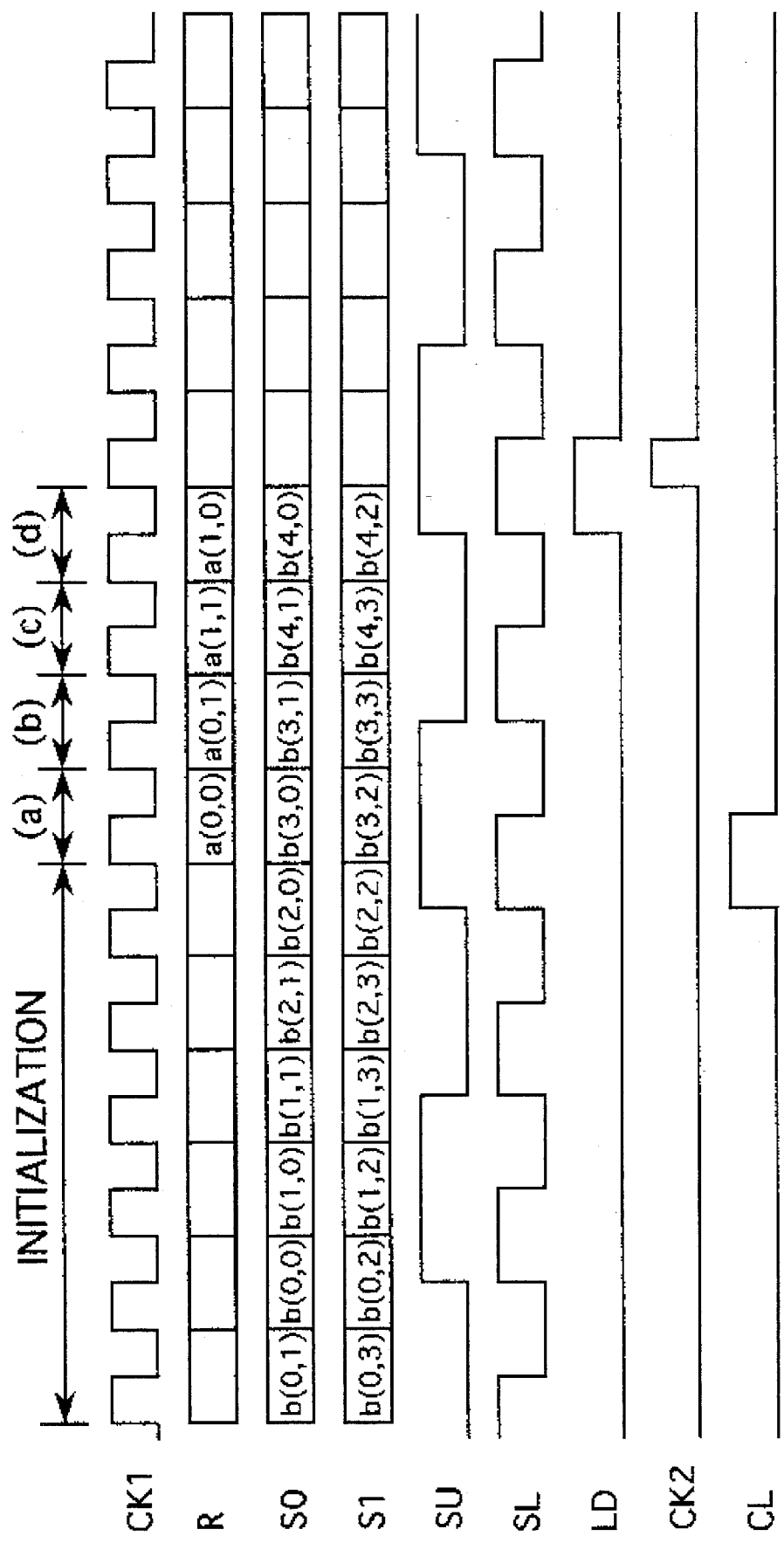
FIG. 12 is a timing chart showing clock and control signals generated by a timing control unit shown in FIG. 5 and data signals outputted by current block data outputting means and search window data outputting means shown in FIG. 5.
Figure 13:
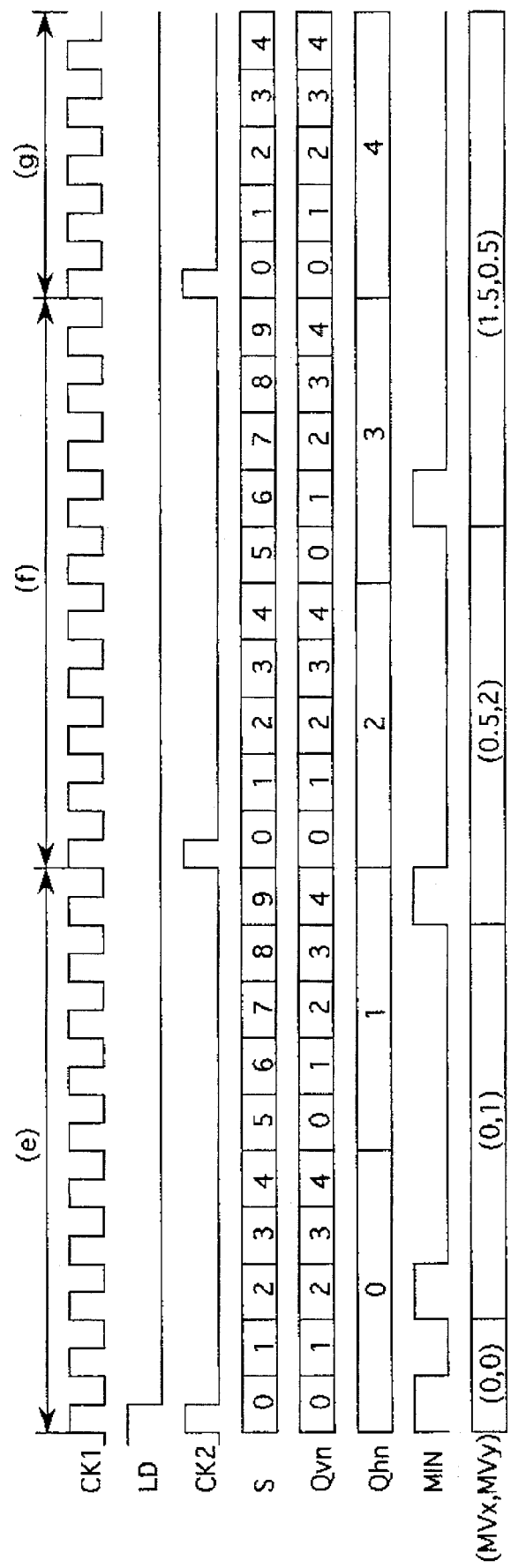
FIG. 13 is a timing chart showing signals inputted into and outputted from the motion vector detector shown in FIG. 5.
Figure 15A:
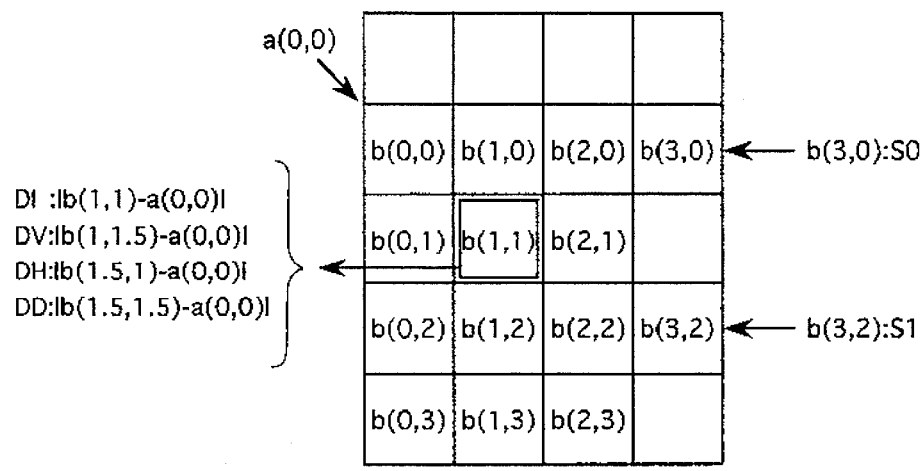
Figure 15B:
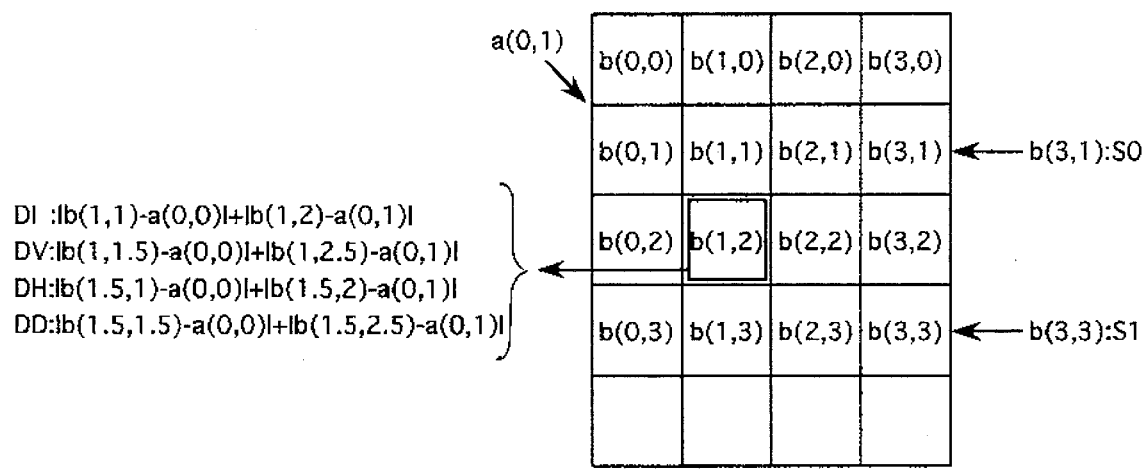

The timing control unit 500 is designed to supply a clock signal CK1, control signals SU, SL, LD, CK2, CL shown in FIGS. 12 and 13 to the shift registers 101–111, the processor elements 201–209, current block data outputting means 300, the search window data outputting means 400 and the motion vector detector 600 to control these elements and units.

The integer pel block calculating units 220 of the processor elements 201–209 collectively define integer pel block distortion calculating means for calculate integer pel block distortion values each indicative of a difference between the current block 50 and each of the integer pel blocks 61$i$ of the candidate blocks on the basis of the integer pel data of the search window 60 held by said search window data receiving and holding means and the integer pel data of the current block 50 outputted from the current block data outputting means 300. The integer pel block distortion calculating units 220 is operative to calculate and output integer pel block local distortion groups, respectively, each constituted M×N local distortion values, each local distortion values of each of the integer pel block local distortion groups being indicative of a difference between each integer pel of each of the integer pel blocks 61$i$ and each integer pel of said current block 50 corresponding in position to each other, and the integer pel block distortion values being calculated on the basis of the local integer pel block local distortion groups, respectively.

The first, second and third half-pel block calculating units 230, 240 and 250 of the processor elements 201–209 collectively define half-pel block distortion calculating means for calculating half-pel block distortion values each indicative of a difference between the current block 50 and each of the half-pel blocks 61$v$, 61$h$ and 61$d$ on the basis of the local distortion values calculated by the integer pel block distortion calculating means. The motion vector detector 600 serves as minimum distortion detecting means for detecting a minimum distortion value from among the integer pel distortion values and half-pel distortion values to specify a candidate block most similar to the current block 50.

The half-pel distortion values consist of first half-pel distortion values each indicative of a difference between the current block 50 and each of the first half-pel blocks 61$v$ of the candidate blocks, second distortion values each indicative of a difference between the current block 50 and each of the second half-pel blocks 61$h$ of the candidate blocks, and third distortion values each indicative of a difference between the current block 50 and each of the third half-pel blocks 61$d$ of the candidate blocks.

The integer pel block distortion calculating units 220 are adapted to calculate the integer pel block distortion values based on (K–M+1)×(H–N+1) of the integer pel blocks, respectively, and as a consequence the number of the integer pel block calculating units 220 is (K–M+1)×(H–N+1). The first half-pel block distortion calculating units 230 are adapted to calculate the first half-pel block distortion values based on (K–M+1)×(H–N) of the first half-pel blocks, respectively, and as a consequence the number of the first half-pel block calculating units 230 is (K–M+1)×(H–N). The second half-pel block distortion calculating units 240 are adapted to calculate the second half-pel block distortion values based on (K–M)×(H–N+1) of the second half-pel blocks, respectively, and as a consequence the number of the second half-pel block distortion calculating units 240 is (K–M)×(H–N+1). The third half-pel block distortion calculating units 250 are adapted to calculate the third half-pel block distortion values based on (K–M)×(H–N) of the third half-pel blocks, respectively, and as a consequence the number of the third half-pel block distortion calculating units 250 is (K–M)×(H–N). Although each of the processor elements 201–209 is shown in FIG. 7 as comprising the integer pel block calculating unit 220, the first half-pel block calculating unit 230, the second half-pel block calculating units 240 and the third half-pel block calculating unit 250 and having the same constitution, the processor elements 201 to 209 may be different in constitution from one another. More specifically, the second and third half-pel block distortion calculating units 240 and 250, the selectors 263 and 264, and the D flip-flops 273 and 274 may be not included in the processor elements 203 and 206. The first and third half-pel block distortion calculating units 230 and 250, the selectors 262 and 264, the D flip-flops 272 and 274 may be not included in the processor elements 207 and 208. The first, second and third half-pel block distortion calculating units 230, 240 and 250, the selector 262 to 264, the D flip-flops 272 to 274 may be not included in the processor element 209.

As shown in FIG. 7, each of the integer pel block distortion calculating units 220 comprises a local distortion value calculating device 221 for calculating each of the aforesaid local integer pel block distortion groups, and an integer pel block distortion calculating devices 225 for calculating each of the integer pel block distortion values on the basis of each of the local integer pel block distortion groups. The first half-pel block calculating units 230 comprise local distortion value calculating devices 231 for calculating first half-pel block local distortion groups, respectively. Each of the first half-pel block distortion groups is constituted by local distortion vales each indicative of a difference between each half-pel data of each of the first half-pel blocks 61$v$ and each integer pel data of the current block 50 corresponding to each other in position. The first half-pel block distortion calculating units 230 further comprise half-pel block distortion calculating devices 235 for calculating the first half-pel block distortion values on the basis of the first half-pel block local distortion groups, respectively.

The second half-pel block distortion calculating units 240 comprise local distortion value calculating devices 241 for calculating second half-pel block local distortion groups, respectively. Each of the second half-pel block local distortion groups is constituted by local distortion vales each indicative of a difference between each half-pel data of each of the second half-pel blocks 61$h$ and each integer pel data of the current block 50 corresponding to each other in position. The second half-pel block distortion calculating units 240 further comprise half-pel block distortion calculating devices 245 for calculating the second half-pel block distortion values on the basis of the second half-pel block local distortion groups, respectively.

The third half-pel block distortion calculating units 250 comprise local distortion value calculating devices 251 for calculating third half-pel block local distortion groups, respectively. Each of the third half-pel block local distortion groups is constituted by local distortion vales each indicative of a difference between each half-pel data of each of the third half-pel blocks 61d and each integer pel data of the current block 50 corresponding to each other in position. The third half-pel block distortion calculating units 250 further comprise half-pel block distortion calculating devices 255 for calculating the third half-pel block distortion values on the basis of the third half-pel block local distortion groups, respectively.

The local distortion value calculating device 231 of each of the first half-pel block calculating units 230 is designed to receive the local distortion values from the local distortion value calculating devices 221 of two of the integer pel block calculating units 200 which respectively calculate the integer pel block distortions based on the integer pel blocks 61i deviated by one-pel pitch from each other in parallel relationship to the vertical line in the search window 60. Each of the first half-pel block local distortion groups is calculated on the basis of the local distortion values received by the local distortion value calculating device 231 of each of the first half-pel block distortion calculating units 230.

It is assumed that each of the integer pel block distortion values between the current block 50 and each of the integer pel blocks 61i is indicated by D(k, h) defined as follows:

$$D(k,h) = \sum_{m=0}^{M-1}\sum_{n=0}^{N-1} \|b(m+k,n+h) - a(m,n)\| = \sum_{m=0}^{M-1}\sum_{n=0}^{N-1} \|d(k,h)\| \quad (E0)$$

Each of the half pel block distortion values between the current block 50 and each of the first half-pel blocks 61v is indicated by D(k, h+0.5) defined as follows:

$$D(k,h+0.5) = \quad (E1)$$

$$\sum_{m=0}^{M-1}\sum_{n=0}^{N-1} \|[b(k+m,h+n)+b(k+m,h+n+1)]/2 -$$

$$a(m,n)\| \sum_{m=0}^{M-1}\sum_{n=0}^{N-1} \|d(k,h)+d(k,h+1)/2\|$$

As will be understood from the equation (E1), each of the first half-pel block distortion values can be calculated by summing up the local distortion values each based on each of the integer pels deviated by one-pel pitch from each other in a parallel relationship to the vertical line in the search window 60.

The local distortion value calculating device 241 of each of the second half-pel block distortion calculating units 240 is designed to receive the local distortion values from the local distortion value calculating devices 221 of two of the integer pel block calculating units 220 which respectively calculate the integer pel block distortions based on the integer pel blocks 61i deviated by one-pel pitch from each other in parallel relationship to the horizontal line in the search window 60. Each of the second half-pel block local distortion groups is calculated on the basis of the local distortion values received by the local distortion value calculating device 241 of each of the second half-pel block distortion calculating units 240.

Each of the half pel block distortion values between the current block 50 and each of the second half-pel blocks 61h is indicated by D(k+0.5, h) defined as follows:

$$D(k,h+0.5,h) = \quad (E2)$$

$$\sum_{m=0}^{M-1}\sum_{n=0}^{N-1} \|[b(k+m+1,h+n) +$$

$$b(k+m+1,h+n)]/2 -$$

$$a(m,n)\| = \sum_{m=0}^{M-1}\sum_{n=0}^{N-1} \|d(k,h)+d(k,h+1)/2\|$$

As will be understood from the equation (E2), each of the second half-pel block distortion values can be calculated by summing up the local distortion values each based on each of the integer pels deviated by one-pel pitch from each other in a parallel relationship to the horizontal line in the search window 60.

The local distortion value calculating device 251 of each of the third half-pel block calculating units 250 is designed to receive the local distortion values from the local distortion value calculating devices 241 of two of the second half-pel block distortion calculating units 240 which respectively calculate the second half-pel block distortion values based on the second half-pel blocks 61h deviated by one-pel pitch from each other in parallel relationship to the horizontal line in the search window 60, each of the third half-pel block local distortion groups being calculated on the basis of the local distortion values received by the local distortion value calculating device 251 of each of the third half-pel block distortion calculating units 250. Alternatively, the local distortion value calculating device 251 of each of the third half-pel block calculating units 250 may be designed to receive the local distortion values from the local distortion value calculating devices 23 1 of two of the first half-pel block calculating units 230 which respectively calculate the first half-pel block distortion values based on the first half-pel blocks 61v deviated by one-pel pitch from each other in parallel relationship to the vertical line in the search window 60, each of the third half-pel block distortion groups being calculated on the basis of the local distortion values received by the local distortion value calculating device 251 of each of the third-half-pel block distortion calculating units 250.

The half pel block distortion value between the current block 50 and the third half-pel block 61d is indicated by D(k+0.5, h+0.5) defined as follows:

$$D(k+0.5,h+0.5) = \quad (E3)$$

$$\sum_{m=0}^{M-1}\sum_{n=0}^{N-1} \|[b(k+m,h+n)+b(k+m+1,h+$$

$$nb(k+m,h+n+1)+b(k+m+1,h+n+1)]/4 -$$

$$a(m,n)\| = \sum_{m=0}^{M-1}\sum_{n=0}^{N-1} \|\{[d(k,h)+d(k+1,h)]/2 +$$

$$[d(k,h+1)+d(k+1,h+1)]/2\}/2\|$$

$$\sum_{m=0}^{M-1}\sum_{n=0}^{N-1} \|\{[d(k,h)+d(k,h+1)]/2 +$$

$$[d(k+1,h)+d(k+1,h+1)]/2\}/2\|$$

As will be understood from the equation (E3), each of the third half-pel block distortion values can be calculated by summing up the local distortion values each based on each of the integer pels deviated by one-pel pitch from each other in a parallel relationship to the horizontal or vertical line in the search window 60.

The function of the units and devices included in the processor elements 201–209 will be described hereinlater in detail.

Each of the shift registers 112 to 120 comprises a selector 211 and a D flip-flop 212. The selector 211 has first, second third data input terminals A, B and C, first and second signal input terminals S0 and S1, and a data output terminal Y. When the first and second signal input terminals S0 and S1 of the selector 211 receive signals representative of "0" and "0", respectively, data on the first data input terminal A of the selector 211 are selected and outputted through the data output terminal Y of the selector 211. When the first and second signal input terminals S0 and S1 of the selector 211 receive signals representative of "1" and "0", respectively, data on the second data input terminal B of the selector 211 are selected and outputted through the data output terminal Y of the selector 211. When the first and second signal input terminals S0 and S1 of the selector 211 receive signals representative of "0" and "1" or "1" and "1", respectively, data on the third data input terminal C of the selector 212 are selected and outputted through the data output terminal Y of the selector 211.

The D flip-flop 212 has data input terminal 212a, a signal input terminal 212b and a data output terminal 212c. When the D flip-flop 212 detects a rising edge of a pulse received by the signal input terminal 212b, i.e., when a signal received by the signal input terminal 212b of the D flip-flop 212 is changed "0" to "1", the D flip-flop 212 latches, on the data output terminal 212c, data received at that time by the data output terminal 212a.

Figure 8:
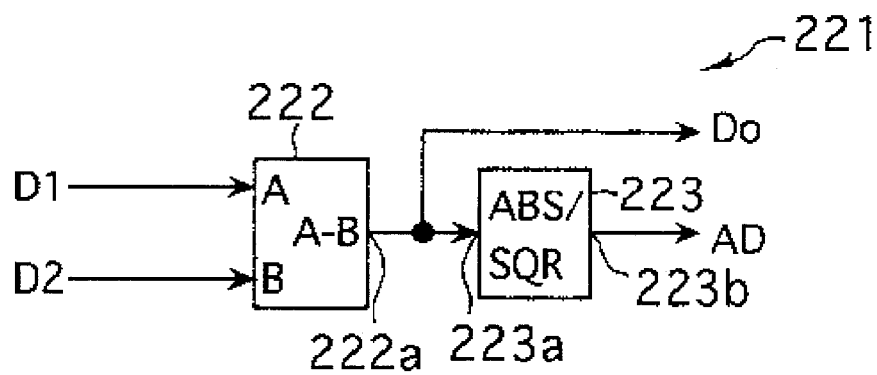
FIG. 8 is a block diagram showing a local distortion calculating device included in an integer pel block distortion calculating unit shown in FIG. 7.

The local distortion value calculating device 221 has data input terminals D1 and D2, and data output terminals AD and Do. More specifically, the local distortion value calculating device 221 is shown in FIG. 8 as comprising a subtracter 222 having a first data input terminal A, a second data input terminal B and a data output terminal 222a, and a positive value transducer 223 having a data input terminal 223a and a data output terminal 223b. The first data input terminals A and B of the subtracter 222 are electrically connected to the data input terminal D1 and D2, respectively, of the local distortion value calculating device 221. The data output terminal 222a of the subtracter 222 is electrically connected to the data output terminal Do of the local distortion value calculating device 221. The data input terminal 223a of the positive value transducer 223 is electrically connected to the data output terminal 222a of the subtracter 222, while the data output terminal 223b of the positive value transducer 223 is electrically connected to the data output terminal AD of the local distortion value calculating device 221. The subtracter 222 is adapted to subtract data received by the second data input terminal B from data received by the first data input terminal A and output the subtracted data from the data output terminal 222a. The positive value transducer 223 is an absolute value transducer or a square multiplier. If the absolute value transducer, the positive value transducer 223 converts data on the data input terminal 223a to positive value data by means of absolute value arithmetic and outputs the converted data through the data output terminal 223b. If the square multiplier, the positive value transducer 223 converts data on the data input terminal 223a to positive value data by means of square arithmetic and outputs the converted data through the data output terminal 223b.

Referring back to FIG. 7, the integer pel block distortion calculating device 225 comprises an adder 226 having a first data input terminal A, a second data input terminal B and a data output terminal 226a, and a D flip-flop 227 having a data input terminal 227a, a first signal input terminal 227b, a second signal input terminal 227c and a data output terminal 227d. The adder 226 is designed to add data on the second data input terminal B to data on the first data input terminal A and output the added data through the data output terminal 226a. When the D flip-flop 227 detects a low-to-high transition of a signal received by the first signal input terminal 227b, the D flip-flop latches, on the data output terminal 227d, data received at that time by the data input terminal 227a. When the D flip-flop 227 detects a low-to-high transition of a signal received by the second signal input terminal 227c, the D flip-flop 227 resets data on the data output terminal 227d to "0". The selector 26 1 has a first data input terminal A, a second data input terminal B, a signal input terminal S and a data output terminal Y. When the signal input terminal S of the selector 261 receives a signal representative of "0", data on the first data input terminal A of the selector 261 are selected and outputted through the data output terminal Y of the selector 261. When the signal input terminal S receives a signal representative of "1", data on the second data input terminal B of the selector 261 are selected and outputted through the data output terminal Y of the selector 261. The D flip-flop 271 has data input terminal 271a, a signal input terminal 271b and a data output terminal 271c. When the D flip-flop 271 detects a rising edge of a pulse received by the signal input terminal 271b, the D flip-flop 271 latches, on the data output terminal 271c, data received at that time by the data output terminal 271a.

Figure 9:
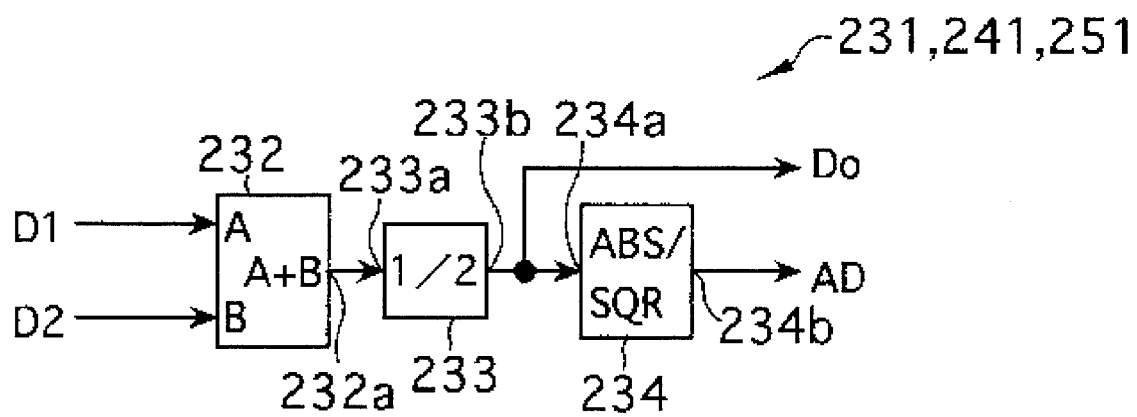
FIG. 9 is a block diagram showing a local distortion calculating device partially forming each of first, second and third half-pel block distortion calculating units shown in FIG. 7.

The local distortion value calculating device 231 has data input terminals D1 and D2, and data output terminals AD and Do. More specifically, the local distortion value calculating device 231 is shown in FIG. 9 as comprising an adder 232 having a first data input terminal A, a second data input terminal B and a data output terminal 232a, a ½ multiplier 233 having a data input terminal 233a and a data output terminal 233b, and a positive value transducer 234 having a data input terminal 234a and a data output terminal 234b. The first and second data input terminals A and B of the adder 232 are electrically connected to the data input terminals D1 and D2 of the local distortion calculating device 231, respectively. The data input terminal 233a of the multiplier 233 is electrically connected to the data output terminal 232a of the adder 232, while the data output terminal 233b of the positive value transducer 234 is electrically connected to the data output terminal Do of the local distortion value calculating device 231. The data input terminal 234a of the positive value transducer 234 is electrically connected to the data output terminal 233b of the multiplier 233, while the data output terminal 234b of the positive value transducer 234 is electrically connected to the data output terminal AD of the local distortion value calculating device 231. The adder 232 is designed to add data received by the first input terminal A to data received by the second input terminal B and output the added data through the data output terminal 232a. The ½ multiplier 233 is designed to multiply data on the data input terminal 233a by "½" and outputs the multiplied data through the data output terminal 233b. The positive value transducer 234 is an absolute value transducer or a square multiplier. If the absolute value transducer, the positive value transducer 234 converts data on the data input terminal 234a to positive value data by means of absolute value arithmetic and outputs the converted data through the data output terminal 234b. If the square multiplier, the positive value transducer 234 converts data on the data input terminal 234a to positive value data by means of square arithmetic and outputs the converted data through the data output terminal 234*b*.

Referring back to FIG. 7, the half-pel block distortion calculating device 235 comprises an adder 236 having a first data input terminal A, a second input terminal B and a data output terminal 236*a*, and a D flip-flop 237 having a data input terminal 237*a*, a first signal input terminal 237*b*, a second signal input terminal 237*c* and a data output terminal 237*d*. The adder 236 is designed to add data on the second data input terminal B to data on the first data input terminal A and output the added data through the data output terminal 236*a*. When the D flip-flop 237 detects a low-to-high transition of a signal received by the first signal input terminal 237*b*, the D flip-flop 237 latches, on the data output terminal 237*d*, data received at that time by the data input terminal 237*a*. When the D flip-flop 237 detects a low-to-high transition of a signal received by the second signal input terminal 237*c*, the D flip-flop 237 resets data on the data output terminal 237*d* to "0".

Similarly to the selector 261, the selector 262 has a first data input terminal A, a second data input terminal B, a signal input terminal S and a data output terminal Y. When the signal input terminal S of the selector 262 receives a signal representative of "0", data on the first data input terminal A of the selector 262 are selected and outputted through the data output terminal Y of the selector 262. When the signal input terminal S receives a signal representative of "1", data on the second data input terminal B of the selector 262 are selected and outputted through the data output terminal Y of the selector 262. Similarly to the D flip-flop 271, the D flip-flop 272 has data input terminal 272*a*, a signal input terminal 272*b* and a data output terminal 272*c*. When the D flip-flop 272 detects a rising edge of a pulse received by the signal input terminal 272*b*, the D flip-flop 272 latches, on the data output terminal 272*c*, data received at that time by the data output terminal 272*a*.

The local distortion value calculating device 241 comprises the same elements as the local distortion value calculating devices 231 comprises. For this reason, the explanation of the local distortion value calculating devices 241 is omitted here in order to avoid the repeated recitation.

Similarly to the half-pel block distortion calculating device 235, the half-pel block distortion calculating devices 245 is shown in FIG. 7 as comprising an adder 246 having a first data input terminal A, a second input terminal B and a data output terminal 246*a*, and a D flip-flop 247 having a data input terminal 247*a*, a first signal input terminal 247*b*, a second signal input terminal 247*c* and a data output terminal 247*d*. The adder 246 is designed to add data on the second data input terminal B to data on the first data input terminal A and output the added data through the data output terminal 246*a*. When the D flip-flop 247 detects a low-to-high transition of a signal received by the first signal input terminal 247*b*, the D flip-flop 247 latches, on the data output terminal 247*d*, data received at that time by the data input terminal 247*a*. When the D flip-flop 247 detects a low-to-high transition of a signal received by the second signal input terminal 247*c*, the D flip-flop 247 resets data on the data output terminal 247*d* to "0". The selector 263 has a first data input terminal A, a second data input terminal B, a signal input terminal S and a data output terminal Y. When the signal input terminal S of the selector 263 receives a signal representative of "0", data on the first data input terminal A of the selector 263 are selected and outputted through the data output terminal Y of the selector 263. When the signal input terminal S receives a signal representative of "1", data on the second data input terminal B of the selector 263 are selected and outputted through the data output terminal Y of the selector 263. The D flip-flop 273 has data input terminal 273*a*, a signal input terminal 273*b* and a data output terminal 273*c*. When the D flip-flop 273 detects a rising edge of a pulse received by the signal input terminal 273*b*, the D flip-flop 273 latches, on the data output terminal 273*c*, data received at that time by the data output terminal 273*a*.

The local distortion value calculating devices 251 comprises the same elements as the local distortion value calculating devices 231 comprises. For this reason, the explanation of the local distortion value calculating devices 251 is omitted here in order to avoid the repeated recitation.

Similarly to the half-pel block distortion calculating devices 235 and 245, the half-pel block distortion calculating devices 255 is shown in FIG. 7 as comprising an adder 256 having a first data input terminal A, a second input terminal B and a data output terminal 256*a*, and a D flip-flop 257 having a data input terminal 257*a*, a first signal input terminal 257*b*, a second signal input terminal 257*c* and a data output terminal 257*d*. The adder 256 is designed to add data on the second data input terminal B to data on the first data input terminal A and output the added data through the data output terminal 256*a*. When the D flip-flop 257 detects a low-to-high transition of a signal received by the first signal input terminal 257*b*, the D flip-flop 257 latches, on the data output terminal 257*d*, data received at that time by the data input terminal 257*a*. When the D flip-flop 257 detects a low-to-high transition of a signal received by the second signal input terminal 257*c*, the D flip-flop 257 resets data on the data output terminal 257*d* to "0". The selector 264 has a first data input terminal A, a second data input terminal B, a signal input terminal S and a data output terminal Y. When the signal input terminal S of the selector 264 receives a signal representative of "0", data on the first data input terminal A of the selector 264 are selected and outputted through the data output terminal Y of the selector 264. When the signal input terminal S receives a signal representative of "1", data on the second data input terminal B of the selector 264 are selected and outputted through the data output terminal Y of the selector 264. The D flip-flop 274 has data input terminal 274*a*, a signal input terminal 274*b* and a data output terminal 274*c*. When the D flip-flop 274 detects a rising edge of a pulse received by the signal input terminal 274*b*, the D flip-flop 274 latches, on the data output terminal 274*c*, data received at that time by the data output terminal 274*a*.

Referring back to FIG. 5, each of the shift registers 104, 105, 107 and 108 comprises a D flip-flop having a data input terminal, a signal input terminal and a data output terminal and operated similarly to the D flip-flop 212 shown in FIG. 7. The signal input terminal of the D flip-flop of each of the shift registers 104, 105, 107 and 108 is electrically connected to the timing control unit 500 to receive the clock signal CK1. Each of the shift registers 101–103, 106, 108–111 comprises a D flip-flop having a data input terminal, a signal input terminal and a data output terminal and operated similarly to the D flip-flop 212 shown in FIG. 7. Each of the shift registers 101–103, 106, 108–111 further comprises a selector similar to the selector 211 shown in FIG. 211. Note that it is more desirable that the selector of each of the shift registers 101–103, 106, 108–111 is a two-input type selector.

The connection between the shift registers 101–111 and processor elements 201–209 including the shift registers 112–120, respectively, will be described hereinlater in detail.

The first data input terminal A of the selector 211 of the present processor element is electrically connected to the data output terminal 212c of the upper side processor element in FIG. 5 through the data input terminal YDi of the present processor element and the data output terminal YDo of the upper side processor element. If there is no upper side processor element, the first data input terminal A of the selector 211 of the present processor element is electrically connected to a data output terminal of the upper side shift register in FIG. 5 through the data input terminal YDi of the present processor element. The second data input terminal B of the selector 211 of the present processor element is electrically connected to the data output terminal 212c of the lower side processor element in FIG. 5 through the data input terminal YUi of the present processor element and the data output terminal YUo of the lower side processor element. If there is no lower side processor element, the second data input terminal B of the selector 211 of the present processor element is electrically connected to the data output terminal of the lower side shift register in FIG. 7 through the data input terminal YUi of the present processor element. The third data input terminal C of the selector 211 of the present processor element is electrically connected to the data output terminal 212c of the right side processor element in FIG. 5 through the data input terminal YLi of the present processor element and the data output terminal YLo of the right side processor element. If there is no right side processor element, the second data input terminal B of the selector 211 of the present processor element is electrically connected to a data output terminal of the right side shift register shown in FIG. 5 through the data input terminal YLi of the present processor element. The first signal input terminal S0 is electrically connected to the timing control unit 500 to receive the control signal SU. Similarly, the second signal input terminal S1 is electrically connected to the timing control unit 500 to receive the control signal SL.

The data input terminal 212a of the D flip-flop 212 of the present processor element is electrically connected to the data output terminal Y of the selector 211 of the present processor element. The signal input terminal 212b of the D flip-flop 212 of the present processor element is electrically connected to the timing control unit 500 to receive the clock signal CK1.

The data input terminal D1 of the local distortion value calculating device 221 of the present processor element is electrically connected to the data output terminal 212c of the D flip-flop 212 of the present processor element, while the data input terminal D2 of the local distortion value calculating device 221 of the present processor element is electrically connected to the current block data outputting means 300 through data input terminal X of the present processor element to receive the integer pel data of the current block 50.

The first input terminal A of the adder 226 of the present processor element is electrically connected to the data output terminal 223b of the data output terminal AD of the local distortion value calculating device 221 of the present processor element, while the second input terminal B of the adder 226 of the present processor element is electrically connected to the data output terminal 227d of the D flip-flop 227 of the present processor element. The data input terminal 227a of the D flip-flop 227 of the present processor element is electrically connected to the data output terminal 226a of the adder 226 of the present processor element. The first signal input terminal 227b of the D flip-flop 227 is electrically connected to the timing control unit 500 to receive the clock signal CK1. Likewise, the second signal input terminal 227c of the D flip-flop 227 is electrically connected to the timing control unit 500 to receive the control signal CL.

The first data input terminal A of the selector 261 of the present processor element is electrically connected to the data output terminal 271c of the D flip-flop 271 of the right side processor element in FIG. 5 through the data input terminal DIi of the present processor element and the data output terminal DIo of the right side processor element, while the second data input terminal B of the selector 261 of the present processor element is electrically connected to the data output terminal 227d of the D flip-flop 227 of the present processor element. The data input terminal 271a of the D flip-flop 271 is electrically connected to the data output terminal Y of the selector 261. The signal input terminal 271b of the D flip-flop 271 is electrically connected to the timing control unit 500 to receive the control signal CK2.

The data input terminal D1 of the local distortion value calculating device 231 of the present processor element is electrically connected to the data output terminal Do of the local distortion value calculating device 221 of the present processor element. The data input terminal D2 of the local distortion value calculating device 231 of the present processor element is electrically connected to the data output terminal Do of the local distortion value calculating device 221 of the lower side processor element in FIG. 5 through the data input terminal HUi of the present processor element and the data output terminal HUo of the lower side processor element. If there is no lower side processor element, the data input terminal D2 of the local distortion value calculating device 231 of the present processor element is electrically connected to the data output terminal of the lower side shift register in FIG. 5 through the data input terminal HUi of the present processor element. The first data input terminal A of the adder 236 of the present processor element is electrically connected to the first data output terminal AD of the local distortion value calculating device 231 of the present processor element, while the second data input terminal B of the adder 236 of the present processor element is electrically connected to the data output terminal 237b of the D flip-flop 237 of the present processor element. The data input terminal 237a of the D flip-flop 237 of the present processor element is electrically connected to the data output terminal 236a of the adder 236 of the present processor element. The first signal input terminal 237b of the D flip-flop 237 of the present processor element is electrically connected to the timing control unit 500 to receive the clock signal CK1. Similarly, the second signal input terminal 237c of the D flip-flop 237 of the present processor element is electrically connected to timing control unit 500 to receive the control signal CL.

The first data input terminal A of the selector 262 of the present processor element is electrically connected to the data output terminal 272c of the D flip-flop 272 of the right side processor element in FIG. 5 through the data input terminal DVi of the present processor element and the data output terminal DVo of the right side processor element, while the second data input terminal B of the selector 262 of the present processor element is electrically connected to the data output terminal 237d of the D flip-flop 237 of the present processor element. The signal input terminal S of the selector 262 of the present processor element is electrically connected to the timing control unit 500 to receive the control signal LD. The data input terminal 272a of the D flip-flop 272 of the present processor element is electrically connected to the data output terminal Y of the selector 262 of the present processor element. The signal input terminal 272b of the D flip-flop 272 of the present processor element is electrically connected to the timing control unit 500 to receive the control signal CK2.

The data input terminal D1 of the local distortion value calculating device 241 of the present processor element is electrically connected to the data output terminal Do of the local distortion value calculating device 221 of the present processor element, while the data input terminal D2 of the local distortion value calculating device 241 of the present processor element is electrically connected to the data output terminal Do of the local distortion value calculating device 221 of the right side processor element in FIG. 5 through the data input terminal HLi of the present processor element and the data output terminal HLo of the right side processor element. If there is no right side processor element, the data input terminal D2 of the local distortion value calculating device 241 is electrically connected to the data output terminal of the right side shift register in FIG. 5 through the data input terminal HLi of the present processor element. The first data input terminal A of the adder 246 of the present processor element is electrically connected to the data output terminal AD of the local distortion value calculating device 241 of the present processor element, while the second data input terminal B of the adder 246 of the present processor element is electrically connected to the data output terminal 247d of the D flip-flop 247 of the present processor element. The data input terminal 247a of the D flip-flop 247 of the present processor element is electrically connected to the data output terminal 246a of the adder 246 of the present processor element. The first signal input terminal 247b of the D flip-flop 247 of the present processor element is electrically connected to the timing control unit 500 to receive the clock signal CK1. Similarly, the second signal input terminal 247c of the D flip-flop 247 of the present processor element is electrically connected to the timing control unit 500 to receive the control signal CL.

The first data input terminal A of the selector 263 of the present processor element is electrically connected to the data output terminal 273c of the D flip-flop 273 of the right side processor element in FIG. 5 through the data input terminal DHi of the present processor element and the data output terminal DHo of the right side processor element, while the second data input terminal B of the selector 263 of the present processor element is electrically connected to the data output terminal 247d of the D flip-flop 247 of the present processor element. The signal input terminal S of the selector 263 of the present processor element is electrically connected to the timing control unit 500 to receive the control signal LD. The data input terminal 273a of the D flip-flop 273 of the present processor element is electrically connected to the data output terminal Y of the selector 263. The signal input terminal 273b of the D flip-flop 273 of the present processor element is electrically connected to the timing control unit 500 to receive the control signal CK2.

The data input terminal D1 of the local distortion value calculating device 251 of the present processor element is electrically connected to the data output terminal Do of the local distortion value calculating device 241 of the right side processor element in FIG. 5 through the data input terminal HXi of the present processor element and the data output terminal HXo of the right side processor element. If there is no right side processor element, the data input terminal D1 of the local distortion value calculating device 251 of the present processor element is electrically connected to the data output terminal of the right side shin register in FIG. 5 through the data input terminal HXi of the present processor element. The data input terminal D2 of the local distortion value calculating device 251 of the present processor element is electrically connected to the data output terminal Do of the local distortion value calculating device 241 of the present processor element.

The first data input terminal A of the adder 256 of the present processor element is electrically connected to the data output terminal AD of the local distortion value calculating device 251 of the present processor element, while the second data input terminal B of the adder 256 of the present processor element is electrically connected to the data output terminal 257d of the D flip-flop 257 of the present processor element. The data input terminal 257a of the D flip-flop 257 of the present processor element is electrically connected to the data output terminal 256a of the adder 256 of the present processor element. The first signal input terminal 257b of the D flip-flop 257 of the present processor element is electrically connected to the timing control unit 500 to receive the clock signal CK1. Similarly, the second signal input terminal 257c of the D flip-flop 257 of the present processor element is electrically connected to the timing control unit 500 to receive the control signal CL.

The first data input terminal A of the selector 264 of the present processor element is electrically connected to the data output terminal 274c of the D flip-flop 274 of the right side processor element in FIG. 5 through the data input terminal DDi of the present processor element and the data output terminal DDo of the right side processor element, while the second data input terminal B of the selector 264 of the present processor element is electrically connected to the data output terminal 257d of the D flip-flop 257 of the present processor element. The signal input terminal S of the selector 264 of the present processor element is electrically connected to the timing control unit 500 to receive the control signal LD. The data input terminal 274a of the D flip-flop 274 of the present processor element is electrically connected to the data output terminal Y of the selector 264. The signal input terminal 274b of the D flip-flop 274 of the present processor element is electrically connected to the timing control unit 500 to receive the control signal CK2.

Figures 10A, 10B:
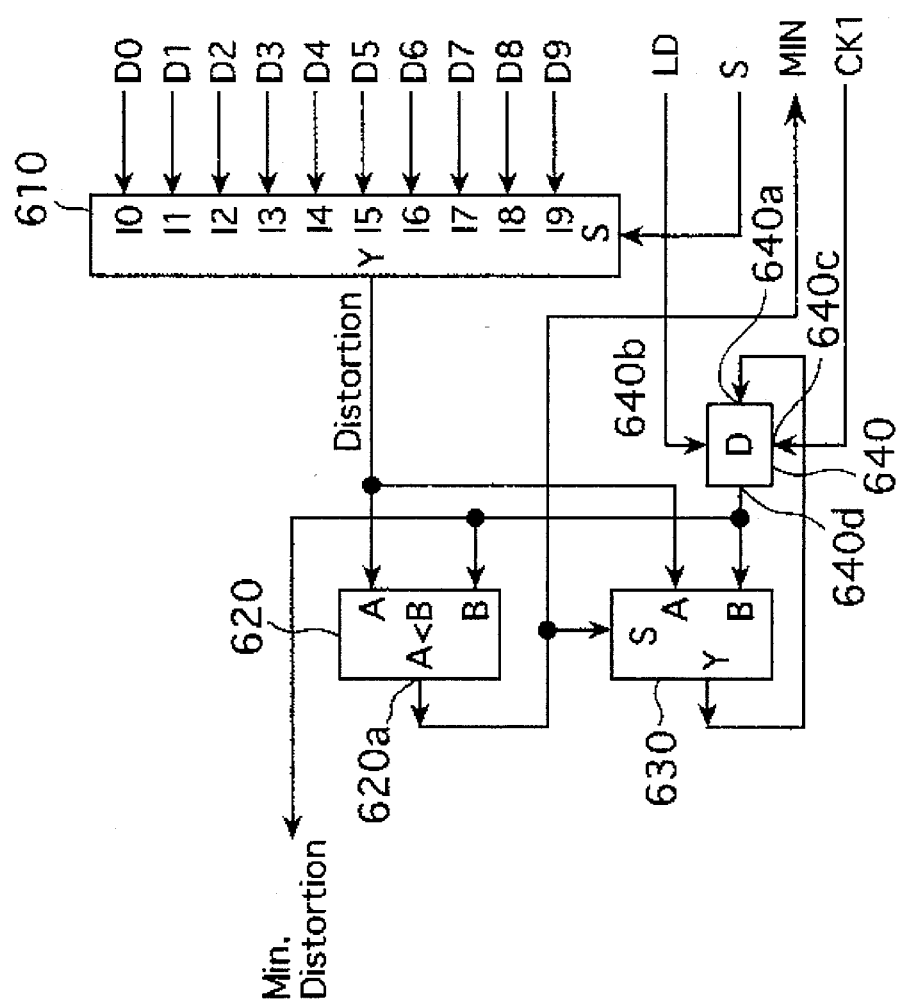
FIG. 10(b) is a table showing a turn of distortion values supplied to data input terminals of the motion vector detector shown in FIG. 10(a)
Figure 11:
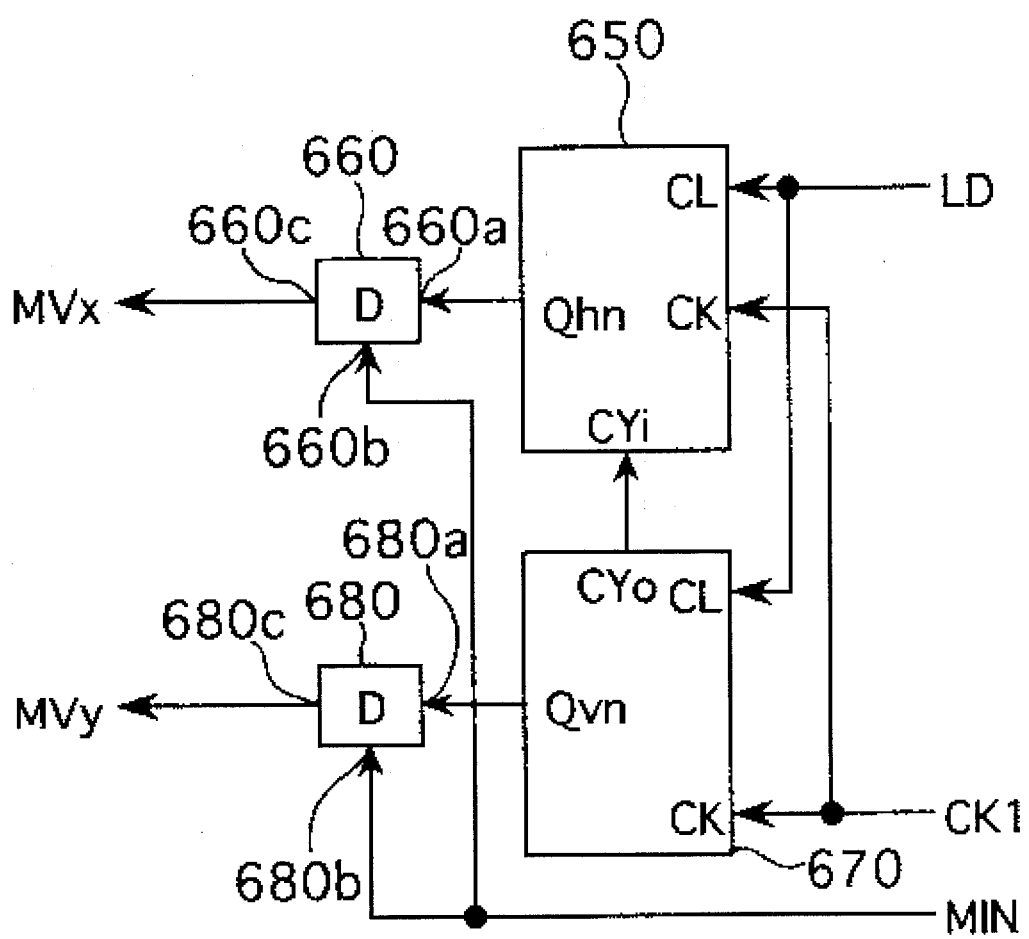
FIG. 11 is a block diagram partially showing the motion vector detector shown in FIG. 5.

The motion vector detector 600 is divided two parts shown in FIGS. 10(a) and 11, respectively. Referring to FIG. 10, the motion vector detector 600 comprises a selector 610, a comparator 620, a selector 630 and a D flip-flop 640, the selector 610 having data input terminals I0 to I9, a signal input terminal S and a data output terminal Y, the comparator 620 having a first data input terminal A, a second data input terminal B and a signal output terminal 620a, the selector 630 having a first data input terminal A, a second data input terminal B, a signal input terminal S and a data output terminal Y, and the D flip-flop 640 having a data input terminal 640a, a first signal input terminal 640b, a second signal input terminal 640c and a data output terminal 640d.

When the data input terminal S of the selector 610 receives signals representative of "0" to "9", the selector 610 is operated to output data of the input terminals I0 to I9, respectively, through the data output terminal Y.

The comparator 620 outputs a signal MIN through the signal output terminal 620a. The signal MIN is representative of "0" when the first data input terminal A of the comparator 620 receives data equal to and larger than data received by the second data input terminal B thereof. The signal MIN is representative of "1" when the first data input terminal A of the comparator 620 receives data is less than data received by the second data input terminal B thereof. The selector 630 outputs data received by the first data input terminal A thereof through the data output terminal Y thereof when the signal input terminal S of the selector 630 receives a signal representative of "1". The selector 630 outputs data received by the second data input terminal B thereof through the data output terminal Y thereof when the signal input terminal S of the selector 630 receives a signal representative of "0". When the D flip-flop 640 detects a low-to-high transition of a signal received by the second signal input terminal 640c, the D flip-flop 640 latches, on the data output terminal 640d, data received at that time by the data input terminal 640a. When the D flip-flop 227 detects a low-to-high transition of a signal received by the first signal input terminal 640b, the D flip-flop 640 sets all data of the data output terminal 640d to "1".

The data input terminals I0 to I9 of the selector 610 are electrically connected to the data output terminal 271c of the D flip-flop 271 of the processor element 201, the data output terminal 272c of the D flip-flop 272 of the processor element 201, the data output terminal 271c of the D flip-flop 271 of the processor element 204, the data output terminal 272c of the D flip-flop 272 of the processor element 204, the data output terminal 271c of the D flip-flop 271 of the processor element 207, the data output terminal 273c of the D flip-flop 273 of the processor element 201, the data output terminal 274c of the D flip-flop 274 of the processor element 201, the data output terminal 273c of the D flip-flop 273 of the processor element 204, the data output terminal 274c of the D flip-flop 274 of the processor element 204, and the data output terminal 273c of the D flip-flop 273 of the processor element 207, respectively.

The data input terminal A of the comparator 620 is electrically connected to the output data terminal Y of the selector 610, while the data input terminal B of the comparator 620 is electrically connected to the data output terminal 640d of the D flip-flop 640. Likewise, the data input terminal A of the selector 630 is electrically connected to the output data terminal Y of the selector 610, while the data input terminal B of the selector 630 is electrically connected to the data output terminal 640d of the D flip-flop 640. The signal input terminal S of the selector 630 is electrically connected to the signal output terminal 620a of the comparator 620. The data input terminal 640a of the D flip-flop 640 is electrically connected to the data output terminal Y of the selector 630. The signal input terminals 640b and 640c of the D flip-flop 640 are electrically connected to the timing control unit 500 to receive the control signals LD and the clock signal CK1, respectively.

In FIG. 11, the Motion vector detector 600 further comprises quinary counters 650 and 670, and D flip-flop 660 and 680, the quinary counter 650 having signal input terminals CL and CK, a count output terminal Qhn and a carry input terminal CYi, the quinary counter 670 having signal input terminals CL and CK, a count output terminal Qvn and a carry output terminal CYo, the D flip-flop 660 having a data input terminal 660a, a signal input terminal 660b and a data output terminal 660c, and the D flip-flop 680 having a data input terminal 680a, a signal input terminal 680b and a data output terminal 680c. The quinary counter 670 causes all outputs of the count output terminal Qvn thereof to be set to "0" when the signal input terminal CL thereof receives a signal representative of "1". After all outputs of the count output terminal Qhn of the quinary counter 670 are set to "0", the quinary counter 670 counts up from "0" in step with the clock signal CK1 received by the signal input terminal CK to output, through the count output terminal Qvn, the count number that reverts to "0" in the sequence of counting after reaching a maximum value of "4". The quinary counter 650 causes all outputs of the count output terminal Qhn thereof to be set to "0" when the signal input terminal CL thereof receives a signal representative of "1". After all outputs of the count output terminal Qhn of the quinary counter 650 are set to "0", the quinary counter 650 counts up from "0" in step with a carry signal received by the carry input terminal CYi to output, through the count output terminal Qhn, the count number that reverts to "0" in the sequence of counting after reaching a maximum value of "4".

When the D flip-flop 660 detects a rising edge of a pulse received by the signal input terminal 660b, i.e., when a signal received by the signal input terminal 660b of the D flip-flop 660 is changed "0" to "1", the D flip-flop 660 latches, on the data output terminal 660c, data received at that time by the data output terminal 660a. When, likewise, the D flip-flop 680 detects a rising edge of a pulse received by the signal input terminal 680b, i.e., when a signal received by the signal input terminal 680b of the D flip-flop 680 is changed "0" to "1", the D flip-flop 680 latches, on the data output terminal 680c, data received at that time by the data output terminal 680a.

The data input terminals CL and CK of the quinary counter 650 are electrically connected to the timing control unit 500 to receive the control signal LD and the clock signal CK1, respectively. Likewise, the data input terminals CL and CK of the quinary counter 670 are electrically connected to the timing control unit 500 to receive the control signal LD and the clock signal CK1, respectively. The carry input terminal CYi of the quinary counter 650 is electrically connected to the carry output terminal CYo of the quinary counter 670. The data input terminal 660a of the D flip-flop 660 is electrically connected to the count output terminal Qhn of the quinary counter 650. The data input terminal 680a of the D flip-flop 680 is electrically connected to the count output terminal Qvn of the quinary counter 670. The signal input terminal 660b and 680b of the D flip-flop 660 and 680 are electrically connected to the signal output terminal 620a of the comparator 620 to receive the signal MIN.

The operation of the motion estimation apparatus thus constructed will be described hereinafter with reference to FIGS. 12, 13, 14(a)–14(h) and 15(a)–15(d). A matrix array of squares shown in each of FIGS. 14(a)–14(h) and 15(a)–15(d) corresponds to a matrix array of shift registers 101–111 and the processor elements 201–207 shown in FIG. 5.

Firstly, the motion estimation apparatus is initialized between the first pulse and the sixth pulse of the clock signal CK1 shown in FIG. 12. When, more specifically, the first pulse of the clock signal CK1 is outputted from the timing control unit 500, the integer pel data b(0, 1) and b(0, 3) are supplied from the search window data outputting means 400 to the shift registers 105 and 107, respectively, as shown in FIG. 14a. When the second pulse of the clock signal CK1 is outputted from the timing control unit 500, the integer pel data b(0, 1) and b(0, 3) are shifted from the shift registers 105 and 107 to the shift registers 106 and 107, respectively, as shown in FIG. 14(b). At the same time, the integer pel data b(0, 0) and b(0, 2) are supplied from the search window data outputting means 400 to the shift registers 105 and 107, respectively. When the third pulse of the clock signal CK1 is outputted from the timing control unit 500, the integer pel data b(0, 0), b(0, 1), b(0, 2) and b(0, 3) are shifted from the shift registers 105, 106, 107 and 108 to the processor elements 203, 206 and 209, and the shirt registers 109, respectively, as shown in FIG. 14(c). At the same time, the integer pel data b( 1, 0) and b(1, 2) are supplied from the search window data outputting means 400 to the shift registers 105 and 107, respectively. When the fourth pulse of the clock signal CK1 is outputted from the timing control unit 500, the integer pel data b(0, 0), b(0, 1), b(0, 2), b(0, 3), b(1, 0) and b(1, 2) are shifted from the processor elements 203, 206 and 209, and the shift register 109 to the shift register, 103, the processor elements 203, 206 and 209, shift registers 104 and 106, respectively, as shown in FIG. 14(*d*). At the same time, the integer pel data b(1, 1) and b(1, 3) are supplied from the search window data outputting means 400 to the shift registers 105 and 107, respectively. When the fifth pulse of the clock signal CK1 is outputted from the timing control unit 500, the integer pel data b(0,0), b(0, 1) b(0, 2) b(0, 3), b(1, 0), b(1, 1) b(1, 2) and b(1, 3) are shifted from the shift register 103, processor elements 203, 206 and 209, shift registers 104–107 to the shift register 102, processor elements 202, 205 and 208, shift register 103, processor element 203, 206 and 209, respectively, as shown in FIG. 14(*e*). At the same time, the integer pel data b(2, 1) and b(2, 3) are supplied from the search window data outputting means 400 to the shift registers 105 and 107, respectively. When the sixth pulse of the clock signal CK1 is outputted from the timing control unit 500, the integer pel data b(0, 0), b(0, 1), b(0, 2), b(03), b(1, 0), b(1, 1), b(1, 2), b(1, 3) b(2, 1) and b(2, 3) are shifted from the shift register 102, processor elements 202, 205 and 208, shift register 103, processor elements 203, 206 and 209, shift registers 105 and 107 to the processor elements 202, 205 and 208, shift register 110, processor elements 203, 206 and 209, shift registers 109, 106 and 108, respectively, as shown in FIG. 14(*f*). At the same time, the integer pel data b(2, 0) and b(2, 2) are supplied from the search window data outputting means 400 to the shift registers 105 and 107, respectively.

When the seventh pulse of the CK1 is outputted from the timing control unit 500, the integer pel data b(0, 0), b(0, 1), b(0, 2), b(0, 3), b(1, 0), b(1, 1), b(1, 2) b(1, 3), b(2, 0), b(2, 1), b(2, 2), b(2, 3) are shifted from the processor elements 202, 205 and 208, shift register 110, processor elements 203, 206 and 209, shift registers 109 and 105–108 to the processor elements 201, 204 and 207, shift register 111, processor elements 202, 205 and 208, shift register 110, processor element 203, 206 and 209, and shift register 109, respectively, as shown in FIG. 15(*a*). At the same time, the integer pel data b(3, 0) and b(3, 2) are supplied from the search window data outputting means 400 to the shift registers 105 and 107, respectively. On the other hand, the integer pel data a(0, 0) of the current block 50 are supplied from the current block data outputting means 300 to each of the processor elements 201–209 when the seventh pulse of the CK1 is outputted from the timing control unit 500.

During the period (a) shown in FIG. 12, is calculated local distortion values by the local distortion value calculating devices 221, 231, 251 and 241 each of the processor elements 201–209, and is subsequently outputted the sum of the calculated local distortion values from each of the data output terminals 227*d*, 237*d*, 247*d* and 257*d* of the D flip-flops 227, 237, 247 and 257 of each of the processor elements 201–209. Assuming that outputs of the data output terminals 227*d*, 237*d*, 247*d* and 257*d* of the D flip-flops 227, 237, 247 and 257 are indicated by DI, DV, DH and DD, respectively, the data output terminals 227*d*, 237*d*, 247*d* and 257*d* of the D flip-flops 227, 237, 247 and 257, for example, of processor element 205 output DI, DV, DH and DD, respectively, recited in FIG. 15(*a*).

When the eighth pulse of the CK1 is outputted from the timing control unit 500, the integer pel data b(0, 0), b(0, 1), b(0, 2), b(0, 3), b(1, 0), b(1, 1), b(1, 2) b(1, 3), b(2, 0), b(2, 1), b(2, 2), b(2, 3), b(3, 0) and b(3, 2) are shifted from the processor elements 201, 204 and 207, shift register 111, processor elements 202, 205 and 208, shift register 110, processor elements 203, 206 and 209, and shift registers 109, 105 and 106 to the shift register 101, processor elements 201, 204 and 207, shift register 102, processor elements 202, 205 and 208, shift register 103, processor elements 203, 206 and 209, and shift register 104 and 106, respectively, as shown in FIG. 15(*b*). At the same time, the integer pel data b(3, 1) and b(3, 3) are supplied from the search window data outputting means 400 to the shift registers 105 and 107, respectively. On the other hand, the integer pel data a(0, 1) of the current block 50 are supplied from the current block data outputting means 300 to each of the processor elements 201–209 when the eighth pulse of the CK1 is outputted from the timing control unit 500.

During the period (b) shown in FIG. 12, is calculated local distortion values by the local distortion value calculating devices 221, 231, 251 and 241 each of the processor elements 201–209, and is subsequently outputted the sum of the calculated local distortion values from each of the data output terminals 227*d*, 237*d*, 247*d* and 257*d* of the D flip-flops 227, 237, 247 and 257 each of the processor elements 201–209. The data output terminals 227*d*, 237*d*, 247*d* and 257*d* of the D flip-flops 227, 237, 247 and 257, for example, of processor element 205 output DI, DV, DH and DD, respectively, recited in FIG. 15(*b*).

When the ninth pulse of the CK1 is outputted from the timing control unit 500, the integer pel data b(1, 0), b(1, 1), b(1, 2) b(1, 3), b(2, 0), b(2, 1), b(2, 2), b(2, 3), b(3, 0), (3, 1), b(3, 2) and b(3, 3) are shifted from the shift register 102, processor elements 202, 205 and 208, shift register 103, processor elements 203, 206 and 209, and shift registers 104–107 to the shift register 101, processor elements 201, 204 and 207, shift register 102, processor elements 202, 205 and 208, shift register 103, processor elements 203, 206, 209, respectively, as shown in FIG. 15(*c*). At the same time, the integer pel data b(4, 1) and b(4, 3) are supplied from the search window data outputting means 400 to the shift registers 105 and 107, respectively. On the other hand, the integer pel data a(1, 1) of the current block 50 are supplied from the current block data outputting means 300 to each of the processor elements 201–209 when the ninth pulse of the CK1 is outputted from the timing control unit 500.

During the period (c) shown in FIG. 12, is calculated local distortion values by the local distortion value calculating devices 221, 231, 251 and 241 each of the processor elements 201–209, and is subsequently outputted the sum of the calculated local distortion values from each of the data output terminals 227*d*, 237*d*, 247*d* and 257*d* of the D flip-flops 227, 237, 247 and 257 each of the processor elements 201–209. The data output terminals 227*d*, 237*d*, 247*d* and 257*d* of the D flip-flops 227, 237, 247 and 257, for example, of processor element 205 output DI, DV, DH and DD, respectively, recited in FIG. 15(*c*).

When the tenth pulse of the CK1 is outputted from the timing control unit 500, the integer pel data b(1, 0), b(1, 1), b(1, 2) b(1, 3), b(2, 0), b(2, 1), b(2, 2), b(2, 3), b(3, 0), (3, 1), b(3, 2), b(3, 3), b(4,1) and b(4, 3) are shifted from the shift register 101, processor elements 201, 204 and 207, shift register 102, processor elements 202, 205, and 208, shift register 103, processor elements 203, 206 and 209, and shift registers 105 and 107 to the processor elements 201, 204 and 207, shift register 111, processor elements 202, 205 and 208, shift register 110, processor elements 203, 206 and 209, and shift registers 109, 105–108, respectively, as shown in FIG. 15(*d*). At the same time, the integer pel data b(4, 0) and b(4, 2) are supplied from the search window data outputting means 400 to the shift registers 105 and 107, respectively. On the other hand, the integer pel data a(1, 0) of the current block 50 are supplied from the current block data outputting means 300 to each of the processor elements 201–209 when the tenth pulse of the CK1 is outputted from the timing control unit 500.

During the period (d) shown in FIG. 12, is calculated local distortion values by the local distortion value calculating devices 221, 231, 251 and 241 each of the processor elements 201–209, and is subsequently outputted the sum of the calculated local distortion values from each of the data output terminals 227d, 237d, 247d and 257d of the D flip-flops 227, 237, 247 and 257 each of the processor elements 201–209. The data output terminals 227d, 237d, 247d and 257d of the D flip-flops 227, 237, 247 and 257, for example, of processor element 205 output DI, DV, DH and DD, respectively, recited in FIG. 15(d).

A pulse of the control signal CK2 in the period (e) shown in FIG. 13 causes the calculated distortion values to be transferred from the processor elements 201, 204 and 207 to the motion vector detector 600, from the processor elements 202, 205 and 208 to the processor elements 201, 204 and 207, and from the processor elements 203, 206 and 209 to the processor elements 202, 205 and 208. A pulse of the control signal CK2 in the period (f) shown in FIG. 13 causes the calculated distortion values to be transferred from the processor elements 201, 204 and 207 to the motion vector detector 600, from the processor elements 202, 205 and 208 to the processor elements 201, 204 and 207. A pulse of the control signal CK2 in the period (g) shown in FIG. 13 causes the calculated distortion values to be transferred from the processor elements 201, 204 and 207 to the motion vector detector 600. In the periods (e), (f) and (g) shown in FIG. 13, the distortion values D(k, h) transferred to the data input terminal I0 to I9 of the selector 610 of the motion vector detector 600 are indicated by a table show in FIG. 10(b).

At the end of the period (g) shown in FIG. 13, the minimum distortion value is held on the data output terminal 640d of the D flip-flop 640 of the motion vector detector 600. At the same time, horizontal position data MVx of a candidate block corresponding to the minimum distortion value are held on data output terminal 660c of the D flip-flop 660 of the motion vector detector 600, and vertical position data MVy of the candidate block corresponding to the minimum distortion value are held on the data output terminal 680c of the D flip-flop 680 of the motion vector detector 680. In the present embodiment, the horizontal position data MVx and the vertical position data MVy are hold at "1.5" and "0.5", respectively, at the end of the period (g) as shown in FIG. 13, and as a consequence the minimum distortion value is based the candidate block defined by the half-pel data b(1.5, 0.5), b(2.5, 0.5), b(1.5, 1.5) and b(2.5, 1.5) and calculated by the third half-pel block distortion calculating unit 250 of the processor element 202.

According to the first embodiment of the motion estimation apparatus, the integer pel block distortion calculating means and the half-pel block distortion calculating means use in common the shift registers 101–120 shifting the integer pel data of the search window 60 therebetween. This means that the integer pel block distortion calculating and the half-pel block distortion calculating means can calculate distortion values at the same time and accordingly at high speed. This also means that there can be provided a motion estimation apparatus small-sized in circuit size.

Assuming that the integer pels of the current block 50 are arranged in the form of a matrix array formed by M columns of N pels, and that the integer pels of the search window 60 are arranged in the form of a matrix array formed by K columns of H pels, the motion estimation apparatus of the present embodiment includes the (K–M+1)×(H–N+1) shift registers 112 to 120 holding the integer pel data of (K–M+1)×(H–N+1) of the integer pel of the search window 60 at the same time. For this reason, the processor elements 201 to 209 can calculate the distortion values, respectively, at the same time, and accordingly calculate distortion values at high speed.

The half-pel block distortion calculating means comprises (K–M+1)×(H–N) first half-pel block distortion calculating units 230 each calculating each of the first half-pel block distortion values based on each of the first half-pel blocks 61v, (K–M)×(H–N+1) second half-pel block distortion calculating units 240 each calculating each of the second half-pel block distortion values based on each of the second half-pel blocks 61h, and (K–M)×(H–N) third half-pel block distortion calculating units 250 each calculating each of said third half-pel block distortion values based on each of the third half-pel blocks 61d. The minimum distortion values, therefore, can be calculated through a full search block matching method in which the current block is compared with all the candidate blocks 61i, 61v, 61h and 61d included in the search window 60.

In order to calculate each of the first half-pel block distortion groups, the local distortion value calculating device 231 of each of the first half-pel block distortion calculating units 230 receives the local distortion values from the local distortion value calculating devices 221 of two of the integer pel block distortion calculating units 220 which respectively calculate the integer pel block distortion values based on the integer pel blocks 61i deviated by one-pel pitch from each other in parallel relationship to the vertical line in the search window 60. In order to calculate each of the second half-pel block distortion groups, the local distortion value calculating device 241 of each of the second half-pel block distortion calculating units 240 receives the local distortion values from the local distortion value calculating devices 221 of two of the integer pel block distortion calculating units 220 which respectively calculate the integer pel block distortion values based on the integer pel blocks 61i deviated by one-pel pitch from each other in parallel relationship to the horizontal line in the search window 60. In order to calculate each of the third half-pel block distortion groups, the local distortion value calculating device 251 of each of the third half-pel block distortion calculating units 250 receives the local distortion values from the local distortion value calculating devices 241 of two of the second half-pel block distortion calculating units 240 which respectively calculate the second half-pel block distortion values based on the second half-pel blocks 61h deviated by one-pel pitch from each other in parallel relationship to the horizontal line in the search window 60. Since the local distortion value calculating devices 231, 241 and 251 of the first, second and third half-pel block calculating units 230, 240 and 250 receive the data as set forth above, each of the local distortion value calculating devices 231, 241 and 251 is not required to calculate the half-pel data of each of the first, second and third half-pel blocks 61v, 61h and 61d of the search window 60. As a consequence, the first, second and third half-pel block calculating units 230, 240 and 250 can calculate the distortion values at high speed. Although the local distortion value calculating device 251 is shown in FIG. 7 as receiving the local distortion values from the local distortion value calculating devices 241 of two of the second half-pel block distortion calculating units 240, the local distortion value calculating device 251 of each of said third half-pel block distortion calculating units 250 may be designed to receive the local distortion values from the local distortion value calculating devices 231 of two of the first half-pel block distortion calculating units 230 which respectively calculate the first half-pel block distortion values based on the first half-pel blocks 61v deviated by one-pel pitch from each other in parallel relationship to the vertical line in the search window 60.

As set forth above, each of the processor elements 203 and 206 may be so constructed as not to include the second and third half-pel block distortion calculating units 240 and 250, the selectors 263 and 264, and the D flip-flops 273 and 274. Each of the processor elements 207 and 208 may be so constructed as not to include the first and third half-pel block distortion calculating units 230 and 250, the selectors 262 and 264, the D flip-flops 272 and 274. The processor element 209 may be so constructed as not to include the first, second and third half-pel block distortion calculating units 230, 240 and 250, the selectors 262 to 264, and the D flip-flops 272 to 274. If the processor elements are thus constructed, useless circuits are removed from each of the processor elements. This makes it possible to reduce an error rate of data calculated by each of the processor elements.

Figure 18:
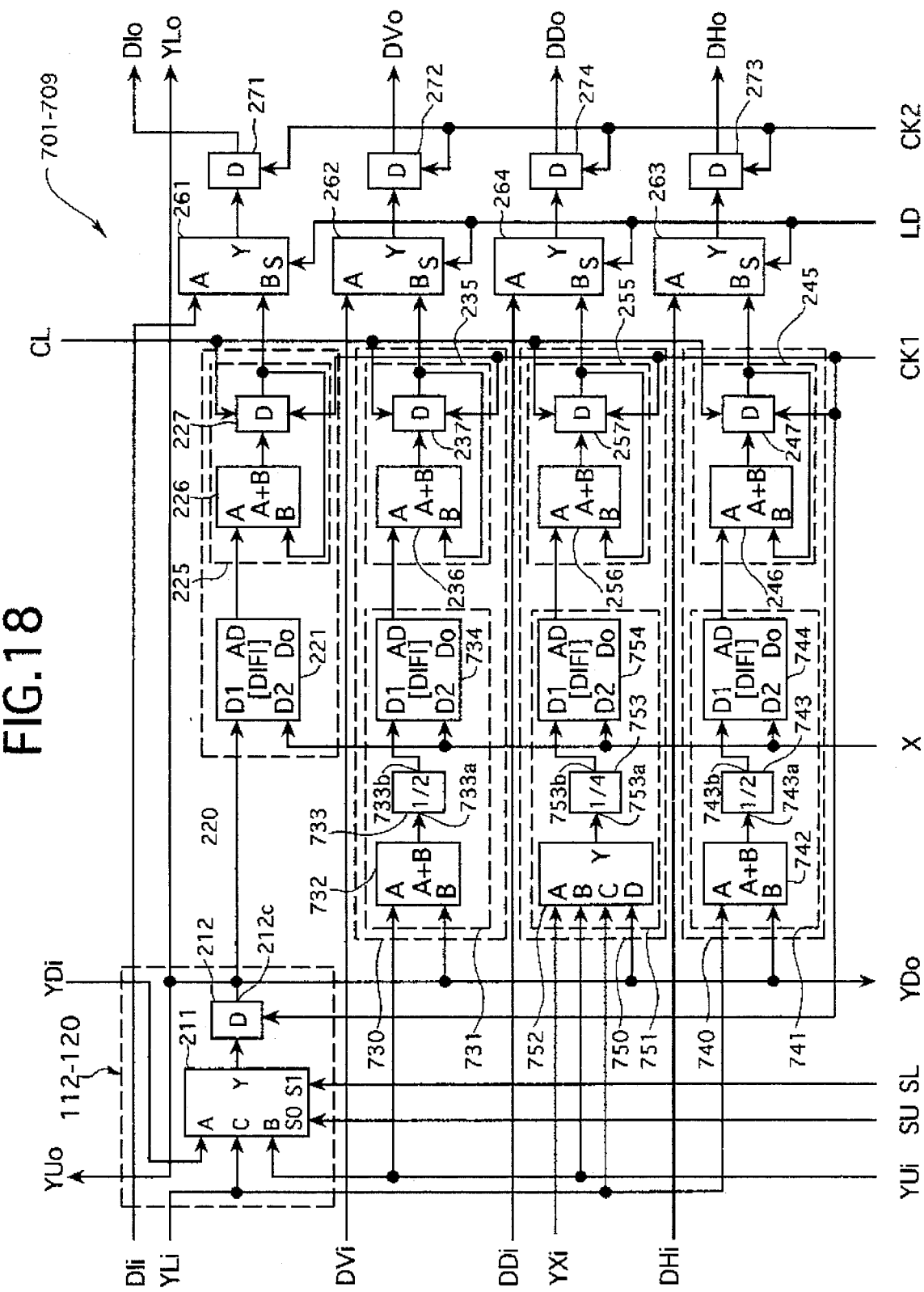
FIG. 18 is a block diagram showing the processor element shown in FIG. 17.

Referring now to FIGS. 16 to 18 of the accompanying drawings, a preferred second embodiment of the motion estimation apparatus according to the present invention will be described hereinafter. The second embodiment of the motion estimation apparatus includes the same constitutional elements as the first embodiment of the motion estimation apparatus includes. The constitutional elements of the second embodiment are respectively designated by the reference numerals denoting the individual constitutional elements of the first embodiment for omitting repeated description thereof.

The motion estimation apparatus of the second embodiment is shown in FIG. 16 as comprising processor elements 701–709. As shown in FIG. 17, each of the processor elements 701–709 has data input terminals X, YDi, YLi, YXi, DIi, DHi, DVi, DDi and YUi, and data output terminals YUo, YLo, DIo, DHo, Dvo, DDo and YDo. Each of the processor elements 701–709 further has signal input terminals (not shown) and signal output terminals (not shown) electrically connected to the timing control unit 500.

Referring to FIG. 18, each of the processor elements 701–709 comprises a first half-pel block calculating unit 730, a second half-pel block calculating unit 740 and a third half-pel block calculating unit 750 in addition to each of the shift registers 112–120, integer pel block calculating unit 220, selectors 261–264 and D flip-flops 271–274. The first, second and third half-pel block calculating units 730, 740 and 750 collectively defines half-pel block distortion calculating means for calculating half-pel block distortion values each indicative of a difference between the current block 50 and each of the half-pel blocks 61v, 61h and 61d on the basis of the integer pel data of the search window 60 held by the shift registers 101 to 120 and the integer pel data of the current block 50 outputted from the current block data outputting means 300.

As set forth in the first embodiment, the integer pels of the current block 50 are arranged in the form of a matrix array formed by M columns of N pels, and that the integer pels of the search window 60 are arranged in the form of a matrix array formed by K columns of H pels. In this case, the first half-pel block calculating units 730 are adapted to calculate the first half-pel block distortion values based on the (K−M+1)×(H−N) first half-pel blocks 61v, respectively, and as a consequence the number of the first half-pel block calculating units 730 is (K−M+1)×(H−N). The second half-pel block calculating units 740 are adapted to calculate the first half-pel block distortion values based on the (K−M)×(H−N+1) second half-pel blocks 61h, respectively, and as a consequence the number of the second half-pel block calculating units 740 is (K−M)×(H−N+1). The third half-pel block calculating units 750 are adapted to calculate the third half-pel block distortion values based on the (K−M)×(H−N) third half-pel blocks, respectively, and as a consequence the number of the third half-pel block calculating units 750 is (K−M)×(H−N). Although each of the processor elements 701–709 is shown in FIG. 18 as comprising the integer pel block calculating unit 220, the first half-pel block calculating unit 730, the second half-pel block calculating units 740 and the third half-pel block calculating unit 750, each of the processor elements 701, 702, 704 and 705, each of the processor elements 703 and 706, each of the processor elements 707 and 708, and the processor element 709 may be different in constitution from one another. More specifically, each of the processor elements 701, 702, 704 and 705 is so constructed as to include each of the shift registers 112, 113, 115 and 116, the integer pel block distortion calculating unit 220, the first, second and third half-pel block distortion calculating units 730, 740 and 750, the selectors 261 to 264, the D flip-flops 271 to 274. Each of the processor elements 703 and 706 is so constructed as to include each of the shift registers 114 and 117, the integer pel block distortion calculating unit 220, the first half-pel block distortion calculating unit 730, the selectors 261 and 262, the D flip-flops 271 and 272. Each of the processor elements 707 and 708 is so constructed as to include each of the shift registers 118 and 119, the integer pel block distortion calculating unit 220, the second half-pel block distortion calculating unit 740, the selectors 261 and 263, the D flip-flops 271 and 273. The processor element 709 is so constructed as to include the shift register 120, the integer pel block distortion calculating unit 220, the selector 261 and the D flip-flop 271.

The first half-pel block calculating units 730 of the processor elements 701–709 comprise local distortion value calculating devices 731 for calculating first half-pel block local distortion groups, respectively. Each of the first half-pel block local distortion groups is constituted by local distortion values each indicative of a difference between each half-pel of each of the first half-pel blocks 61v and each integer pel of the current block 50 corresponding in position to each other. The first half-pel block calculating units 730 further comprise half-pel block distortion calculating devices 236 for calculating the first half-pel block distortion values on the basis of the first half-pel block local distortion groups, respectively.

The second half-pel block calculating units 740 comprise local distortion value calculating devices 741 for calculating second half-pel block local distortion groups, respectively. Each of the second half-pel local block local distortion groups is constituted by local distortion vales each indicative of a difference between each half-pel of each of the second half-pel blocks 61h and each integer pel of the current block 50 corresponding in position to each other. The second half-pel block calculating units 740 further comprise half-pel block distortion calculating devices 245 for calculating the second half-pel block distortion values on the basis of the second half-pel block local distortion groups, respectively.

The third half-pel block calculating units 750 comprise local distortion value calculating devices 751 for calculating third half-pel block local distortion groups, respectively. Each of the third half-pel block local distortion groups is constituted by local distortion vales each indicative of a difference between each half-pel of each of the third half-pel blocks 61d and each integer pel of the current block 50 corresponding in position to each other. The third half-pel block calculating units 750 further comprise half-pel block distortion calculating devices 255 for calculating the third half-pel block distortion values on the basis of the third local half-pel block local distortion groups, respectively.

The local distortion value calculating device 731 of each of the first half-pel block calculating units 730 receives, from two of the shift registers 101 to 120, the integer pel data of two of the integer pels of the search window 60 adjoining each other in a parallel relationship to the vertical line in the search window 60 to calculate the local distortion value of each of the first half-pel block local distortion groups. The local distortion value calculating device 741 of each of the second half-pel block calculating units 740 receives, from two of the shift registers 101 to 120, the integer pel data of two of the integer pels of the search window 60 adjoining each other in a parallel relationship to the horizontal line in the search window 60 to calculate the local distortion value of each of the second half-pel block local distortion groups. The local distortion value calculating device 751 of each of the third half-pel block calculating units 750 receives, from four of the shift registers 101 to 120, the integer pel data off our integer pels of the search window 60 arranged in the form of a matrix array and adjoining one another to calculate the local distortion value of each of the third half-pel block distortion groups.

In FIG. 18, the local distortion value calculating device 731 comprises an adder 732, a multiplier 733 and a calculating device 734, the adder 732 having first and second data input terminals A and B, and a data output terminal 732a, the multiplier 733 having a data input terminal 733a and a data output terminal 733b, and the calculating device 734 having data input terminals D1 and D2 and a data output terminal AD. The adder 732 is designed to add data received by the first input terminal A to data received by the second input terminal B and output the added data through the data output terminal 732a. The multiplier 733 is designed to multiply data received by the data input terminal 733a by "½" and output the multiplied data through the data output terminal 733b. The calculating device 734 is constructed similarly to the local distortion value calculating devices 221 shown in FIG. 8.

The first data input terminal A of the adder 732 of the present processor element is electrically connected to the data output terminal 212c of the D flip-flop 212 of the lower side processor element through the data input terminal YUi of the present processor element and the data output terminal YUo of the lower side processor element, or connected to the data output terminal of the lower side shift register in the in FIG. 16 through the data input terminal YUi of the present processor element, while the second dada input terminal B of the adder 732 of the present processor element is electrically connected to the data output terminal 212c of the D flip-flop 212 of the present processor element. The data input terminal 733a of the multiplier 733 is electrically connected to the data output terminal 732a of the adder 732. The data input terminal D1 of the calculating device 734 is electrically connected to the data output terminal 733b of the multiplier 733, while the data input terminal D2 of the calculating device 734 is electrically connected to the current block data output means 300 to receive the integer pel data of the current block 50. The data output terminal AD of the calculating device 734 is electrically connected to the first data input terminal A of the adder 236.

The local distortion value calculating device 741 is shown in FIG. 18 as comprising an adder 742, a multiplier 743 and a calculating device 744, the adder 742 having first and second data input terminals A and B, and a data output terminal 742a, the multiplier 743 having a data input terminal 743a and a data output terminal 743b, and the calculating device 744 having data input terminals D1 and D2 and a data output terminal AD. The adder 742 is designed to add data received by the first input terminal A to data received by the second input terminal B and output the added data through the data output terminal 742a. The multiplier 743 is designed to multiply data received by the data input terminal 743a by "½" and output the multiplied data through the data output terminal 743b. The calculating device 744 is constructed similarly to the local distortion value calculating devices 221 shown in FIG. 8.

The first data input terminal A of the adder 742 of the present processor element is electrically connected to the data output terminal 212c of the D flip-flop 212 of the right side processor element in FIG. 16 through the data input terminal YLi of the present processor element and the data output terminal YLo of the right side processor element, or electrically connected to the data output terminal of the right side shift register in FIG. 16 through the data input terminal YLi of the present processor element, while the second dada input terminal B of the adder 742 of the present processor element is electrically connected to the data output terminal 212c of the D flip-flop 212 of the present processor element. The data input terminal 734a of the multiplier 734 is electrically connected to the data output terminal 742a of the adder 742. The data input terminal D1 of the calculating device 744 is electrically connected to the data output terminal 743b of the multiplier 743, while the data input terminal D2 of the calculating device 744 is electrically connected to the current block data output means 300 to receive the integer pel data of the current block 50. The data output terminal AD of the calculating device 744 is electrically connected to the first data input terminal A of the adder 246.

The local distortion value calculating device 751 is shown in FIG. 18 as comprising an adder 752, a multiplier 753 and a calculating device 754, the adder 752 having first, second, third and fourth data input terminals A, B, C and D, and a data output terminal Y, the multiplier 753 having a data input terminal 753 a and a data output terminal 753b, and the calculating device 754 having data input terminals D1 and D2 and a data output terminal AD. The adder 752 is designed to add data received by the first, second third and fourth input terminals A, B, C and D and output the added data through the data output terminal Y. The multiplier 753 is designed to multiply data received by the data input terminal 753a by "¼" and output the multiplied data through the data output terminal 753b. The calculating device 745 is constructed similarly to the local distortion value calculating devices 221 shown in FIG. 8.

The first data input terminal A of the adder 752 of the present processor element is electrically connected to the data output terminal 212c of the D flip-flop 212 of the lower right-hand side processor element in FIG. 16 through the data input terminal YXi of the present processor element and the data output terminal YUo of the lower right-hand side processor element, or electrically connected to the data output terminal of the lower right hand side shift register in FIG. 16 through the data input terminal YXi of the present processor element. The second data input terminal B of the adder 752 of the present processor element is electrically connected to the data output terminal 212c of the D flip-flop 212 of the lower side present processor element in FIG. 16 through the data input terminal YUi of the present processor element and the data output terminal YUo of the lower side processor element, or electrically connected to the data output terminal of the lower side shift register in FIG. 16 through the data input terminal YUi of the present processor element. The third data input terminal C of the adder 752 of the present processor element is electrically connected to the data output terminal 212c of the D flip-flop 212 of the right side processor element in FIG. 16 through the data input terminal YLi of the present processor element and the data output terminal YLo of the right side processor element, or electrically connected to the data output terminal of the right side shift register in FIG. 16 through the data input terminal YLi of the present processor element. The fourth data input terminal D of the adder 752 of the present processor element is electrically connected to the data output terminal 212c of the D flip-flop 212 of the present processor element. The data input terminal 753a of the multiplier 753 is electrically connected to the data output terminal 752a of the adder 752. The data input terminal D1 of the calculating device 754 is electrically connected to the data output terminal 753b of the multiplier 753, while the data input terminal D2 of the calculating device 754 is electrically connected to the current block data output means 300 to receive the integer pel data of the current block 50. The data output terminal AD of the calculating device 754 is electrically connected to the first data input terminal A of the adder 256.

As will be understood from the aforesaid recitation, each of the local distortion value calculating devices 731, 741 and 751 directly receive the integer pel data of the search window 60 to generate the half-pel data included in the search window 60. The operation and advantage of the second embodiment of the present invention are similar to those of the first embodiment of the present invention except for the operation of and the advantage resulting from the local distortion value calculating devices 731, 741 and 751 of the first, second and third half-pel block calculating units 730, 740 and 750. The detailed explanation of the operation of each of the local distortion value calculating devices 731, 741 and 751 is omitted here because of the fact that the operation will be understood with ease in view of the foregoing definition of the half-pel. The local distortion value calculating devices 731, 741 and 751 have the advantage of the fact that the local distortion values can be calculated with accuracy.

Figure 19:
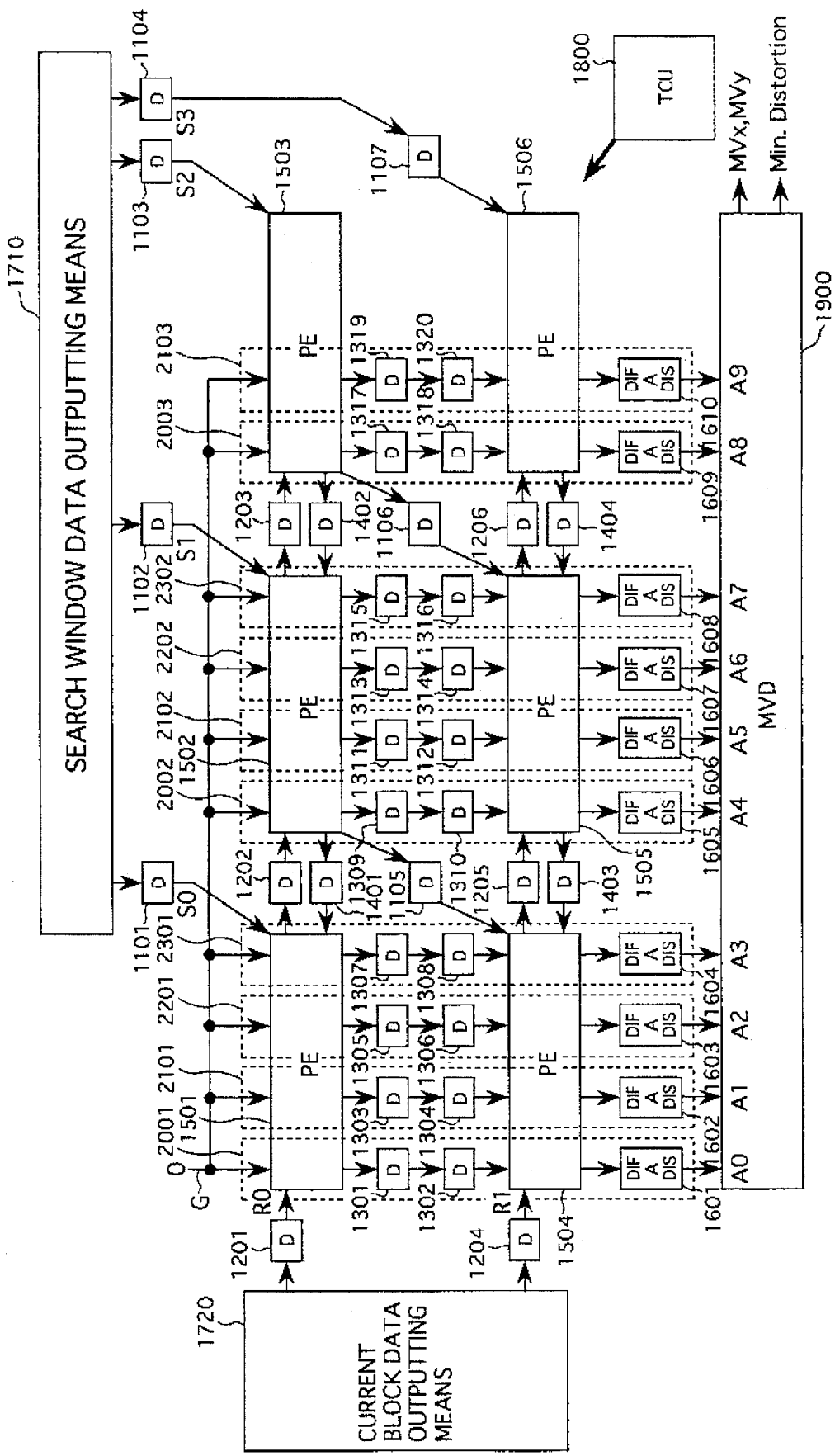
FIG. 19 is a block diagram showing a third embodiment of the motion estimation apparatus according to the present invention.

Referring now to FIGS. 19 to 29 of the accompanying drawings, a preferred third embodiment of the present invention will be described hereinafter. The motion estimation apparatus is shown in FIG. 19 as comprising first shift registers 1101–1107, second shift registers 1201–1206, D flip-flops 1301–1320, D flip-flops 1401–1404, processor elements 1501–1506, adding units 1601–1610, search window data outputting means 1710, current block data outputting means 1720, a timing control unit 1800, a motion vector detector 1900. The timing control unit 1800 is designed to generate and output a clock signal CK, and control signals S, LD and SEL shown in FIGS. 26 and 27. The motion vector detector 1900 has data input terminals A0 to A9. The search window data outputting means 1710 outputs the integer pel data of the search window 60.

The first shift registers 1101–1107 receive the integer pel data of the search window 60 from the search window data outputting means 1710 to shift the integer pel data of the search window 60 therebetween. More specifically, each of the first shift registers 1101–1107 is a D flip-flop having a data input terminal, a data output terminal and a signal input terminal. When the clock signal CK received by the signal input terminal of each of the first shift registers 1101–1107 is change from "0" to "1", each of the first shift registers 1101–1107 latches, on its own data output terminal, data received at that time by its own data input terminal. The data input terminals of the first shift registers 1101–1104 are electrically connected to the search window data outputting means 1710 to receive the integer pel data of the search window 60. The data output terminal of the first shift register 1101 is electrically connected to the processor element 1501. The data input terminal of the first shift register 1105 is electrically connected to the data output terminal of the shift register 1102 through the processor element 1502, while the data output terminal of the first shift register 1105 is electrically connected to the processor element 1504. The data input terminal of the first shift register 1106 is electrically connected to the data output terminal of the first shift register 1103 through the processor element 1503, while the data output terminal of the first shift register 1106 is electrically connected to the processor element 1505. The data input terminal of the first shift register 1107 is electrically connected to the data output terminal of the first shift register 1104, while the data output terminal of the first shift register 1107 is electrically connected to the processor element 1506.

The current block data outputting means 1720 outputs the integer pel data of the current block 50. The second shift registers 1201–1206 receive the integer pel data of the current block 50 from the current block data outputting means 1720 to shift the integer pel data of the current block 50 therebetween. More specifically, each of the second shift registers 1201–1206 is a D flip-flop having a data input terminal, a data output terminal and a signal input terminal. When the clock signal CK received by the signal input terminal of each of the second shift registers 1201–1206 is change from "0" to "1", each of the second shift registers 1201–1206 latches, on its own data output terminal, data received at that time by its own data input terminal. The data input terminals of the second shift registers 1201 and 1204 are electrically connected to the current block data outputting means 1720. The data input terminal of the second shift register 1202 is electrically connected to the data output terminal of the second shift register 1201 through the processor element 1501. The data input terminal of the second shift register 1203 is electrically connected to the data output terminal of the second shift register 1202 thorough the processor element 1502, while the data output terminal of the second shift register 1203 is electrically connected to the processor element 1503. The data input terminal of the second shift register 1205 is electrically connected to the data output terminal of the shift register 1204 through the processor element 1504. The data input terminal of the second shift register 1206 is electrically connected to the data output terminal of the second shift register 1205 through the processor element 1505, while the data output terminal of the second shift register 1206 is electrically connected to the processor element 1506.

Each of the D flip-flops 1301–1320 and 1401–1404 has a data input terminal, a signal input terminal and a data output terminal. When the clock signal CK received by the signal input terminal of each of the D flip-flops 1301–1320 and 1401–1404 is change from "0" to "1", each of the D flip-flops 1301–1320 and 1401–1404 latches, on its own data output terminal, data received at that time by its own data input terminal.

Figure 20:
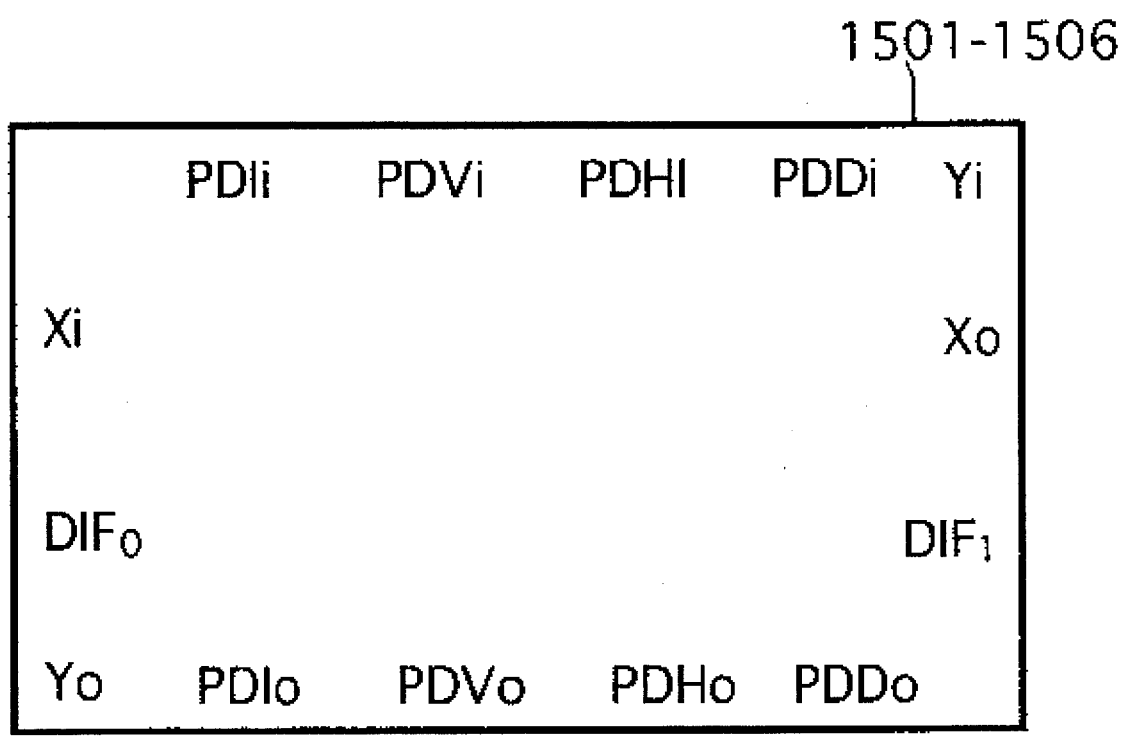
FIG. 20 is a plan view of each of processor elements shown in FIG. 19.

Each of the processor elements 1501–1506 is shown in FIG. 20 as having data input terminal Xi, PDIi, PDHi, PDVi, PDDi, Yi and DIFi, and data output terminal Xo, PDDo, PDVo, PDHo, PDIo, Yo, DIFo. Each of the processor elements further has signal input terminals (not shown)

receiving the clock signal CK and the control signal CL, respectively.

Figure 21:
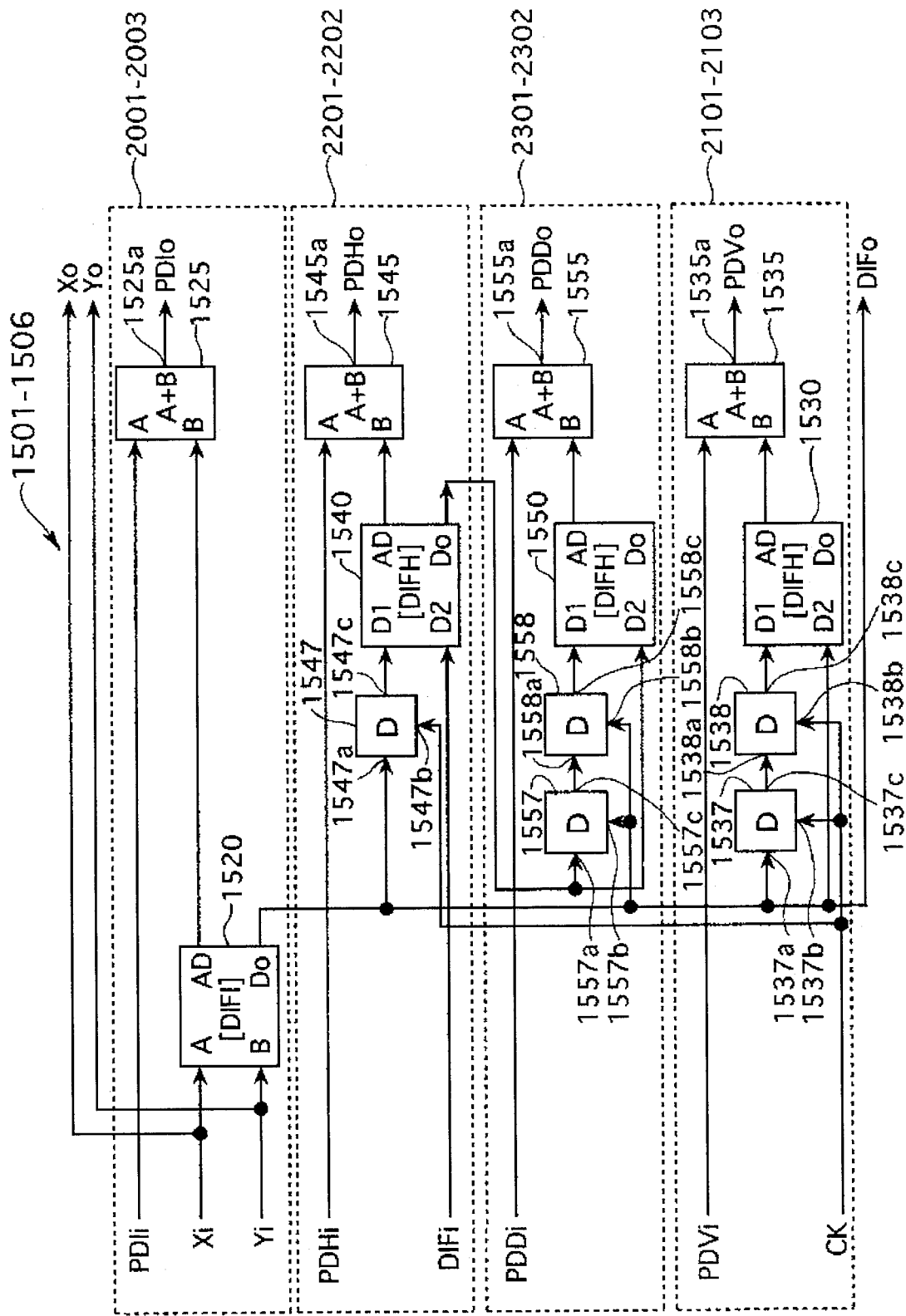
FIG. 21 is a block diagram showing processor element shown in FIG. 20.

As shown in FIG. 21, each of the processor elements 1501–1506 comprises an integer pel block local distortion calculating device 1520, an adder 1525, a first half-pel block local distortion calculating device 1530, an adder 1535, a D flip-flop 1537, a second half-pel block local distortion calculating device 1540, an adder 1545, a D flip-flop unit 1547, a third half-pel block local distortion calculating device 1540, an adder 1555, and a D flip-flop unit 1557.

The integer pel block local distortion calculating device 1520 has data input terminals A and B, and data output terminals AD and Do. In addition, the integer pel block local distortion calculating device 1520 is shown in FIG. 21 as comprising a subtracter having first and second data input terminals A and B and data output terminal 1521a, and a positive value transducer 1522 having a data input terminal 1522a and a data output terminal 1522b. The subtracter 1521 is adapted to subtract data received by the second data input terminal B from data received by the first data input terminal A and output the subtracted data from the data output terminal 1521a. The positive value transducer 1522 is an absolute value transducer or a square multiplier. If the absolute value transducer, the positive value transducer 1522 converts data on the data input terminal 1522a to positive value data by means of absolute value arithmetic to output the converted data through the data output terminal 1522b. If the square multiplier, the positive value transducer 1522 converts data on the data input terminal 1522a to positive value data by means of square arithmetic to output the converted data through the data output terminal 1522b. The first and second data input terminals A and B are electrically connected to the input terminals A and B of the integer pel block local distortion calculating device 1520, respectively. The data output terminal 1521 a of the subtracter 1521 is electrically connected to the data output terminal Do of the integer pel block local distortion calculating device 1520. The data input terminal 1522a of the positive value transducer 1522 is electrically connected to the data output terminal 1521a of the subtracter 1521, while the data output terminal 1522b of the positive value transducer 1522 is electrically connected to the data output terminal AD of the integer pel block local distortion calculating device 1520.

Figure 22:
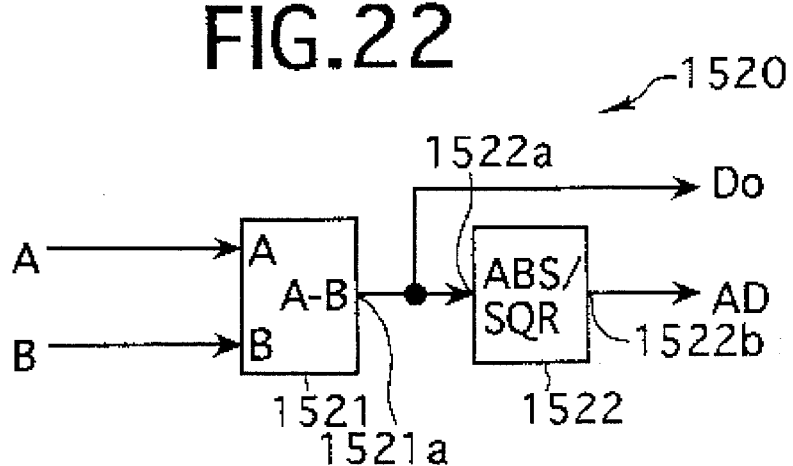
FIG. 22 is a block diagram showing each local distortion calculating device partially forming each of integer pel block calculating device groups shown in FIG. 19 and included in the processor element shown in FIG. 21.
Figure 23:
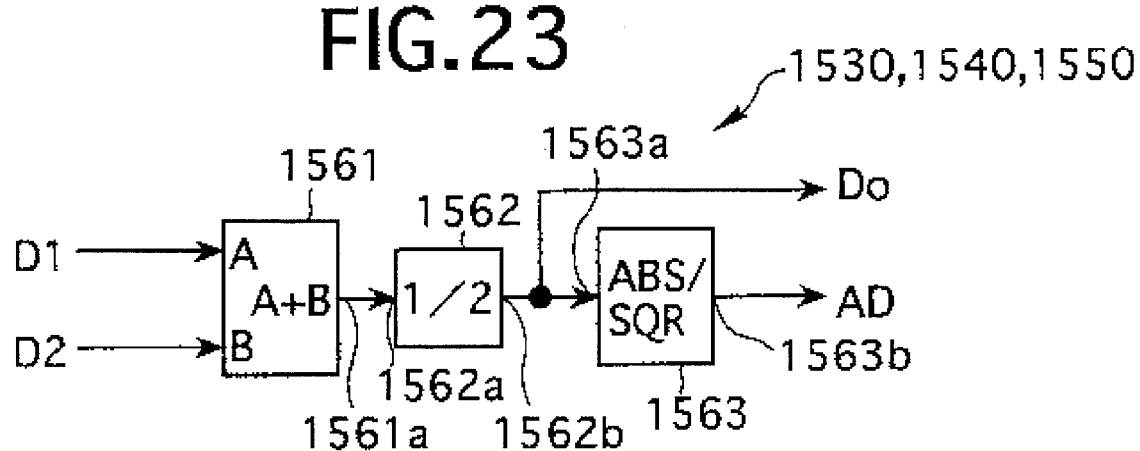
FIG. 23 is a block diagram of each local distortion calculating device partially forming each of first, second and third half-pel block calculating device groups shown in FIG. 19 and included in the processor element shown in FIG. 21.

Each of the first, second and third half-pel block local distortion calculating device 1530, 1540 and 1550 has data input terminals D1 and D2, and data output terminals AD and Do. In addition, each of the first, second and third half-pel block local distortion calculating devices 1530, 1540 and 1550 is shown in FIG. 22 as comprising an adder 1561 having a first data input terminals A and B and a data output terminal 1561a, a multiplier 1562 having a data input terminal 1562a and a data output terminal 1562b, and a positive value transducer 1563 having a data input terminal 1563a and a data output terminal 1563b. The adder 1561 is designed to add data received by the first input terminal A to data received by the second input terminal B and output the added data through the data output terminal 1561a. The multiplier 1562 is designed to multiply data on the data input terminal 1562a by "½" and outputs the multiplied data through the data output terminal 1562b. The positive value transducer 1563 is an absolute value transducer or a square multiplier. If the positive value transducer 1563 is the former, the positive value transducer 1563 converts data on the data input terminal 1563a to positive value data by means of absolute value arithmetic and outputs the converted data through the data output terminal 1563b. If the positive value transducer 1563 is the latter, the positive value transducer 1563 converts data on the data input terminal 1563a to positive value data by means of square arithmetic and outputs the converted data through the data output terminal 1563b. The first data input terminals A and B of the adder 1561 are electrically connected to the data input terminals D1 and D2, respectively, of each of the first, second and third half-pel block local distortion calculating devices 1530, 1540 and 1550. The data input terminal 1562a of the multiplier 1562 is electrically connected to the data output terminal 1561a of the adder 1561, while the data output terminal 1562b of the multiplier 1562 is electrically connected to the data output terminal Do of each of the first, second third half-pel block local distortion calculating devices 1530, 1540 and 1550. The data input terminal 1563a of the positive value transducer 1563 is electrically connected to the data output terminal 1562b of the multiplier 1562, while the data output terminal of the 1563b of the positive value transducer 1563 is electrically connected to the data output terminal AD of each of the first, second and third half-pel block local distortion calculating devices 1530, 1540, and 1550.

Referring back to FIG. 21, the D flip-flops 1537, 1547, 1548, 1557 and 1558 has data input terminals 1537a, 1547a, 1548a, 1557a and 1558a, signal input terminals 1537b, 1547b, 1548b, 1557b and 1558b and data output terminals 1537c, 1547c, 1548c, 1557c and 1558c, respectively. When the D flip-flop 1537 detects a rising edge of the signal CK on the signal input terminal 1537b, data on the data input terminal 1537a at that time are latched on the data output terminal 1537c. Similarly to the D flip-flop 1537, the D flip-flops 1547, 1548, 1557 and 1558 are operated. The number of columns of the current block 50 is equal to the number of D flip-flops between the data output terminal Do of the integer pel block local distortion calculating device 1520 and the data input terminal D1 of the first half-pel block local distortion calculating device 1530, and equal to the number of D flip-flops between the data output terminal Do of the second half-pel block local distortion calculating device 1540 and the data input terminal D1 of the third half-pel block local distortion calculating device 1550. In the present embodiment, there are provided two D flip-flops between the data output terminal Do of the integer pel block local distortion calculating device 1520 and the data input terminal D1 of the first half-pel block local distortion calculating device 1530, and between the data output terminal Do of the second half-pel block local distortion calculating device 1540 and the data input terminal D1 of the third half-pel block local distortion calculating device 1550.

The adders 1525, 1535, 1545 and 1555 have first and second data input terminals A and B, and a data output terminals 1525a, 1535a, 1545a and 1555a, respectively. The adder 1525 is adapted to add data on the first data input terminal A to data on the second data input terminal B and output the added data through the data output terminal 1525a. Similarly to the adder 1525, the adders 1535, 1545 and 1555 are operated.

Figure 24:
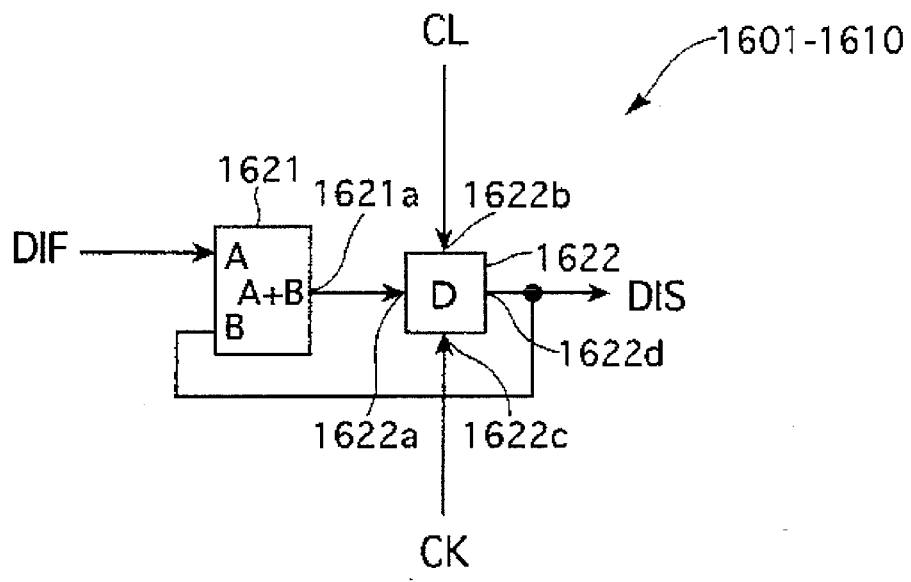
FIG. 24 is a block diagram of each adding unit shown in FIG. 19.

Referring back to FIG. 19, each of the adding units 1601–1610 has a data input terminal DIF and a data output terminal DIS. More specifically, as shown in FIG. 24, each of the adding units 1601–1610 comprises an adder 1621 having first and second data input terminals A and B and a data output terminal 1621a, a D flip-flop 1622 having a data input terminal 1622a, first and second signal input terminal 1622c and 1622d and a data output terminal 1622d. The adder 1621 is adapted to add data on the first data input terminal A to data on the second data input terminal B and output the added data through the data output terminal 1621a. When the D flip-flop 1622 detects a low-to-high transition of the clock signal CK received by the signal input terminal 1622c, the D flip-flop 1622 latches, on the data output terminal 1622d, data received at that time by the data input terminal 1622a. When the D flip-flop 1622 detects a low-to-high transition of the control signal CL received by the signal input terminal 1622b, the D flip-flop 1622 resets data on the data output terminal 1622d to "0". The first data input terminals A and B of the adder 1621 are electrically connected to the data input terminal DIF of each of the adding units 1601–1610. The data input terminal 1622a of the D flip-flop 1622 is electrically connected to the data output terminal 1621a of the adder 1621. The first and second signal input terminals 1622b and 1622c are electrically connected to the timing control unit 1800 in order to receive the control signal CL and the clock signal CK.

Referring back to FIG. 21, the data input terminal Xi of each of the processor elements 1501 to 1506 is electrically connected to the data input terminal A of the integer pel block local distortion calculating device 1520 and the data output terminal Xo of the each of the processor elements 1501 to 1506. The data input terminal Yi of each of the processor elements 1501 to 1506 is electrically connected to the data input terminal B of the integer pel block local distortion calculating device 1520 and the data output terminal Yo of the each of the processor elements 1501 to 1506. The first data input terminal A of the adder 1525 is electrically connected to the data input terminal PDIi, while the second data input terminal B of the adder 1525 is electrically connected to the data output terminal AD of the integer pel block local distortion calculating device 1520. The data output terminal 1525a of the integer pel block local distortion calculating device 1525 is electrically connected to the data output terminal PDIo.

The data input terminal 1537a of the D flip-flop 1537 is electrically connected to the data output terminal Do of the integer pel block local distortion calculating device 1520, while the data signal input terminal 1537b of the D flip-flop 1537 is electrically connected to the timing control unit 1800 to receive the clock signal CK. The data input terminal 1538a of the D flip-flop 1538 is electrically connected to the data output terminal 1537c of the D flip-flop 1537, while the data signal input terminal 1538b of the D flip-flop 1538 is electrically connected to the timing control unit 1800 to receive the clock signal CK. The data input terminal D1 of the first half-pel block local distortion calculating device 1530 is electrically connected to the data output terminal 1538c of the D flip-flop 1538, while the data input terminal D2 of the first half-pel block local distortion calculating device 1530 is electrically connected to the data output terminal Do of the integer pel block local distortion calculating device 1520. The first data input terminal A of the adder 1535 is electrically connected to the input terminal PDVi, while the second data input terminal B of the adder 1535 is electrically connected to the data output terminal AD of the second half-pel block local distortion calculating device 1540. The data output terminal 1535a of the adder 1535 is electrically connected to the data output terminal PDVo.

The data input terminal 1547a of the D flip-flop 1547 is electrically connected to the data output terminal Do of the integer pel block local distortion calculating device 1520. The data signal input terminal 1547b of the D flip-flop 1547 is electrically connected to the timing control unit 1800 to receive the clock signal CK. The data input terminal D1 of the second half-pel block local distortion calculating device 1540 is electrically connected to the data output terminal 1547c of the D flip-flop 1547, while the data input terminal D2 of the second half-pel block local distortion calculating device 1540 is electrically connected to the data input terminal PIFi. The first data input terminal A of the adder 1545 is electrically connected to the input terminal PDHi, while the second data input terminal B of the adder 1545 is electrically connected to the data output terminal AD of the second half-pel block local distortion calculating device 1540. The data output terminal 1545a of the adder 1545 is electrically connected to the data output terminal PDHo.

The data input terminal 1557a of the D flip-flop 1557 is electrically connected to the data output terminal Do of the second half-pel block local distortion calculating device 1540, while the data signal input terminal 1557b of the D flip-flop 1557 is electrically connected to the timing control unit 1800 to receive the clock signal CK. The data input terminal 1558a of the D flip-flop 1558 is electrically connected to the data output terminal 1557c of the D flip-flop 1557, while the data signal input terminal 1558b of the D flip-flop 1558 is electrically connected to the timing control unit 1800 to receive the clock signal CK. The data input terminal D1 of the third half-pel block local distortion calculating device 1550 is electrically connected to the data output terminal 1558c of the D flip-flop 1558, while the data input terminal D2 of the third half-pel block local distortion calculating device 1550 is electrically connected to the data output terminal Do of the second half-pel block local distortion calculating device 1540. The first data input terminal A of the adder 1555 is electrically connected to the input terminal PDDi, while the second data input terminal B of the adder 1555 is electrically connected to the data output terminal AD of the third half-pel block local distortion calculating device 1550. The data output terminal 1555a of the adder 1555 is electrically connected to the data output terminal PDDo. The data output terminal DIFo is electrically connected to the data output terminal Do of the integer pel block local distortion calculating device 1520.

Referring FIGS. 19 to 21, the data input terminal PDi of the processor element 1501 is electrically connected to an input line G to receive a signal indicative of "0", while the data output terminal PDIo of the processor element 1501 is electrically connected to the data output terminal of the D flip-flop 1301. The data input terminal Xi of the processor element 1501 is electrically connected to the data output terminal of the first shift register 1101. The data input terminal Yi of the processor element 1501 is electrically connected to the data output terminal of the second shift register 1201. The data output terminal Yo of the processor element 1501 is electrically connected to the data input terminal of the D flip-flop 1202. The data input terminal PDVi of the processor element 1501 is electrically connected to the input line G to receive a signal indicative of "0", the data output terminal PDVo of the processor element 1501 is electrically connected to the data input terminal of the D flip-flop 1303. The data input terminal PDHi of the processor element 1501 is electrically connected to the input line G to receive a signal indicative of "0", the data output terminal PDHo of the processor element 1501 is electrically connected to the data input terminal of the D flip-flop 1305. The data input terminal DIFi of the processor element 1501 is electrically connected to the data output terminal of the D flip-flop 1401. The data input terminal PDDi of the processor element 1501 is electrically connected to the input line G to receive a signal indicative of "0", the data output terminal PDDo of the processor element 1501 is electrically connected to the data input terminal of the D flip-flop 1307.

The data input terminal PDi of the processor element 1502 is electrically connected to the line G to receive the signal indicative of "0", while the data output terminal PDIo of the processor element 1502 is electrically connected to the data output terminal of the D flip-flop 1309. The data input terminal Xi of the processor element 1502 is electrically connected to the data output terminal of the first shift register 1102. The data input terminal Yi of the processor element 1502 is electrically connected to the data output terminal of the second shift register 1202. The data output terminal Yo of the processor element 1502 is electrically connected to the data input terminal of the D flip-flop 1203. The data input terminal PDVi of the processor element 1502 is electrically connected to the input line G to receive a signal indicative of "0", the data output terminal PDVo of the processor element 1502 is electrically connected to the data input terminal of the D flip-flop 1311. The data input terminal PDHi of the processor element 1502 is electrically connected to the input line G to receive a signal indicative of "0", the data output terminal PDHo of the processor element 1502 is electrically connected to the data input terminal of the D flip-flop 1313. The data input terminal DIFi of the processor element 1502 is electrically connected to the data output terminal of the D flip-flop 1402. The data input terminal PDDi of the processor element 1502 is electrically connected to the input line G to receive a signal indicative of "0", the data output terminal PDDo of the processor element 1502 is electrically connected to the data input terminal of the D flip-flop 1315. The data output terminal DIFo of the processor element 1502 is electrically connected to the data input terminal of the D flip-flop 1401.

The data input terminal PDi of the processor element 1503 is electrically connected to the line G to receive the signal indicative of "0", while the data output terminal PDIo of the processor element 1503 is electrically connected to the data output terminal of the D flip-flop 1317. The data input terminal Xi of the processor element 1503 is electrically connected to the data output terminal of the first shift register 1103. The data input terminal Yi of the processor element 1503 is electrically connected to the data output terminal of the second shift register 1203. The data input terminal PDVi of the processor element 1503 is electrically connected to the input line G to receive a signal indicative of "0", the data output terminal PDVo of the processor element 1503 is electrically connected to the data input terminal of the D flip-flop 1319. The data output terminal DIFo of the processor element 1503 is electrically connected to the data input terminal of the D flip-flop 1402.

The data input terminal PDi of the processor element 1504 is electrically connected to the data output terminal of the D flip flop 1304, while the data output terminal PDIo of the processor element 1504 is electrically connected to the data input terminal DIF of the adding unit 1601. The data input terminal Xi of the processor element 1504 is electrically connected to the data output terminal of the first shift register 1105. The data input terminal Yi of the processor element 1504 is electrically connected to the data output terminal of the second shift register 1204. The data output terminal Yo of the processor element 1504 is electrically connected to the data input terminal of the D flip-flop 1205. The data input terminal PDVi of the processor element 1504 is electrically connected to the data output terminal of the D flip-flop 1304, while the data output terminal PDVo of the processor element 1504 is electrically connected to the data input terminal DIF of the adding unit 1602. The data input terminal PDHi of the processor element 1504 is electrically connected to the data output terminal of the D flip-flop 1306, while the data output terminal PDHo of the processor element 1504 is electrically connected to the data input terminal DIF of the adding unit 1603. The data input terminal DIFi of the processor element 1504 is electrically connected to the data output terminal of the D flip-flop 1403. The data input terminal PDDi of the processor element 1504 is electrically connected to the data output terminal of the D flip-flop 1308, while the data output terminal PDDo of the processor element 1504 is electrically connected to the data input terminal DIF of the adding unit 1604.

The data input terminal PDi of the processor element 1505 is electrically connected to the data output terminal of the D flip-flop 1310, while the data output terminal PDIo of the processor element 1505 is electrically connected to the data output terminal DIF of the adding unit 1605. The data input terminal Xi of the processor element 1505 is electrically connected to the data output terminal of the first shift register 1106. The data input terminal Yi of the processor element 1505 is electrically connected to the data output terminal of the second shift register 1404. The data output terminal Yo of the processor element 1505 is electrically connected to the data input terminal of the D flip-flop 1206. The data input terminal PDVi of the processor element 1505 is electrically connected to the data output terminal of the D flip-flop 1312, while the data output terminal PDVo of the processor element 1505 is electrically connected to the data input terminal DIF of the adding unit 1606. The data input terminal PDHi of the processor element 1505 is electrically connected to the input line G to receive a signal indicative of "0", while the data output terminal PDHo of processor element 1502 is electrically connected to the data input terminal DIF of the adding unit 1607. The data input terminal DIFi of the processor element 1505 is electrically connected to the data output terminal of the D flip-flop 1404. The data input terminal PDDi of the processor element 1505 is electrically connected to the data output terminal of the D flip-flop 1316, while the data output terminal PDDo of the processor element 1505 is electrically connected to the data input terminal DIF of the adding unit 1608. The data output terminal DIFo of the processor element 1505 is electrically connected to the data input terminal of the D flip-flop 1403.

The data input terminal PDi of the processor element 1506 is electrically connected to the data output terminal of the D flip-flop 1318, while the data output terminal PDIo of the processor element 1506 is electrically connected to the data output terminal DIF of the adding unit 1609. The data input terminal Xi of the processor element 1506 is electrically connected to the data output terminal of the first shift register 1107. The data input terminal Yi of the processor element 1506 is electrically connected to the data output terminal of the second shift register 1206. The data input terminal PDVi of the processor element 1506 is electrically connected to the data output terminal 1320, while the data output terminal PDVo of the processor element 1506 is electrically connected to the data input terminal DIF of the adding unit 1610. The data output terminal DIFo of the processor element 1506 is electrically connected to the data input terminal of the D flip-flop 1404.

Figure 25:
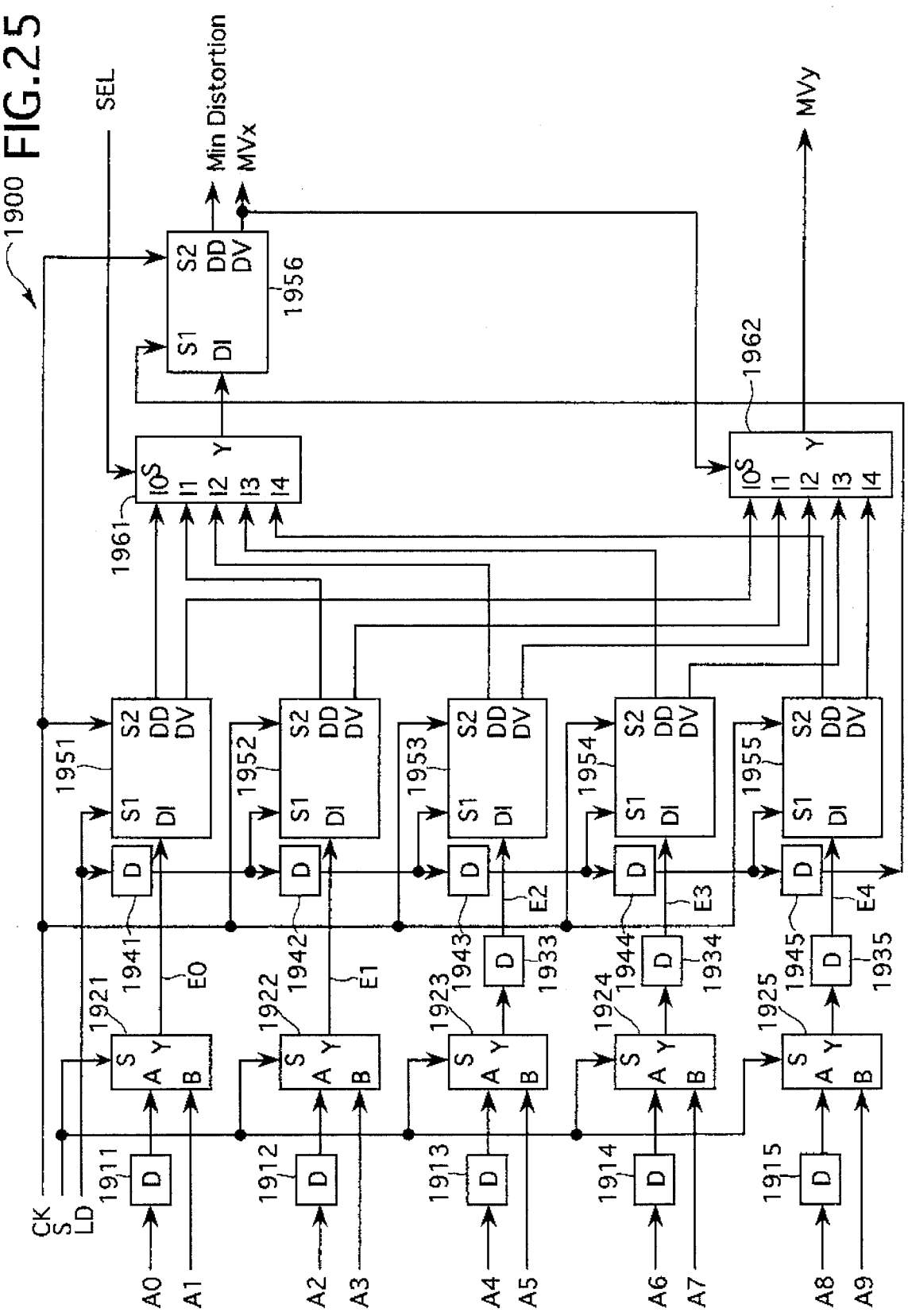
FIG. 25 is a block diagram of the motion vector detector shown in FIG. 19.

The motion vector detector 1900 is shown in FIG. 25 as comprising D flip-flops 1911–1915 each having data input and data output terminals and a signal input terminal (not shown), selectors 1921–1925 each having data input terminals A and B, a signal input terminal S and a data output terminal Y, D flip-flops 1933–1935 each having data input and data output terminals and a signal input terminal (not shown), D flip-flops 1941–1945 each having data input and data output terminals and a signal input terminal (not shown), distortion selecting units 1951–1956 each having a data input terminal DI, a signal input terminals S1 and S2 and data output terminals DD, and selectors 1961 and 1962 having data input terminals I0–I4, a signal input terminal S and a data output terminal Y. When each of the D flip-flops 1911–1915, 1933–35 and 1941–45 detects a rising edge of the clock signal CK on its own signal input terminal, each of the D flip-flops 1911–1915, 1933–35 and 1941–45 latches, on its own data output terminal, data received at that time by its own data input terminal. Each of the selectors 1921–1925 is designed to output data received by the data input terminal A through the data output terminal Y when a signal on the signal input terminal S is "0", and output data received by the data input terminal B through the data output terminal Y when the signal on the signal input terminal S is "1".

Figure 26:
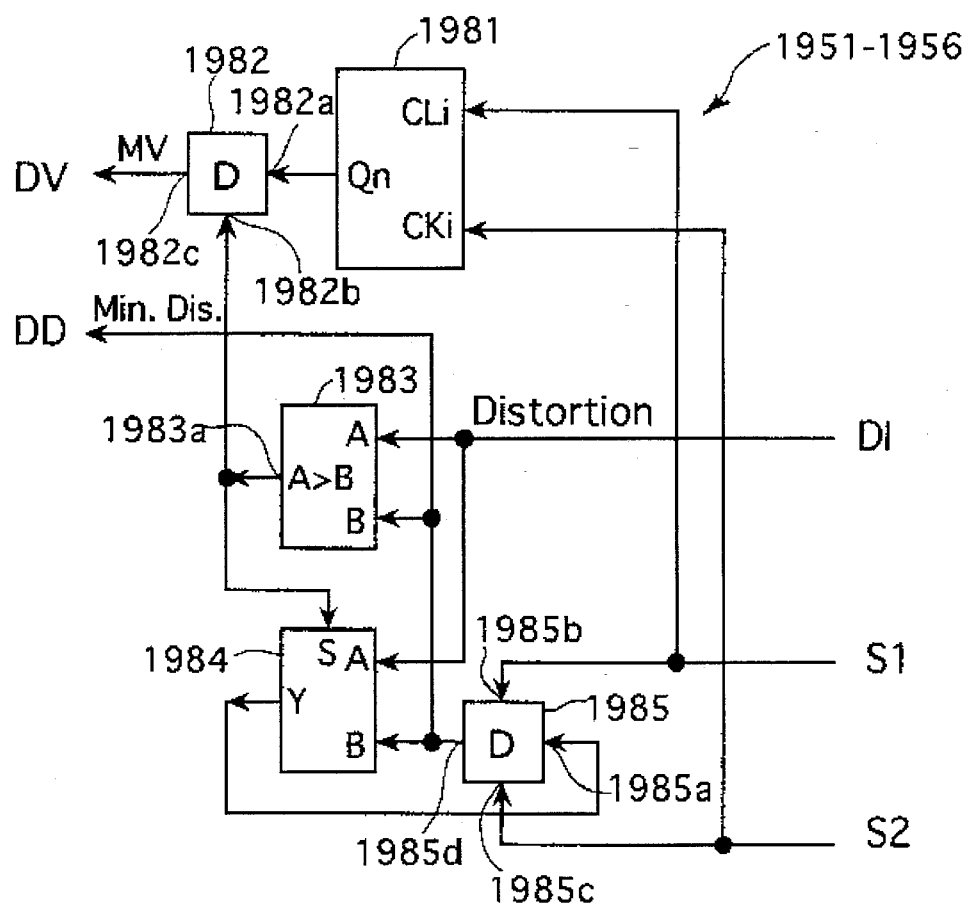
FIG. 26 is a block diagram of each of distortion specifying units shown in FIG. 25.

Each of the distortion selecting units 1951–1956 is shown in FIG. 26 as comprising a quinary counter 1981, a D flip-flop 1982, a comparator 1983, a selector 1984 and a D flip-flop 1985, the quinary counter 1981 having signal input terminals CLi and CKi and a count output terminal Qn, the D flip-flop 1982 having a data input terminal 1982a, a signal input terminal 1982b and a data output terminal 1982c, the comparator 1983 having data input terminals A and B and a signal output terminal 1983a, the selector 1984 having data input terminals A and B, a signal input terminal S and a data output terminal Y. The quinary counter 1981 causes all outputs of the count output terminal Qn thereof to be set to "0" in step with a rising edge of a pulse of a signal on the signal input terminal CLi thereof. After all outputs of the count output terminal Qn of the quinary counter 1981, the quinary counter 1981 counts up from "0" in step with the clock signal CK received by the signal input terminal CKi to output, through the count output terminal Qn, the count number which reverts to "0" in the sequence of counting after reaching a maximum value of "4". When the D flip-flop 1982 detects the rising edge of a signal on the signal input terminal 1982b, data received at that time by the data input terminal 1982a is latched on the data output terminal 1982c. The comparator 1983 outputs a signal representative of "0" when data received by the data input terminal A thereof is equal to and larger than data received by the data input terminal B thereof. In addition, the comparator 1983 outputs a signal representative of "1" when data received by the data input terminal A thereof is less than data received by the data input terminal B thereof. The selector 1984 outputs data on the data input terminal A thereof through the data output terminal Y thereof when the signal input terminal S of the selector 1984 receives a signal representative of "1". In addition, the selector 1984 outputs data on the second data input terminal B thereof through the data output terminal Y thereof when the signal input terminal S of the selector 1984 receives a signal representative of "0". The D flip-flop 1985 sets all data of the data output terminal 1985d to "1" in step with a rising edge of the control signal S1 on the signal input terminal 1985b. When the D flip-flop 1985 detects a rising edge of the control signal S2 on the signal input terminal 1985c, the D flip-flop 1985 latches, on the data output terminal 1985d, data received at that time by the data input terminal 1985a.

Referring back to FIG. 25, each of the selectors 1961 and 1962 is operated to output, through the data output terminal Y, data received by the input terminal I0 when the data input terminal S receives a signal representative of "0," data received by the input terminal I1 when the data input terminal S of receives a signal representative of "1," data received by the input terminal I2 when the data input terminal S receives a signal representative of "2," data received by the input terminal I3 when the data input terminal S receives a signal representative of "3," data received by the input terminal I4 when the data input terminal S receives a signal representative of "4." In the motion vector detector 19000 thus constructed, the data input terminals A0–A9, the data input and output terminals of the D flip-flops 1911–1915, the data input terminals A and B and the data output terminals Y of the selectors 1921–1925, the data input and output terminals of the D flip-flops 1933–1935, the data input and output terminals of the D flip-flops 1941–1945, the data input terminals DI and the data output terminals DD and DV of the distortion selecting units 1951–1956, and the data input terminals I0–I4 and the data output terminals Y of the selectors 1961 and 1962 are connected to one another as shown in FIG. 25.

Figure 27:
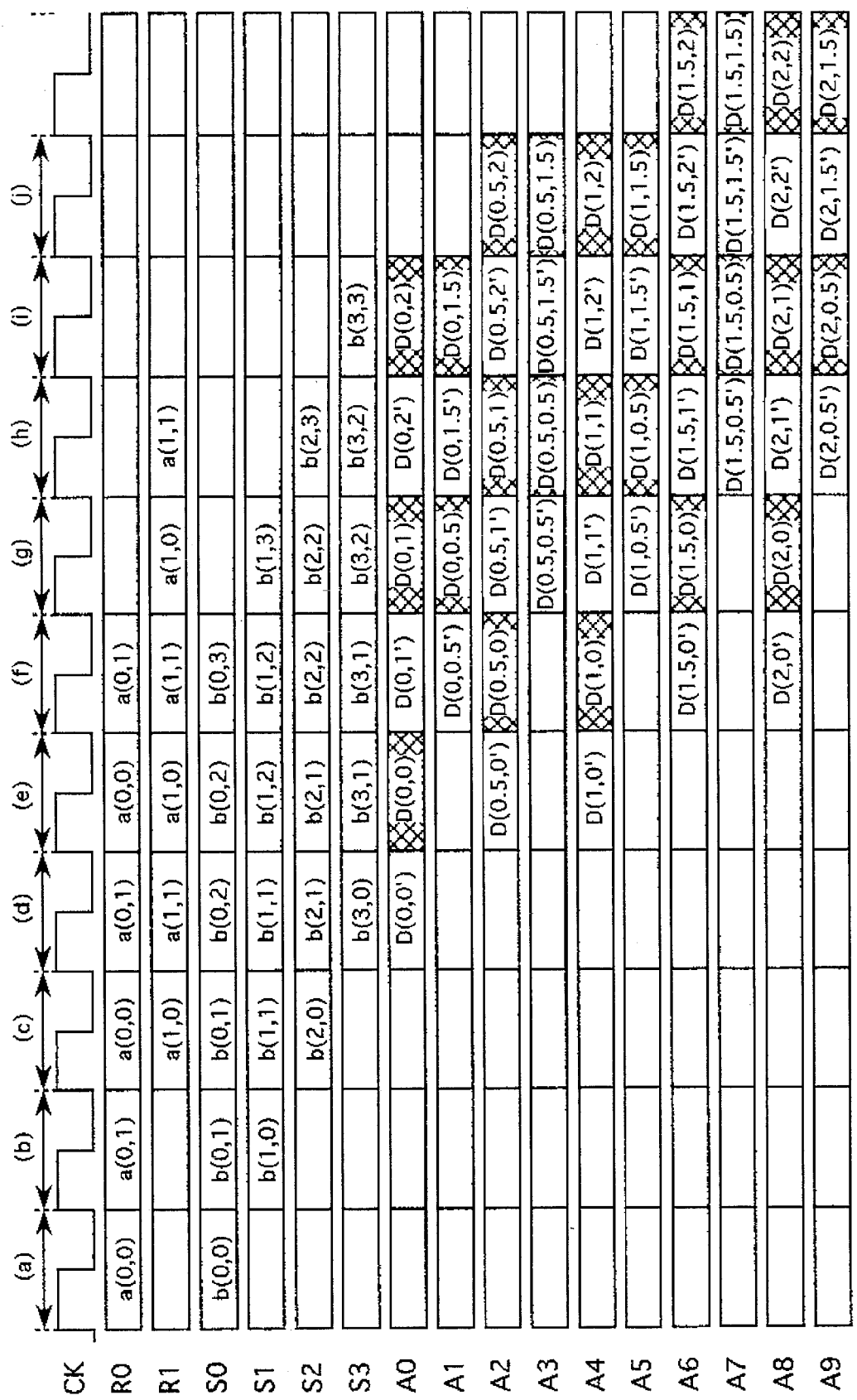
FIG. 27 is a timing chart showing a clock signal generated by a timing control unit shown in FIG. 19 and data signals inputted into and outputted from the motion vector detector.
Figure 28:
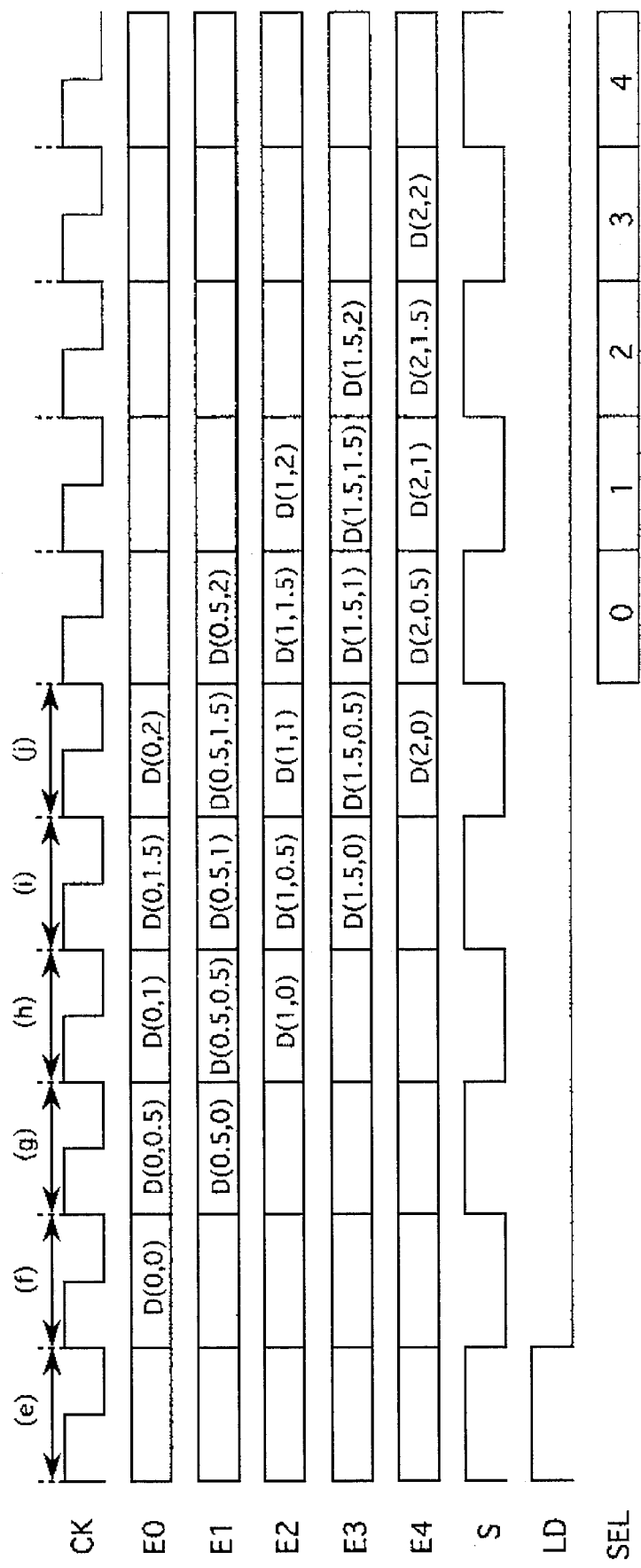
FIG. 28 is a timing chart showing the clock signal and control signals generated by the timing control unit shown in FIG. 19 and data signals inputted into each of distortion specifying units shown in FIG. 25.
Figure 31:
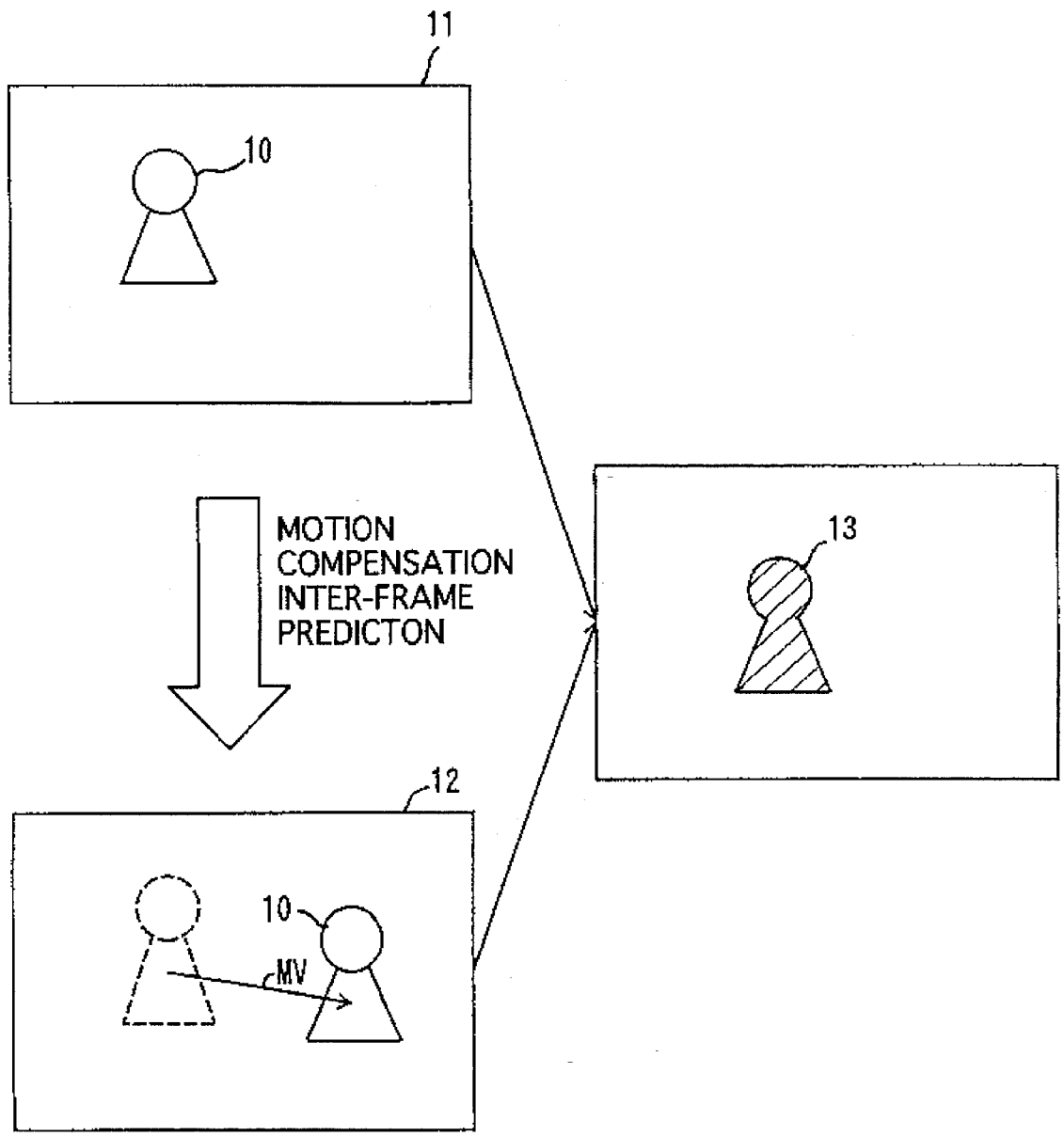
FIG. 31 is a diagram explaining a motion compensation inter-frame predicting coding method.
Figure 32:
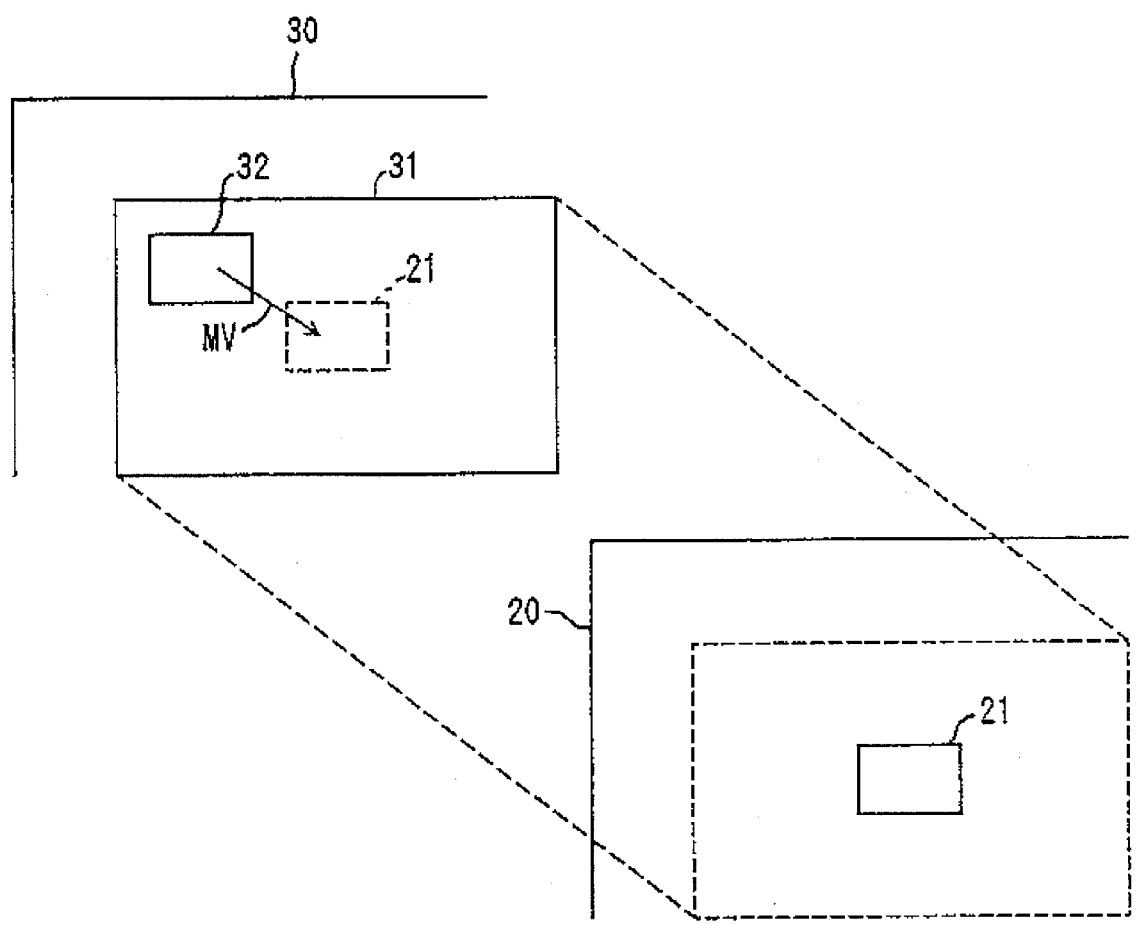
FIG. 32 is a diagram for explaining a motion vector calculated through motion compensation inter-frame predicting coding method.
Figure 33A:
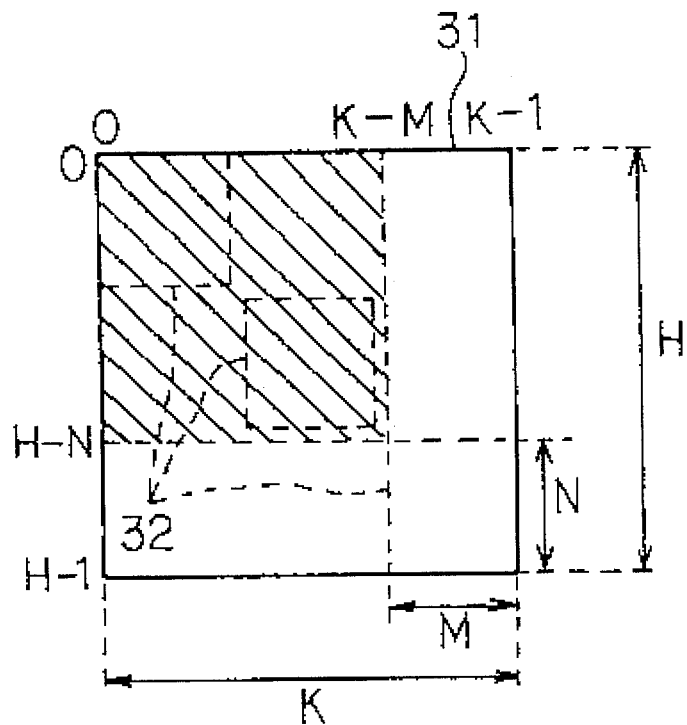
FIGS. 33(a) and 33(b) are diagrams for explaining a search window and a current block.
Figure 33B:
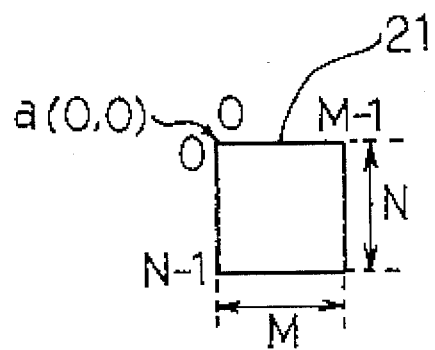
Figure 34A:
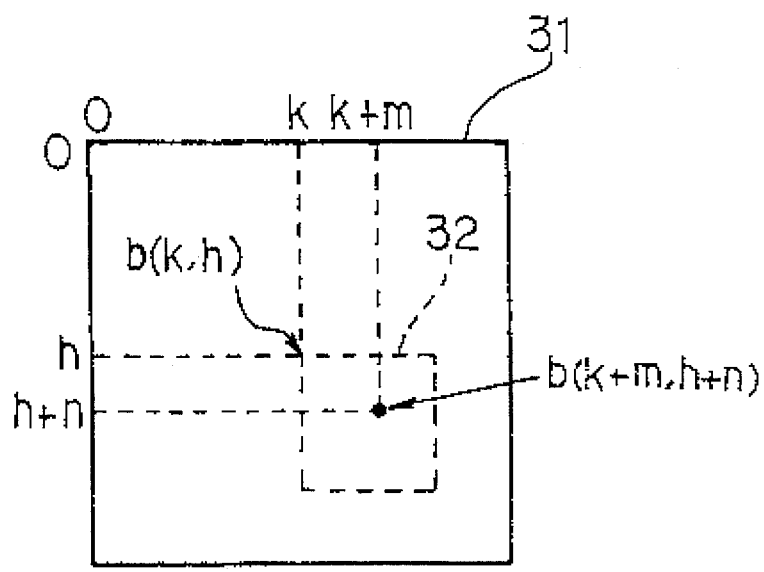
FIGS. 34(a) and 34(b) are diagrams for explaining relations between a pel of the current block 21 and a pel of each of the candidate block 32 corresponding in position to each other.
Figure 34B:
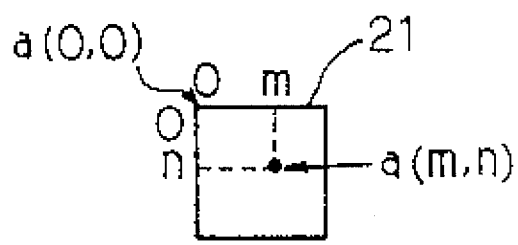
Figure 36:
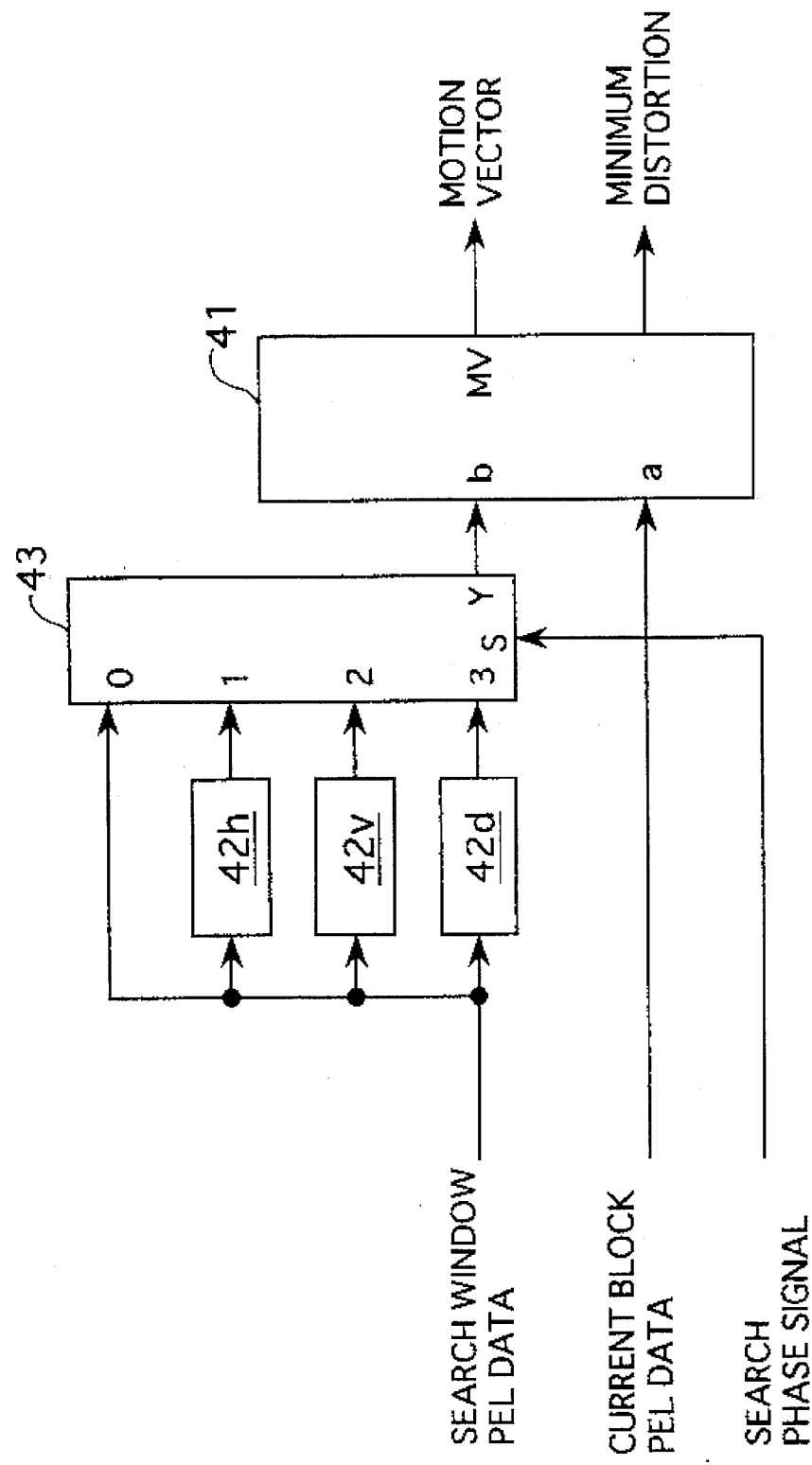
FIG. 36 is a block diagram of a prior art motion estimation apparatus.

The signal input terminals S of the selectors 1921–1925 are electrically connected to the timing control unit 1800 to receive the control signal S shown in FIG. 28. The signal input terminals S1 of the distortion calculating units 1951–1955 are electrically connected to the timing control unit 1800 to receive the control signal LD shown in FIG. 27. The signal input terminals S2 of the distortion calculating units 1951–1955 are electrically connected to the timing control unit 1800 to receive the clock signal CK. Although not shown in FIG. 25, the signal input terminals of the D flip-flops 1911–1915, 1933–1935 and 1941–1945 are electrically connected to the timing control unit 1800 to receive the clock signal CK shown in FIGS. 27 and 28.

The operation of the aforesaid motion estimation apparatus will be described hereinlater in detail with reference to FIGS. 26 and 27.

The search window data outputting means 1710 supplies the integer pel data b(0, 0), b(0, 1), b(0, 1), b(0, 2), b(0, 2) and b(0, 3) of the search window 60 in described order to the first shift register 1101, the integer pel data b(1, 0), b(1, 1), b(1, 1), b(1, 2), b(1, 2), b(1, 3) of the search window 60 in described order to the first shift register 1102, the integer pel data b(2, 0), b(2, 1), b(2, 1), b(2, 2), b(2, 2), b(2, 2), b(2, 3) of the search window 60 in described order to the first shift register 1103, the integer pel data b(3, 0), b(3, 1), b(3, 1), b(3, 2), b(3, 2), b(3, 3) of the search window 60 in described order to the shift register 1104. The integer pel data to be received by the first shift register 1102, 1103 and 1104 are outputted one pulse, two pulses, three pulses four pulses of the clock signal CK behind time, respectively, with respect to the integer pel data to be received by the first shift register 1101. Consequently, the first shift registers 1101–1104 latch, on lines S0–S3, respectively, shown in FIG. 19, the integer pel data of the search window 60 in step with the pulses the clock signal CK as shown in FIG. 27.

On the other hand, the current block data outputting means 1720 supplies the integer pel data a(0, 0), a(0, 1), a(0, 0) and a(0, 1) of the current block 50 in described order to the second shift register 1201, and the integer pel data a(1, 0), a(1, 1), a(1, 0), a(1, 1), a(1, 0), a(1, 1) of the current block 50 in described order to the second shift register 1204. The integer pel data to be received by the second shift register 1201 are outputted simultaneously with the integer pel data to be received by the first shift register 1101. The integer pel data to be received by the second shift register 1204 are outputted two pulses of the clock signal CK behind time with respect to the integer pel data to be received by the second shift register 1201. Consequently, the second shift registers 1201 and 1204 latch, on lines R0 and R1, respectively, shown in FIG. 19, the integer pel data of the current block 50 in step with the pulses of the clock signal CK as shown in FIG. 27.

The integer pel data of the current block 50 and the integer pel data of the search window 60 are shifted between the first shift registers and between the second shift registers in step with the clock signal CK. During the shift operation, the processor elements 1501–1506, specifically, the integer pel block local distortion calculating device 1520 of each of the processor elements 1501–1506 receives the integer pel data of current block 50 and the integer pel data of the search window 60. The integer pel data received by the processor elements 1501–1506 in periods (a)–(j) shown in FIG. 27 are shown in FIGS. 29(a)–29(j), respectively.

By the processor elements vertically aligned with one another shown in FIG. 19, are calculated integer pel block local distortion values each corresponding to each of integer pels included in each of the integer pel blocks vertically aligned with one another in the search window 60, first half-pel block local distortion values each corresponding to each of the half-pels included in each of the first half-pel blocks vertically aligned with one another in the search window 60, second half-pel block local distortion values each corresponding to each of the second half-pels included in each of the second half-pel blocks vertically aligned with one another in the search window 60, and third half-pel block local distortion values each corresponding to each of the third half-pels included in each of the third half-pel blocks vertically aligned with one another in the search window 60. Each of the local distortion values calculated by each of the processor elements are shifted to each of the lower side processor elements in FIG. 19 and added to each of the local distortion values calculated by each of the lower side processor elements. The local distortion values added to one another in the downward shifting process corresponds to integer pels, respectively, each of the current blocks included in the same column. The local distortion values added to one another are transmitted to from of each of the lowest processor elements 1504–1506 in FIG. 19 to each of the adding units 1601–1610. The added local distortion values based on the integer or half-pels of the same candidate block are summed up by each of the adding units 1601–1610, thereby making it possible to obtain each of the distortion values.

For example, a distortion value D(0, 0) between the current block 50 and the integer pel block 61i formed by the integer pel block b(0, 0), b(1, 0), b(0, 1) and b(1, 1) are calculated as follows.

In the period (a), the integer pel data a(0, 0) and b(0, 0) are received by the integer pel block local distortion calculating device 1520 of the processor element 1501 and accordingly a local distortion value lb(0, 0)–a(0, 0)l are calculated and transmitted from the adder 1525 to D flip-flop 1301. In step with the pulse of the clock signal CK in the period (b), is shifted the local distortion value lb(0, 0)–a(0, 0)l from the D flip-flop 1301 to the D flip-flop 1302. In the period (b), the integer pel data a(0, 1) and (0, 1) are received by the integer pel block distortion calculating device 1520 of the processor element 1501 and accordingly a local distortion value lb(0, 1)–a(0, 1)l are calculated and transmitted from the adder 1525 to D flip-flop 1301. In step with the pulse of the clock signal CK in the period (c), is transmitted the local distortion value lb(0, 0)–a(0, 0)l from the D flip-flop 1302 to the adder 1525 of the processor element 1504. At the same time, the local distortion value lb(0, 1)–a(0, 1)l is shifted from the D flip-flop 1301 to the D flip-flop 1302.

In the period (c), the integer pel data a(1, 0) and b(1, 0) are received by the integer pel block local distortion calculating device 1520 of the processor element 1504 and accordingly a local distortion value lb(1, 0)–a(1, 0)l are calculated by the integer pel block local distortion calculating device 1520 and added by the adder 1525 to local distortion value lb(0, 0)–a(0, 0)l. As a result, the added local distortion value lb(0, 0)–a(0, 0)l+lb(0, 0)–a(0, 0)l are transmitted from the adder 1525 of the processor element 1504 to the adding unit 1601. The local distortion value lb(0, 1)–a(0, 1)l is transmitted from the D flip-flop 1301 to the D flip-flop 1302 in step with the pulse of the clock signal CK in the period (c), and transmitted to the adder 1525 of the processor element 1504 in step with the pulse of the clock signal CK in the period (d).

In the period (d), the integer pel data a(1, 1) and b(1, 1) are received by the integer pel block local distortion calculating device 1520 of the processor element 1504 and accordingly a local distortion value lb(1, 1)–a(1, 1)l are calculated by the integer pel block local distortion calculating device 1520 and added by the adder 1525 to local distortion value lb(0, 1)–a(0, 1)l. As a result, the added local distortion value lb(0, 1)–a(0, 1)l+lb(1, 1)–a(1, 1)l are transmitted from the adder 1525 of the processor element 1504 to the adding unit 1601. In the period (e), the added local distortion value lb(0, 0)–a(0, 0)l+lb(1, 0)–a(1, 0)l+lb(0, 1)–a(0, 1)l+lb(1, 1)–a(1, 1)l are calculated by the adding unit 1601 and transmitted to the motion vector detector 1900.

The data input terminals A0–A9 of the motion vector detector 1900 receive the distortion values D(k, h) from the adding units 1601–1609 as shown in FIG. 27. The distortion values D(k, h) are divided into valid distortion values and invalid distortion values. The valid distortion values are shown within hatched areas in FIG. 27. In the motion vector detector 1900, the valid distortion values D(k, h) on the data input terminals A0–A9 are controlled in timing and order by the D flip-flops 1911–1915, the selectors 1921–1925 and the D flip-flops 1933–1935, so that the distortion selecting devices 1951–1955 can receive the distortion values D(k, h), respectively, in accordance with timing and order shown in FIG. 28. Each of the distortion selecting devices 1951–1955 specify a distortion value which is the smallest in the received distortion values, and transmits the specified distortion value to the distortion calculating device 1956 through the selector 1961. In addition, each of the distortion selecting devices 1951–1955 supplies the selector 1962 with data MVy indicative of a vertical position of a candidate block corresponding to each of the distortion values specified by each of the distortion selecting devices 1951–1955. The distortion selecting device 1956 selects a minimum distortion value from among the distortion values from the selector 1961 and outputs the selected the minimum distortion value through the data output terminal DD. The distortion selecting device 1956 further outputs data MVx indicative of a horizontal position of a candidate block corresponding to the minimum distortion value in the search window 60. At the same time, the selector 1962 outputs data MVy indicative of a vertical position of the candidate block corresponding to the minimum distortion value. The target motion vector is defined by the data MVx and MVy.

The third embodiment of the present invention has the same advantage as the first embodiment of the present invention has. In addition, the third embodiment of the present invention has an advantage of the fact that the motion estimation apparatus can be reduced in circuit size. This can be understood from the following reason. The integer pel data of the current block 50 are supplied to the processor elements 1501–1506 from the second shift registers 1201–1206, respectively, and as a consequence electrical lines between the processor elements 1501–1506 and the current block data outputting means 1720 can be reduced in number in comparison with the case that the integer pel data of the current block 50 are directly supplied from the current block data outputting means 1720 to the processor elements 1501–1506.

It will be understood by those skilled in the art that the following description is in terms of preferred embodiments of the present invention wherein various changes and modifications may be made without departing from the spirit and scope of the invention, as set forth in the appended claims.

What is claimed is:

1. A motion estimation apparatus for calculating a motion vector to estimate a current picture partially forming a moving picture on the basis of a reference picture partially forming said moving picture, said current picture being partially formed by a current block including a plurality of integer pels each represented by integer pel data, said reference picture being partially formed by a search window including a plurality of integer pels each represented by integer pel data, said search window having a plurality of candidate blocks each equal in size to said current block, said candidate blocks consisting of integer pel blocks each including part of said integer pels of said search window and half-pel blocks each having half-pels each interposed between two of the integer pels of said search window adjacent to each other, and said motion vector being indicative of a displacement between said current block and one of said candidate blocks most similar to said current block, comprising:

search window data outputting means for outputting the integer pel data of said search window;

search window data receiving and holding means for receiving the integer pel data of said search window from said search window data outputting means, and holding the integer pel data of at least two of the integer pels of said search window at the same time, the integer pel data held by said search window data receiving and holding means being shifted with other integer pel data of said search window;

current block data outputting means for outputting the integer pel data of said current block;

integer pel block distortion calculating means for calculate integer pel block distortion values each indicative of a difference between said current block and each of said integer pel blocks of said candidate blocks on the basis of the integer pel data of said search window held by said search window data receiving and holding means and the integer pel data of said current block outputted from said current block data outputting means, said integer pel block distortion calculating means being operative to calculate and output local distortion values divided into a plurality of integer pel block local distortion groups equal in number to one another, each local integer pel block distortion value of each of said integer pel block local distortion groups being indicative of a difference between each integer pel of each of said integer pel blocks and each integer pel of said current block corresponding in position to each other, and said integer pel block distortion values being calculated on the basis of said local integer pel block local distortion groups, respectively;

half-pel block distortion calculating means for calculating half-pel block distortion values each indicative of a difference between said current block and each of said half-pel blocks on the basis of the local distortion values calculated by said integer pel block distortion calculating means; and minimum distortion detecting means for detecting a minimum distortion value from among said integer pel block distortion values and half-pel block distortion values to specify one of the candidate blocks most similar to said current block.

2. A motion estimation apparatus as set forth in claim 1, in which the integer pels of said current block are arranged in the form of a matrix array formed by M columns of N pels, said M and N being integers, respectively, the integer pels of said search window being arranged in the form of a matrix array formed by K columns of H pels, said K and H being integers greater than said M and N, respectively, said search window data receiving and holding means comprising (K–M+1)×(H–N+1) shift registers for shifting the integer pel data of said search window therebetween, said shift registers holding the integer pel data of (K–M+1)×(H–N+1) integer pels of said search window at the same time, and said integer pel block distortion calculating means comprising (K–M+1)×(H–N+1) integer pel block distortion calculating units each receiving the integer pel data from each of said shift registers to calculating each of said integer pel block distortion values.

3. A motion estimation apparatus as set forth in claim 2, in which said half-pel blocks consist of first half-pel blocks each deviated by half-pel pitch from each of said integer pel blocks in a parallel relationship to a vertical line in said search window, second half-pel blocks each deviated by half-pel pitch from each of said integer pel blocks in a parallel relationship to a horizontal line in said search window, and third half-pel blocks each deviated by half-pel pitch from each of said integer pel blocks in a parallel relationship to a diagonal line in said search window, said half-pel block distortion values consisting of first half-pel block distortion values each indicative of a difference between said current block and each of said first half-pel blocks, second half-pel block distortion values each indicative of a difference between said current block and each of said second half-pel blocks, and third half-pel distortion values each indicative of a difference between said current block and each of said third half-pel blocks, and said half-pel block distortion calculating means comprising (K–M+1)×(H–N) first half-pel block distortion calculating units each calculating each of said first half-pel block distortion values, (K–M)×(H–N+1) second half-pel block distortion calculating units each calculating each of said second half-pel block distortion values, and (K–M)×(H–N) third half-pel block distortion calculating units each calculating each of said third half-pel block distortion values, said integer pel block distortion calculating units comprising local distortion value calculating devices for calculating said local integer pel block distortion groups, respectively, and distortion value calculating devices for calculating said integer pel block distortion values on the basis of said local integer pel block distortion groups, respectively, said first half-pel block distortion calculating units comprising local distortion value calculating devices for calculating first half-pel block local distortion groups, respectively, each of said first half-pel block local distortion groups being constituted by local distortion vales each indicative of a difference between each half-pel of each of said first half-pel blocks and each integer pel of said current block corresponding to each other in position, said first half-pel block distortion calculating units further comprising distortion value calculating devices for calculating said first half-pel block distortion values on the basis of said first half-pel block local distortion groups, respectively, said second half-pel block distortion calculating units comprising local distortion value calculating devices for calculating second half-pel block local distortion groups, respectively, each of said second half-pel block local distortion groups being constituted by local distortion vales each indicative of a difference between each half-pel of each of said second half-pel blocks and each integer pel of said current block corresponding to each other in position, said second half-pel block distortion calculating units further comprising distortion value calculating devices for calculating said second half-pel block distortion values on the basis of said second half-pel block local distortion groups, respectively, said third half-pel block distortion calculating units comprising local distortion value calculating devices for calculating third half-pel block local distortion groups, respectively, each of said third half-pel block local distortion groups being constituted by local distortion vales each indicative of a difference between each half-pel of each of said third half-pel blocks and each integer pel of said current block corresponding to each other in position, said third half-pel block distortion calculating units further comprising distortion value calculating devices for calculating said third half-pel block distortions on the basis of said third half-pel block local distortion groups, respectively.

4. A motion estimation apparatus as set forth in claim 3, in which the local distortion value calculating device of each of said first half-pel block distortion calculating units receives the local distortion values from the local distortion value calculating devices of two of said integer pel block distortion calculating units which respectively calculate the integer pel block distortion values based on the integer pel blocks deviated by one-pel pitch from each other in parallel relationship to the vertical line in said search window, each of said first half-pel block local distortion groups being calculated on the basis of the local distortion values received by the local distortion value calculating device of each of said first half-pel block distortion calculating units, the local distortion value calculating device of each of said second half-pel block distortion calculating units receiving the local distortion values from the local distortion value calculating devices of two of said integer pel block distortion calculating units which respectively calculate the integer pel block distortion values based on the integer pel blocks deviated by one-pel pitch from each other in parallel relationship to the horizontal line in said search window, each of said second half-pel block local distortion groups being calculated on the basis of the local distortion values received by the local distortion value calculating device of each of said second half-pel block distortion calculating units, the local distortion value calculating device of each of said third half-pel block distortion calculating units receiving the local distortion values from the local distortion value calculating devices of two of said second half-pel block distortion calculating units which respectively calculate the second half-pel block distortion values based on the second half-pel blocks deviated by one-pel pitch from each other in parallel relationship to the horizontal line in said search window, and each of said third half-pel block local distortion groups being calculated on the basis of the local distortion values received by the local distortion value calculating device of each of said third half-pel block distortion calculating units.

5. A motion estimation apparatus as set forth in claim 3, in which the local distortion value calculating device of each of said first half-pel block distortion calculating units receives the local distortion values from the local distortion value calculating devices of two of said integer pel block distortion calculating units which respectively calculate the integer pel block distortion values based on the integer pel blocks deviated by one-pel pitch from each other in parallel relationship to the vertical line in said search window, each of said first half-pel block local distortion groups being calculated on the basis of the local distortion values received by the local distortion value calculating device of each of said first half-pel block distortion calculating units, the local distortion value calculating device of each of said second half-pel block distortion calculating units receiving the local distortion values from the local distortion value calculating devices of two of said integer pel block distortion calculating units which respectively calculate the integer pel block distortion values based on the integer pel blocks deviated by one-pel pitch from each other in parallel relationship to the horizontal line in said search window, each of said second half-pel block local distortion groups being calculated on the basis of the local distortion values received by the local distortion value calculating device of each of said second half-pel block distortion calculating units, the local distortion value calculating device of each of said third half-pel block distortion calculating units receiving the local distortion values from the local distortion value calculating devices of two of said first half-pel block distortion calculating units which respectively calculate the first half-pel block distortion values based on the first half-pel blocks deviated by one-pel pitch from each other in parallel relationship to the vertical line in said search window, and each of said third half-pel block local distortion groups being calculated on the basis of the local distortion values received by the local distortion value calculating device of each of said third half-pel block distortion calculating units.

6. A motion estimation apparatus as set forth in claim 5, in which said $(K-M+1) \times (H-N+1)$ shift registers are divided into four register groups consisting of a first register group including $(K-M) \times (H-N)$ of said shift registers, a second register group including $(H-N)$ of said shift registers, a third register group including $(K-M)$ of said shift registers and a fourth register group including one of said shift registers, said $(K-M+1) \times (H-N+1)$ integer pel block distortion calculating units being divided into four unit groups consisting of a first unit group including $(K-M) \times (H-N)$ of said integer pel block distortion calculating units, a second unit group including $(H-N)$ of said integer pel block distortion calculating units, a third unit group including $(K-M)$ of said integer pel block distortion calculating units and a fourth unit group including one of said integer pel block distortion calculating units, said $(K-M+1) \times (H-N)$ first half-pel block distortion calculating units being divided into two unit groups consisting of a first unit group including $(K-M) \times (H-N)$ of said first half-pel block distortion calculating units and a second unit group including $(H-N)$ of said first half-pel block distortion calculating units, said (K–M)×(H–N+1) second half-pel block distortion calculating units being divided into two unit groups consisting of a first unit group including (K–M)×(H–N) of said second half-pel block distortion calculating units and a second unit group including (K–M) of said second half-pel block distortion calculating units, each of the (K–M)×(H–N) shift registers included in the first register group of said shift registers, each of the (K–M)×(H–N) integer pel block distortion calculating units included in the first unit group of said integer pel block distortion calculating units, each of (K–M)×(H–N) first half-pel block distortion calculating units included in the first unit group of said first half-pel block distortion calculating units, each of (K–M)×(H–N) second half-pel block distortion calculating units included in the first unit group of said second half-pel block distortion calculating units, and each of said (K–M)×(H–N) third half-pel block distortion calculating units collectively forming each of (K–M)×(H–N) first processor elements, the integer pel block distortion calculating unit included in each of said first processor elements receiving the integer pel data of said search window from the shift register included in each of said first processor elements, the integer pel block distortion calculating unit and the first, second and third half-pel block distortion calculating units included in the same first processor element calculating the integer pel block distortion value and the first, second and third half-pel block distortion values based on the integer pel block and the first, second and third half-pel blocks deviated by half-pel pitch from one another, each of (H–N) shift registers included in the second register group of said shift registers, each of (H–N) integer pel block distortion calculating units included in the second unit group of said integer pel block distortion calculating units and each of (H–N) first half-pel block distortion calculating units included in the second unit group of said first half-pel block distortion calculating units collectively forming each of (H–N) second processor elements, the integer pel block distortion calculating unit included in each of said second processor elements receiving the integer pel data of said search window from the shift register included in each of said second processor elements, the integer pel block distortion calculating unit and the first half-pel block distortion calculating unit included in the same second processor element calculating the integer pel block distortion value and the first half-pel block distortion value based on the integer pel block and the first half-pel block deviated by half-pel pitch from each other, each of (K–M) shift registers included in the third register group of said shift registers, each of (K–M) integer pel block distortion calculating units included in the third unit group of said integer pel block distortion calculating units and each of (H–M) second half-pel block distortion calculating units included in the second unit group of said second half-pel block distortion calculating units collectively forming each of (H–M) third processor elements, the integer pel block distortion calculating unit included in each of said third processor elements receiving the integer pel data of said search window from the shift register included in each of third processor elements, the integer pel block distortion calculating unit and the second half-pel block distortion calculating unit included in the same third processor element calculating the integer pel block distortion value and the second half-pel block distortion value based on the integer pel block and the second half-pel block deviated by half-pel pitch from each other, the shift register included in the fourth register group of said shift registers and the integer pel block distortion calculating unit included in the fourth unit group of said integer pel block distortion calculating units collectively forming a fourth processor element, and the integer pel block distortion calculating unit included in said fourth processor element receiving the integer pel data of said search window from the shift register included in each of said fourth processor element.

7. A motion estimation apparatus for calculating a motion vector to estimate a current picture partially forming a moving picture on the basis of a reference picture partially forming said moving picture, said current picture being partially formed by a current block including a plurality of integer pels each represented by integer pel data, said reference picture being partially formed by a search window including a plurality of integer pels each represented by integer pel data, said search window having a plurality of candidate blocks each equal in size to said current block, said candidate blocks consisting of integer pel blocks each including pan of said integer pels of said search window and half-pel blocks each having half-pels each interposed between two of the integer pels of said search window adjacent to each other, and said motion vector being indicative of a displacement between said current block and one of said candidate blocks most similar to said current block, comprising:

search window data outputting means for outputting the integer pel data of said search window;

search window data receiving and holding means for receiving the integer pel data of said search window from said search window data outputting means, and holding the integer pel data of at least two of the integer pels of said search window at the same time, the integer pel data held by said search window data receiving and holding means being shifted with other integer pel data of said search window;

current block data outputting means for outputting the integer pel data of said current block;

integer pel block distortion calculating means for calculate integer pel block distortion values each indicative of a difference between said current block and each of said integer pel blocks of said candidate blocks on the basis of the integer pel data of said search window held by said search window data receiving and holding means and the integer pel data of said current block outputted from said current block data outputting means;

half-pel block distortion calculating means for calculating half-pel block distortion values each indicative of a difference between said current block and each of said half-pel blocks of said candidate blocks on the basis of the integer pel data of said search window held by said search window data receiving and holding means and the integer pel data of said current block outputted from said current block data outputting means; and minimum distortion detecting means for detecting a minimum distortion value from among said integer pel block distortion values and half-pel block distortion values to specify one of the candidate blocks most similar to said current block.

8. A motion estimation apparatus as set forth in claim 7, in which the integer pels of said current block are arranged in the form of a matrix array formed by M columns of N pels, said M and N being integers, respectively, the integer pels of said search window being arranged in the form of a matrix array formed by K columns of H pels, said K and H being integers greater than said M and N, respectively, said search window data receiving and holding means comprising (K−M+1)×(H−N+1) shift registers for shifting the integer pel data of said search window therebetween, said shift registers holding the integer pel data of (K−M+1)×(H−N+1) integer pels of said search window at the same time, and said integer pel block distortion calculating means comprising (K−M+1)×(H−N+1) integer pel block distortion calculating units each receiving the integer pel data from each of said shift registers to calculating each of said integer pel block distortion values.

9. A motion estimation apparatus as set forth in claim 8, in which said half-pel blocks consist of first half-pel blocks each deviated by half-pel pitch from each of said integer pel blocks in a parallel relationship to a vertical line in said search window, second half-pel blocks each deviated by half-pel pitch from each of said integer pel blocks in a parallel relationship to a horizontal line in said search window, and third half-pel blocks each deviated by half-pel pitch from each of said integer pel blocks in a parallel relationship to a diagonal line in said search window, said half-pel block distortion values consisting of first half-pel block distortion values each indicative of a difference between said current block and each of said first half-pel blocks, second half-pel block distortion values each indicative of a difference between said current block and each of said second half-pel blocks, and third half-pel distortion values each indicative of a difference between said current block and each of said third half-pel blocks, said half-pel block distortion calculating means comprising (K−M+1)×(H−N) first half-pel block distortion calculating units each calculating each of said first half-pel block distortion values, (K−M)×(H−N+1) second half-pel block distortion calculating units each calculating each of said second half-pel block distortion values, and (K−M)×(H−N) third half-pel block distortion calculating units each calculating each of said third half-pel block distortion values, each of said first half-pel block distortion calculating units receiving, from two of said shift registers, integer pel data of two integer pels of said search window adjoining each other in a parallel relationship to the vertical line in said search window to calculate half-pel data of a half pel between said two integer pels received by each of said first half-pel block distortion calculating units, each of said second half-pel block distortion calculating units receiving, from two of said shift registers, integer pel data of two integer pels of said search window adjoining each other in a parallel relationship to the horizontal line in said search window to calculate half-pel data of a half pel between the two integer pels received by each of said second half-pel block distortion calculating units, and each of said third half-pel block distortion calculating units receiving, from four of said shift registers, integer pel data of four integer pels of said search window arranged in the form of a matrix array and adjoining one another to calculate half-pel data of a half pel between the four integer pels received by each of said third half-pel block distortion calculating units.

10. A motion estimation apparatus as set forth in claim 9, in which said (K−M+1)×(H−N+1) shift registers are divided into four register groups consisting of a first register group including (K−M)×(H−N) of said shift registers, a second register group including (H−N) of said shift registers, a third register group including (K−M) of said shift registers and a fourth register group including one of said shift registers, said (K−M+1)×(H−N+1) integer pel block distortion calculating units being divided into four unit groups consisting of a first unit group including (K−M)×(H−N) of said integer pel block distortion calculating units, a second unit group including (H−N) of said integer pel block distortion calculating units, a third unit group including (K−M) of said integer pel block distortion calculating units and a fourth unit group including one of said integer pel block distortion calculating units, said (K−M+1)×(H−N) first half-pel block distortion calculating units being divided into two unit groups consisting of a first unit group including (K−M)×(H−N) of said first half-pel block distortion calculating units and a second unit group including (H−N) of said first half-pel block distortion calculating units, said (K−M)×(H−N+1) second half-pel block distortion calculating units being divided into two unit groups consisting of a first unit group including (K−M)×(H−N) of said second half-pel block distortion calculating units and a second unit group including (K−M) of said second half-pel block distortion calculating units, each of the (K−M)×(H−N) shift registers included in the first register group of said shift registers, each of the (K−M)×(H−N) integer pel block distortion calculating units included in the first unit group of said integer pel block distortion calculating units, each of (K−M)×(H−N) first half-pel block distortion calculating units included in the first unit group of said first half-pel block distortion calculating units, each of (K−M)×(H−N) second half-pel block distortion calculating units included in the first unit group of said second half-pel block distortion calculating units, and each of said (K−M)×(H−N) third half-pel block distortion calculating units collectively forming each of (K−M)×(H−N) first processor elements, the integer pel block distortion calculating unit included in each of said first processor elements receiving the integer pel data of said search window from the shift register included in each of said first processor elements, the integer pel block distortion calculating unit and the first, second and third half-pel block distortion calculating units included in the same first processor element calculating the integer pel block distortion value and the first, second and third half-pel block distortion values based on the integer pel block and the first, second and third half-pel blocks deviated by half-pel pitch from one another, each of (H−N) shift registers included in the second register group of said shift registers, each of (H−N) integer pel block distortion calculating units included in the second unit group of said integer pel block distortion calculating units and each of (H−N) first half-pel block distortion calculating units included in the second unit group of said first half-pel block distortion calculating units collectively forming each of (H−N) second processor elements, the integer pel block distortion calculating unit included in each of said second processor elements receiving the integer pel data of said search window from the shift register included in each of said second processor elements, the integer pel block distortion calculating unit and the first half-pel block distortion calculating unit included in the same first processor element calculating the integer pel block distortion value and the first half-pel block distortion value based on the integer pel block and the first half-pel block deviated by half-pel pitch from each other, each of (K–M) shift registers included in the third register group of said shift registers, each of (K–M) integer pel block distortion calculating units included in the third unit group of said integer pel block distortion calculating units and each of (H–M) second half-pel block distortion calculating units included in the second unit group of said second half-pel block distortion calculating units collectively forming each of (H–M) third processor elements, the integer pel block distortion calculating unit included in each of said third processor elements receiving the integer pel data of said search window from the shift register included in each of said third processor elements, the integer pel block distortion calculating unit and the second half-pel block distortion calculating unit included in the same third processor element calculating the integer pel block distortion value and the second half-pel block distortion value based on the integer pel block and the second half-pel block deviated by half-pel pitch from each other, the shift register included in the fourth register group of said shift registers and the integer pel block distortion calculating unit included in the fourth unit group of said integer pel block distortion calculating units collectively forming a fourth processor element, and the integer pel block distortion calculating unit included in said fourth processor element receiving the integer pel data of said search window from the shift register included in each of said fourth processor element.

11. A motion estimation apparatus for calculating a motion vector to estimate a current picture partially forming a moving picture on the basis of a reference picture partially forming said moving picture, said current picture being partially formed by a current block including a plurality of integer pels each represented by integer pel data, said reference picture being partially formed by a search window including a plurality of integer pels each represented by integer pel data, said search window having a plurality of candidate blocks each equal in size to said current block, said candidate blocks consisting of integer pel blocks each including part of said integer pels of said search window and half-pel blocks each having half-pels each interposed between two of the integer pels of said search window adjacent to each other, and said motion vector being indicative of a displacement between said current block and one of said candidate blocks most similar to said current block, comprising:

search window data outputting means for outputting the integer pel data of said search window;

search window data receiving and holding means for receiving the integer pel data of said search window from said search window data outputting means, and holding the integer pel data of at least two of the integer pels of said search window at the same time, the integer pel data held by said search window data receiving and holding means being shifted with other integer pel data of said search window;

current block data outputting means for outputting the integer pel data of said current block;

current block data receiving and holding means for receiving the integer pel data of said current block from said current block data outputting means, and holding the integer pel data of at least two of the integer pels of said current block at the same time, the integer pel data held by said current block data receiving and holding means being shifted with other integer pel data of said current block;

integer pel block distortion calculating means for calculate integer pel block distortion values each indicative of a difference between said current block and each of said integer pel blocks of said candidate blocks on the basis of the integer pel data of said search window held by said search window data receiving and holding means and the integer pel data of said current block held by said current block data receiving and holding means, said integer pel block distortion calculating means being operative to calculate and output local distortion values divided into a plurality of integer pel block local distortion groups equal in number to one another, each local integer pel block distortion value of each of said integer pel block local distortion groups being indicative of a difference between each integer pel of each of said integer pel blocks and each integer pel of said current block corresponding in position to each other, and said integer pel block distortion values being calculated on the basis of said local integer pel block local distortion groups, respectively;

half-pel block distortion calculating means for calculating half-pel block distortion values each indicative of a difference between said current block and each of said half-pel blocks on the basis of the local distortion values calculated by said integer pel block distortion calculating means;

minimum distortion detecting means for detecting a minimum distortion value from among said integer pel block distortion values and half-pel block distortion values to specify one of the candidate blocks most similar to said current block.

12. A motion estimation apparatus as set forth in claim 11, in which the integer pels of said current block are arranged in the form of a matrix array formed by M columns of N pels, said M and N being integers, respectively, the integer pels of said search window being arranged in the form of a matrix array formed by K columns of H pels, said K and H being integers greater than said M and N, respectively, said half-pel blocks consisting of first half-pel blocks each deviated by half-pel pitch from each of said integer pel blocks in a parallel relationship to a vertical line in said search window, second half-pel blocks each deviated by half-pel pitch from each of said integer pel blocks in a parallel relationship to the horizontal line in said search window, and third half-pel blocks each deviated half-pel pitch from each of said integer pel blocks in a parallel relationship to a diagonal line in said search window, said half-pel block distortion values consists of first half-pel block distortion values each indicative of a difference between said current block and each of said first half-pel blocks, second half-pel block distortion values each indicative of a difference between said current block and each of said second half-pel blocks and third half-pel block distortion values each indicative of a difference between said current block and each of said third half-pel blocks, said integer pel block distortion calculating means comprising (K–M+1) integer pel block distortion calculating device groups each calculating the integer pel block distortion values respectively based on the integer pel blocks horizontally aligned with one another in said search window, and said half-pel block distortion calculating means comprising:

(K–M+1) first half-pel block distortion calculating device groups each calculating the first half-pel block distortion values respectively based on the first half-pel blocks horizontally aligned with one another in said search window;

(K–M) second half-pel block distortion calculating device groups each calculating the second half-pel block distortion values respectively based on the second half-pel blocks horizontally aligned with one another in said search window; and (K–M) third half-pel block distortion calculating device groups each calculating the third half-pel block distortion values respectively based on the third half-pel blocks horizontally aligned with one another in said search window.

13. A motion estimation apparatus as set forth in claim 12, in which each of said half-pel block distortion values is defined by M×N local distortion values each indicative of a difference between each integer pel of each of said integer pel blocks and each integer pel of said current block corresponding to each other in position, each of said first, second and third half-pel block distortion values is defined by M×N local distortion values each indicative of a difference between each integer pel of each of said first, second and third half-pel blocks and each integer pel of said current block corresponding to each other in position, each of said integer pel block calculating device groups comprising N local distortion calculating devices each calculating M of the local distortion values respectively based on M of the integer pels which are horizontally aligned with one another in said search window and are included in each of the integer pel blocks vertically aligned with one another in said search window, each of said first half-pel block calculating device groups comprising N local distortion calculating devices each calculating M of the local distortion values respectively based on M of the half-pels which are horizontally aligned with one another in said search window and are included in each of the first half-pel blocks vertically aligned with one another in said search window, each of said second half-pel block calculating device groups comprising N local distortion calculating devices each calculating M of the local distortion values respectively based on M of the half-pels which are horizontally aligned with one another in said search window and are included in each of the second half-pel blocks vertically aligned with one another in said search window, and each of said third half-pel block calculating device groups comprising N local distortion calculating devices each calculating M of the local distortion values respectively based on M of the half-pels which are horizontally aligned with one another in said search window and are included in each of the third half-pel blocks vertically aligned with one another in said search window.

14. A motion estimation apparatus as set forth in claim 13, in which said minimum distortion detecting means comprises:

{2(K–M+1)–1} first distortion specifying units respectively specifying distortion values each of which is the smallest in the integer pel block distortion values based on the integer pel blocks vertically aligned with one another in said search window and the half-pel block distortion values based on the half-pel blocks vertically aligned with one another in said search window, and a second distortion specifying unit specifying, as said minimum distortion value, a distortion value which is the smallest in the distortion values respectively specified by said first distortion specifying units.

15. A motion estimation apparatus as set forth in claim 13, in which said search window data receiving and holding means comprises (K–M+1)×N shift registers shifting the integer pel data of said search window therebetween and each holding the shifted integer pel data, said current block data receiving and holding means comprising (K–M+1)×N shift registers shifting the integer pel data of said current block therebetween and each holding the shifted integer pel data, the local distortion calculating devices of said integer pel block calculating device groups each receiving the integer pel data from each of the shift registers of said search window data receiving and holding means and the shift registers of said current block data receiving and holding means to calculate the local distortion values.

16. A motion estimation apparatus as set forth in claim 15, in which the local distortion calculating device of each of said first half-pel block distortion calculating device groups receives the local distortion values from the local distortion value calculating devices of two of said integer pel block calculating device groups respectively calculating the integer pel block distortion values respectively based on the integer pel blocks deviated by one-pel pitch from each other in parallel relationship to the vertical line in said search window to calculate the local distortion values of each of said first half-pel block distortion values, the local distortion calculating device of each of said second half-pel block distortion calculating device groups receiving the local distortion values from the local distortion value calculating devices of two of said integer pel block calculating device groups respectively calculating the integer pel distortion values respectively based on the integer pel blocks deviated by one-pel pitch from each other in parallel relationship to the horizontal line in said search window to calculate the local distortion values of each of said second half-pel block distortion values, and the local distortion calculating device of each of said third half-pel block distortion calculating device groups receiving the local distortion values from the local distortion calculating devices of two of said second half-pel block calculating device groups respectively calculating the second half-pel block distortion values respectively based on the second half-pel blocks deviated by one-pel pitch in parallel relationship to the horizontal line in said search window to calculate the local distortion values of each of said third half-pel block distortion values.

17. A motion estimation apparatus as set forth in claim 16, in which each of (K–M)×N of the local distortion calculating devices of said integer pel block distortion calculating device groups, each of the (K–M)×N local distortion calculating devices of said first half-pel block distortion calculating device groups, each of the (K–M)×N local distortion calculating devices of said second half-pel block distortion calculating device groups and each of the (K–M)×N local distortion calculating devices of said third half-pel block distortion calculating device groups collectively form each of (K–M)×N first processor elements, the local distortion values respectively based on the horizontally aligned integer pels and horizontally aligned half-pels of the integer block and first, second and third half-pel blocks deviated by half-pel pitch from one another being calculated by the local distortion calculating devices of the inter pel block distortion calculating device group and the first, second and third half-pel block distortion calculating device groups included in the same first processor element, each of N of the remaining local distortion calculating devices of said integer pel block distortion calculating device groups and each of N of the remaining local distortion calculating devices of said first half-pel block distortion calculating device groups collectively form each of N second processor elements, and the local distortion values respectively based on the horizontally aligned integer pels and horizontally aligned half-pels of the integer block and first half-pel block deviated by half-pel pitch from each other being calculated by the local distortion calculating devices of the inter pel block distortion calculating device group and the first half-pel block distortion calculating device group included in the same second processor element.

* * * * *